United States Patent [19]
Asahina et al.

[11] Patent Number: 5,557,542
[45] Date of Patent: Sep. 17, 1996

[54] IMAGE STORAGE APPARATUS

[75] Inventors: Hiroshi Asahina, Tochigi-ken; Kunio Aoki, Yaita; Toyomitsu Kanebako; Yoshinori Nakatani, both of Tochigi-ken, all of Japan

[73] Assignee: Kabushiki Kaisha Toshiba, Kawasaki, Japan

[21] Appl. No.: 289,136

[22] Filed: Aug. 11, 1994

[30] Foreign Application Priority Data

| Aug. 13, 1993 | [JP] | Japan | 5-201552 |
| Sep. 2, 1993 | [JP] | Japan | 5-218493 |
| Sep. 2, 1993 | [JP] | Japan | 5-218502 |
| Sep. 7, 1993 | [JP] | Japan | 5-221605 |

[51] Int. Cl.$^6$ .................................. G06F 17/00
[52] U.S. Cl. ........................................ 364/514 R
[58] Field of Search ................... 364/514 R, 514 A, 364/413.22; 358/314, 336; 348/232, 246, 426, 13; 455/19.1, 4.2; 360/19.1, 32; 345/1, 2; 395/153

[56] References Cited

FOREIGN PATENT DOCUMENTS

| 2-127883 | 5/1990 | Japan . |
| 2-200235 | 8/1990 | Japan . |
| 2-301275 | 12/1990 | Japan . |

*Primary Examiner*—Ellis B. Ramirez
*Attorney, Agent, or Firm*—Oblon, Spivak, McClelland, Maier & Neustadt, P.C.

[57] ABSTRACT

The connections among a plurality of dynamic image generating means, a plurality of work stations, a plurality of temporary storage means and a plurality of video tape recorders are switched from one to another a matrix switcher, so that the number of the video tape recorders may be smaller than the total number of the dynamic image generating means and the work stations. The dynamic image generating means are connected via the temporary storage means to the video tape recorders, and the video tape recorders are connected via the temporary storage means to the work stations, so that wait time at the time of image recording or reproduction can be shortened.

30 Claims, 39 Drawing Sheets

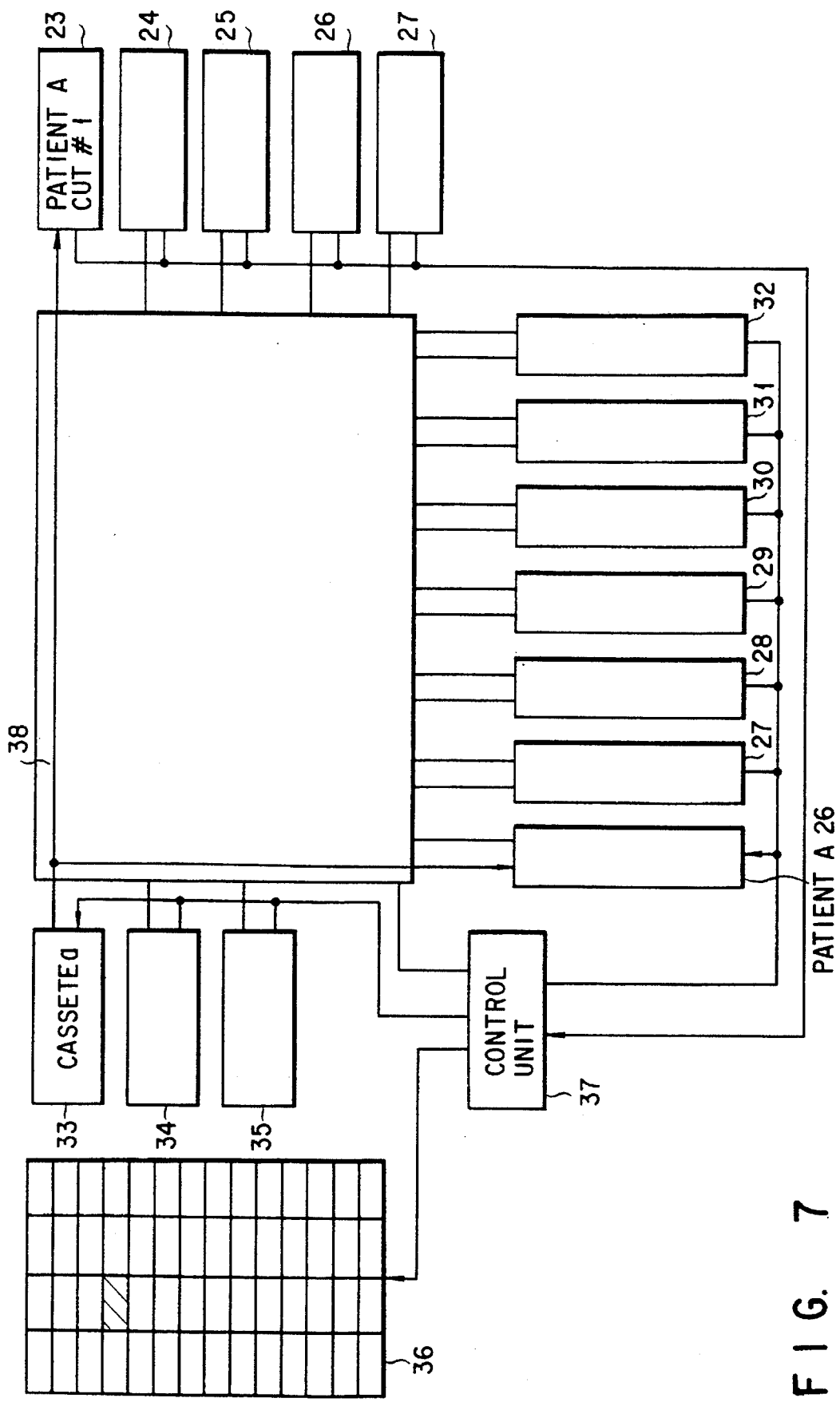

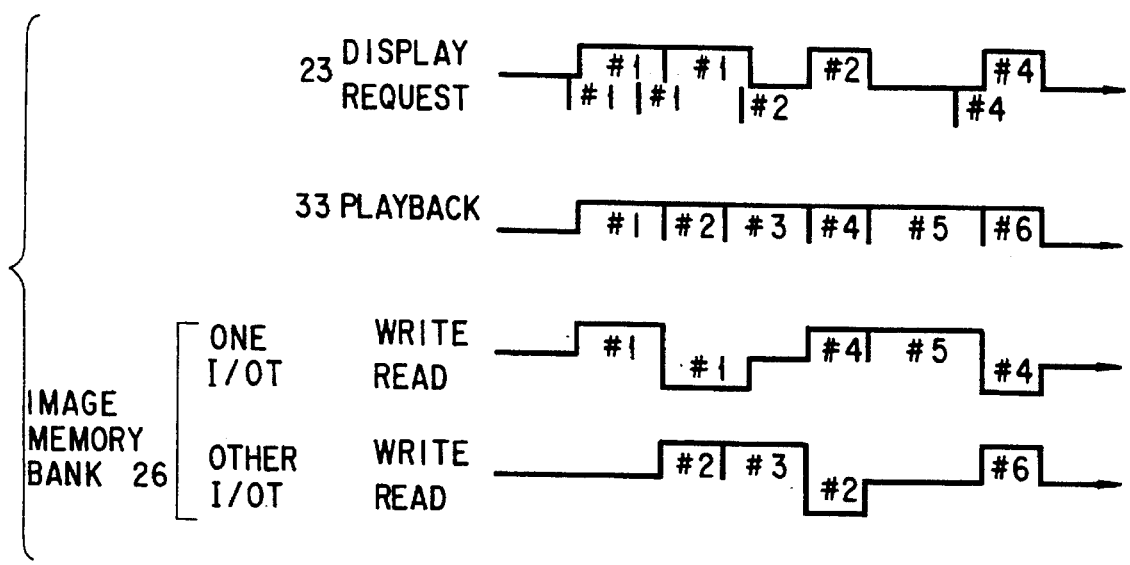
F I G. 14
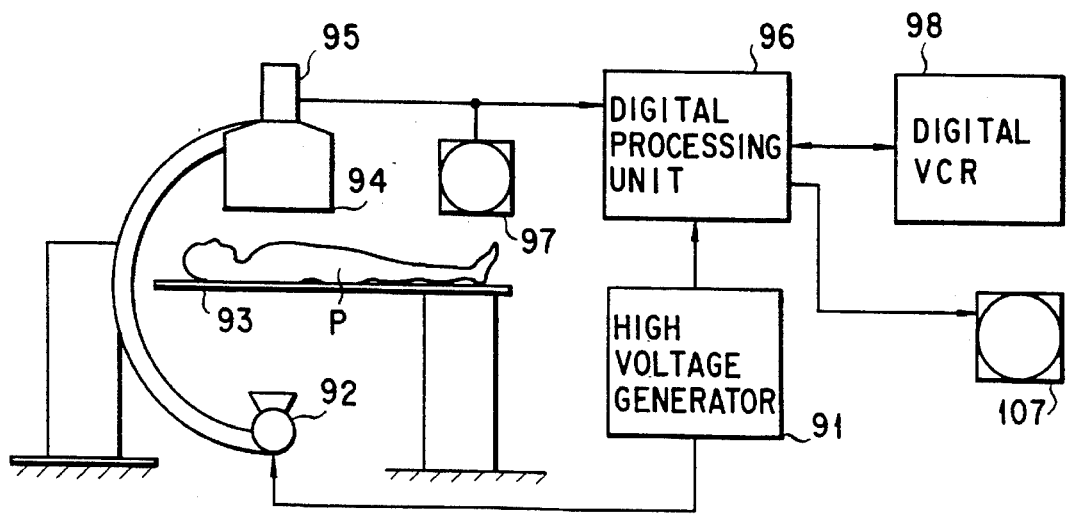
F I G. 15

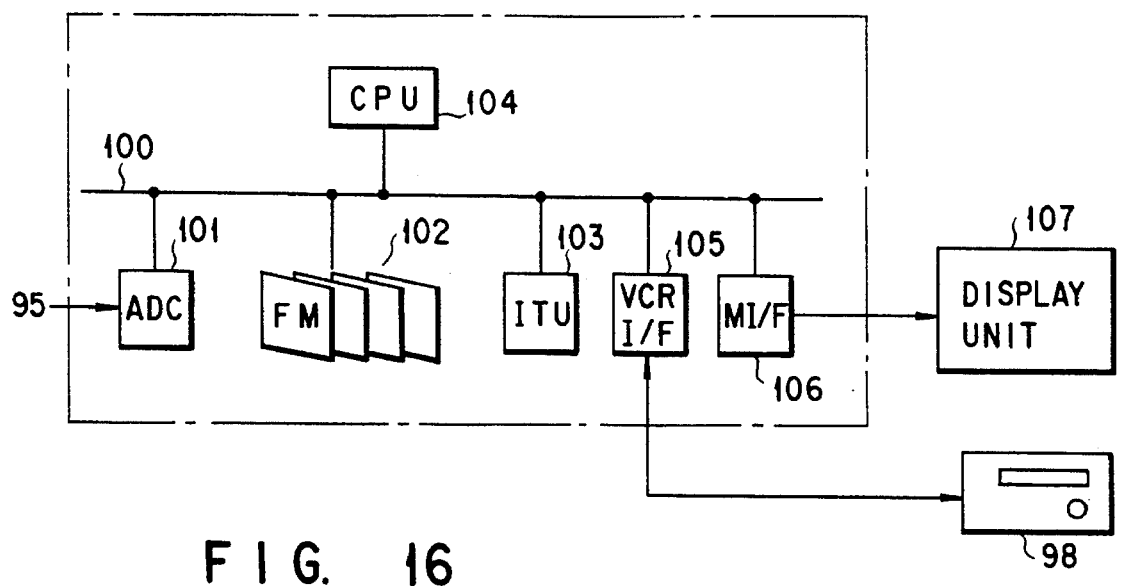
F I G. 16
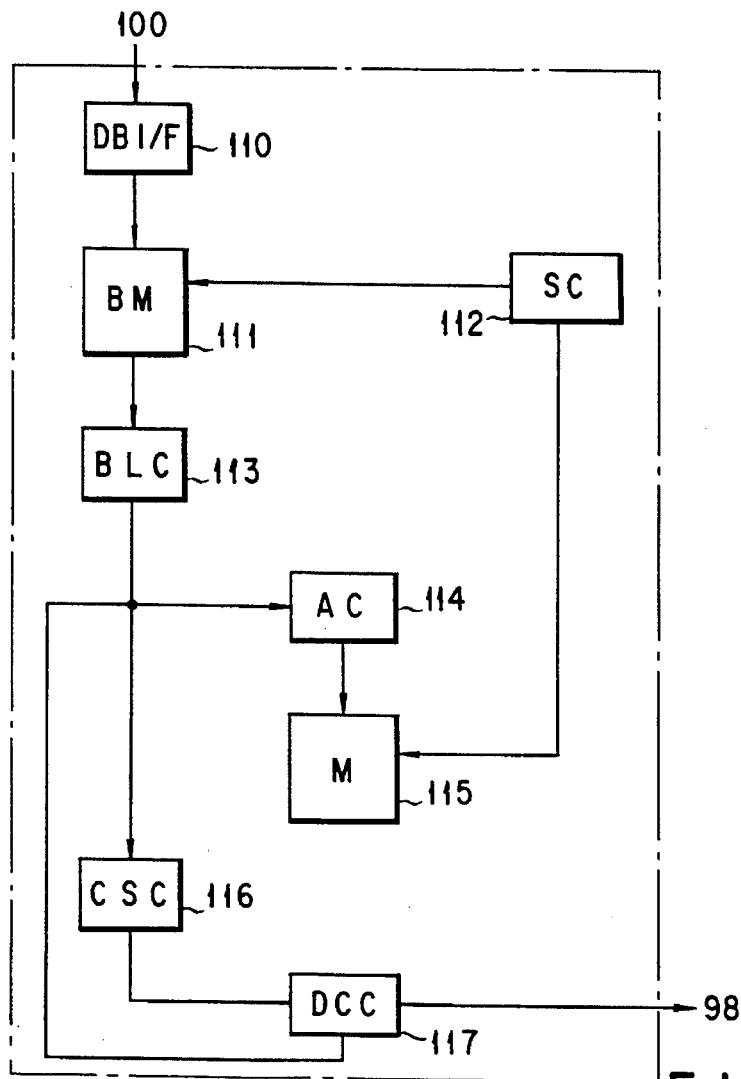
F I G. 17

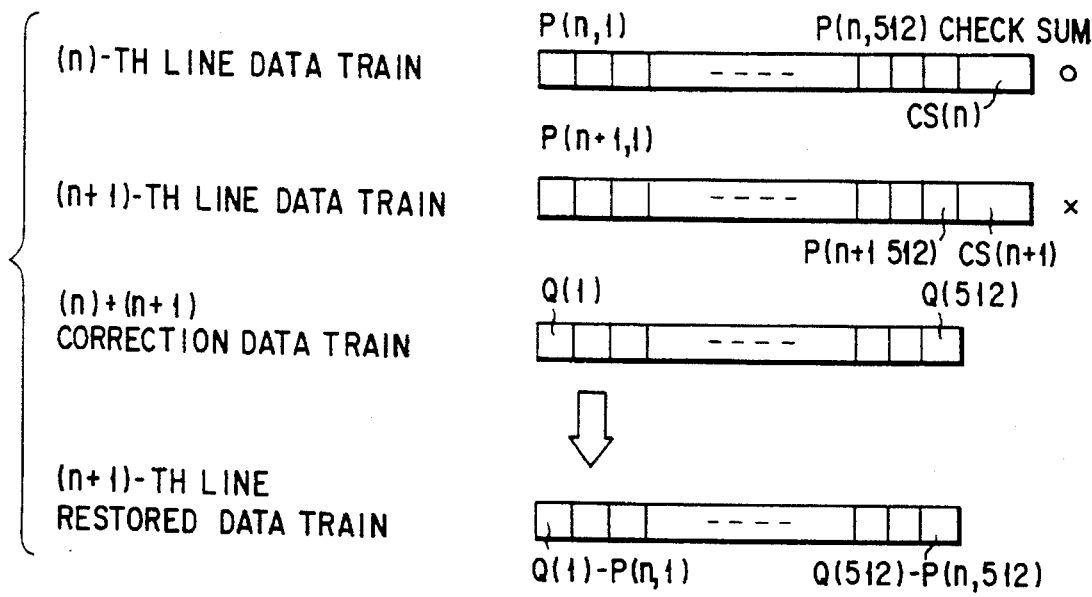
F I G. 22A
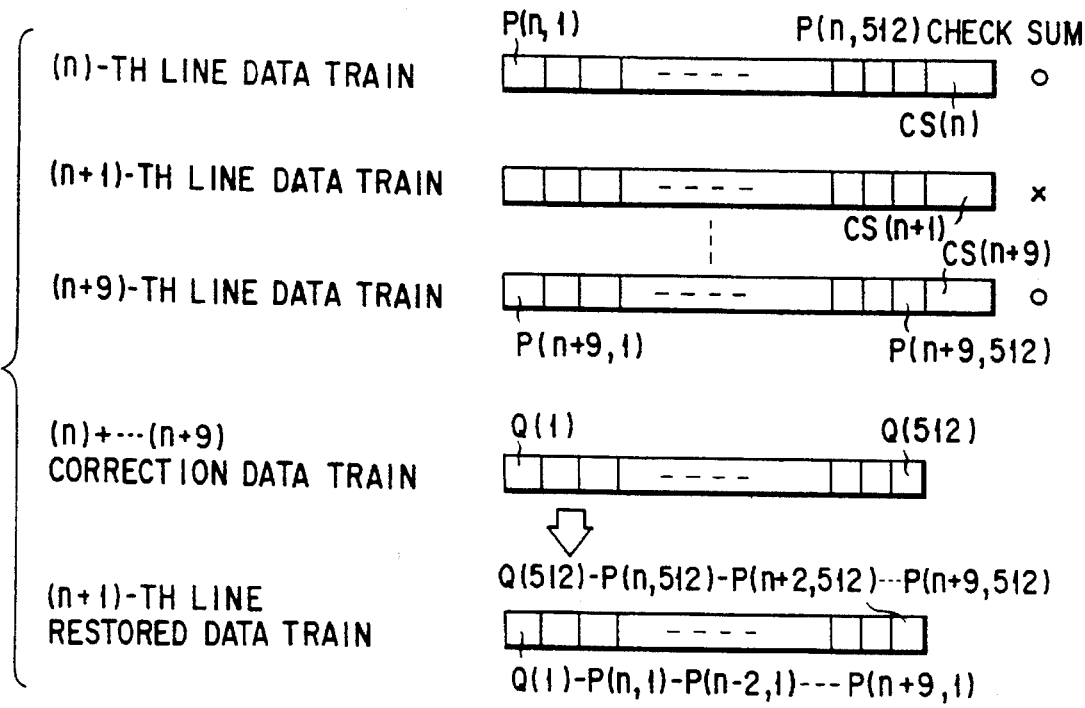
F I G. 22B

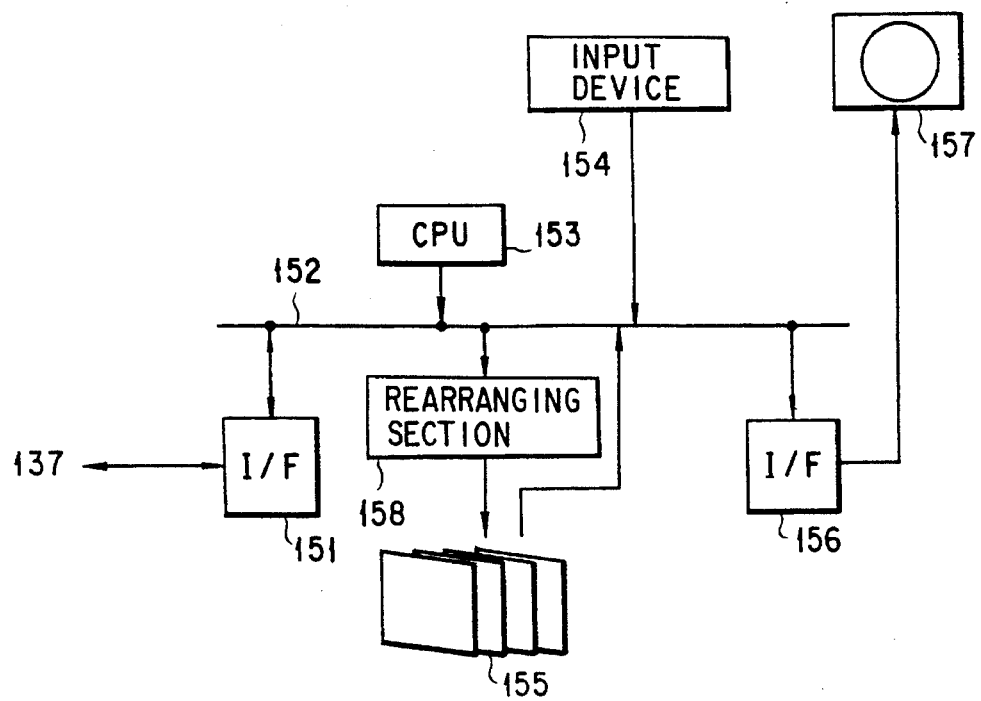
F I G. 27
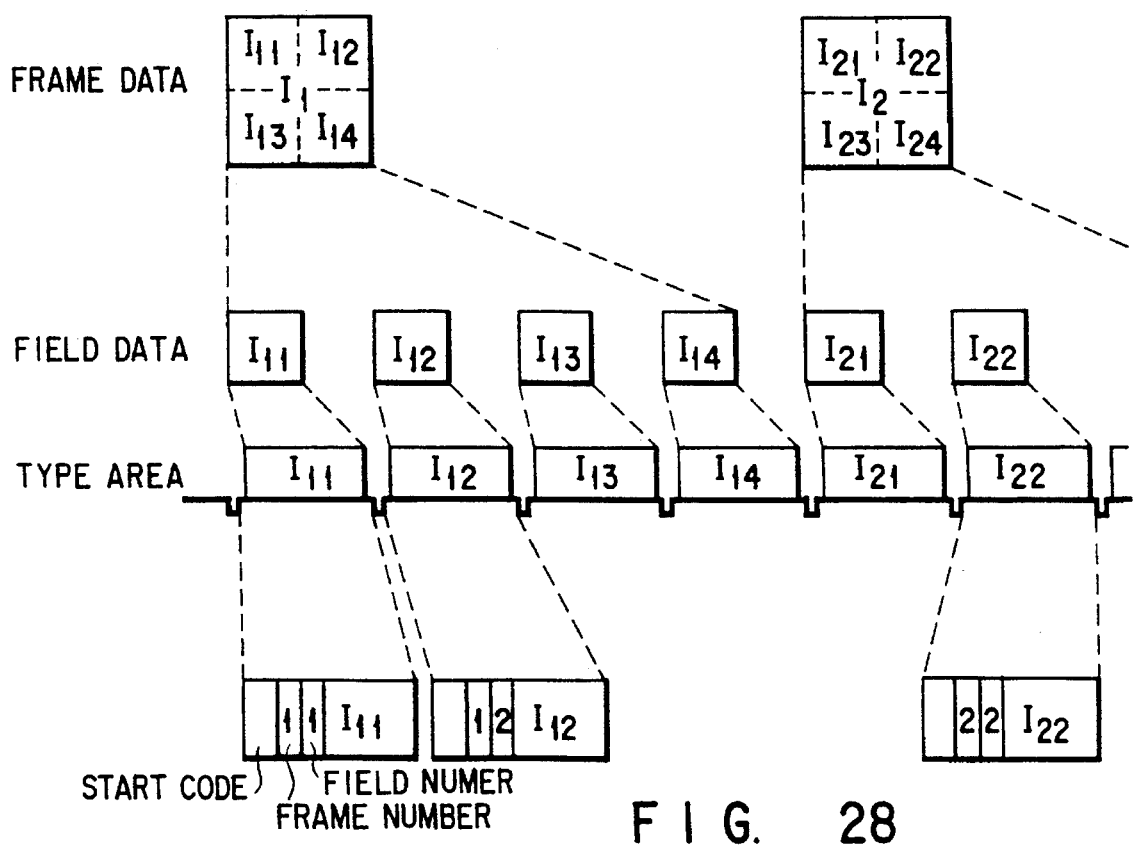
F I G. 28

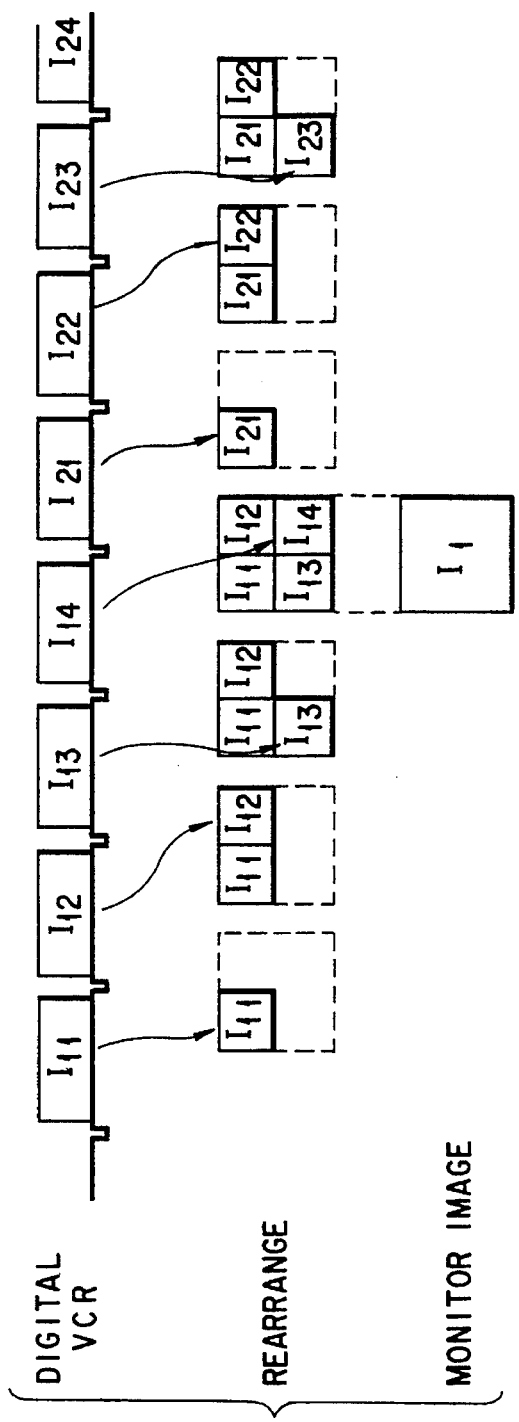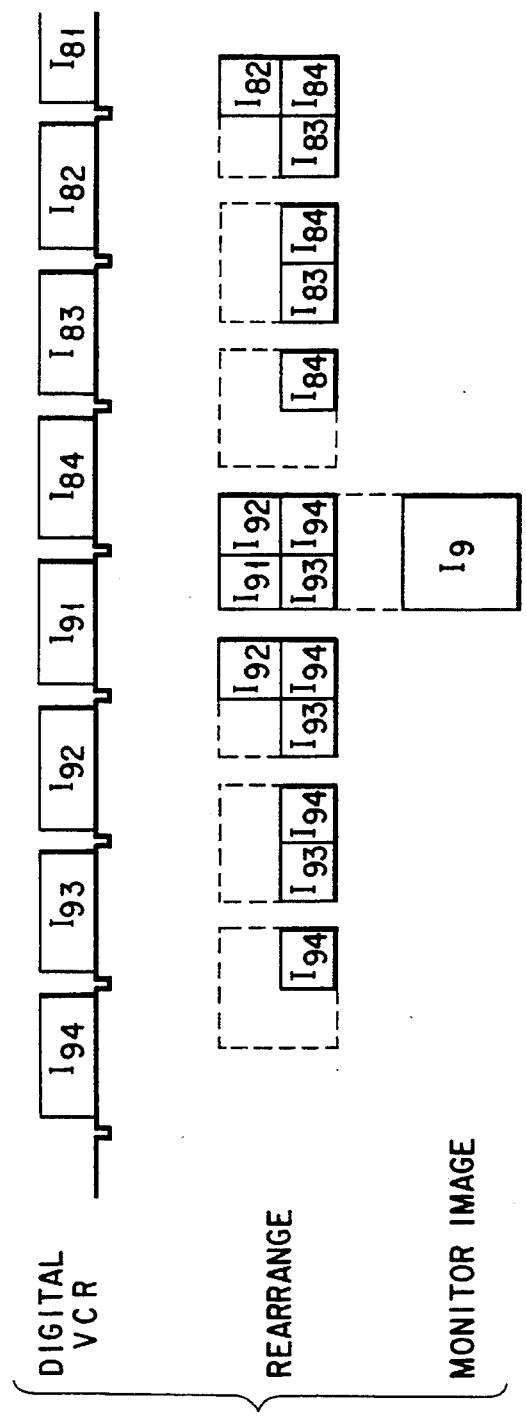

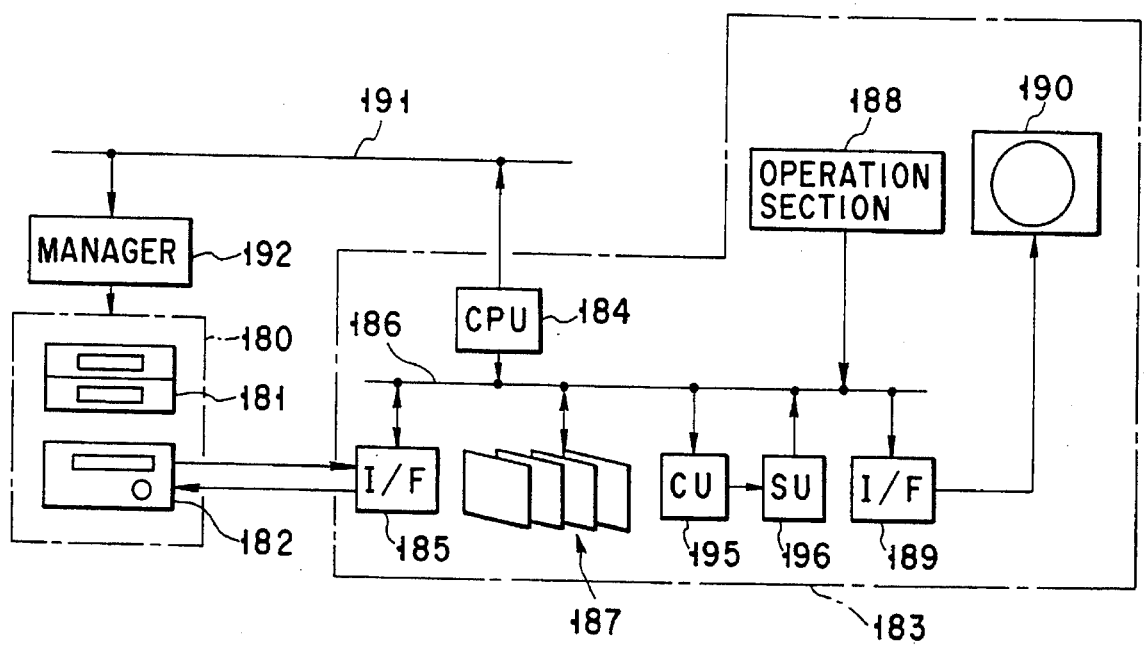
F I G. 36
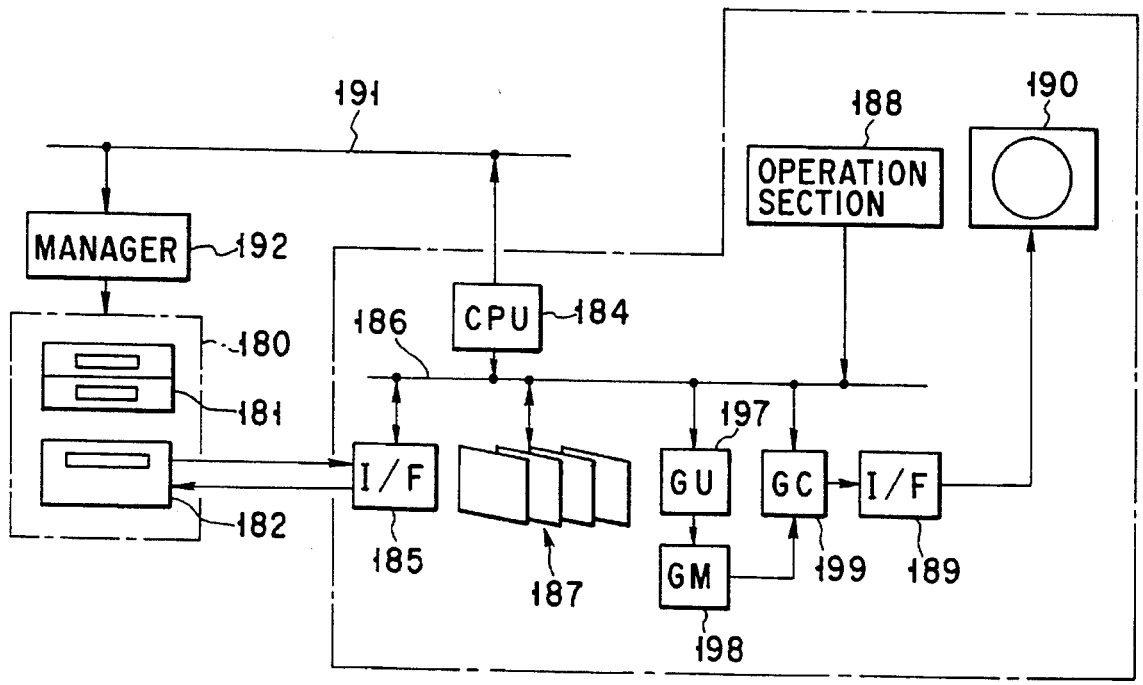
F I G. 37

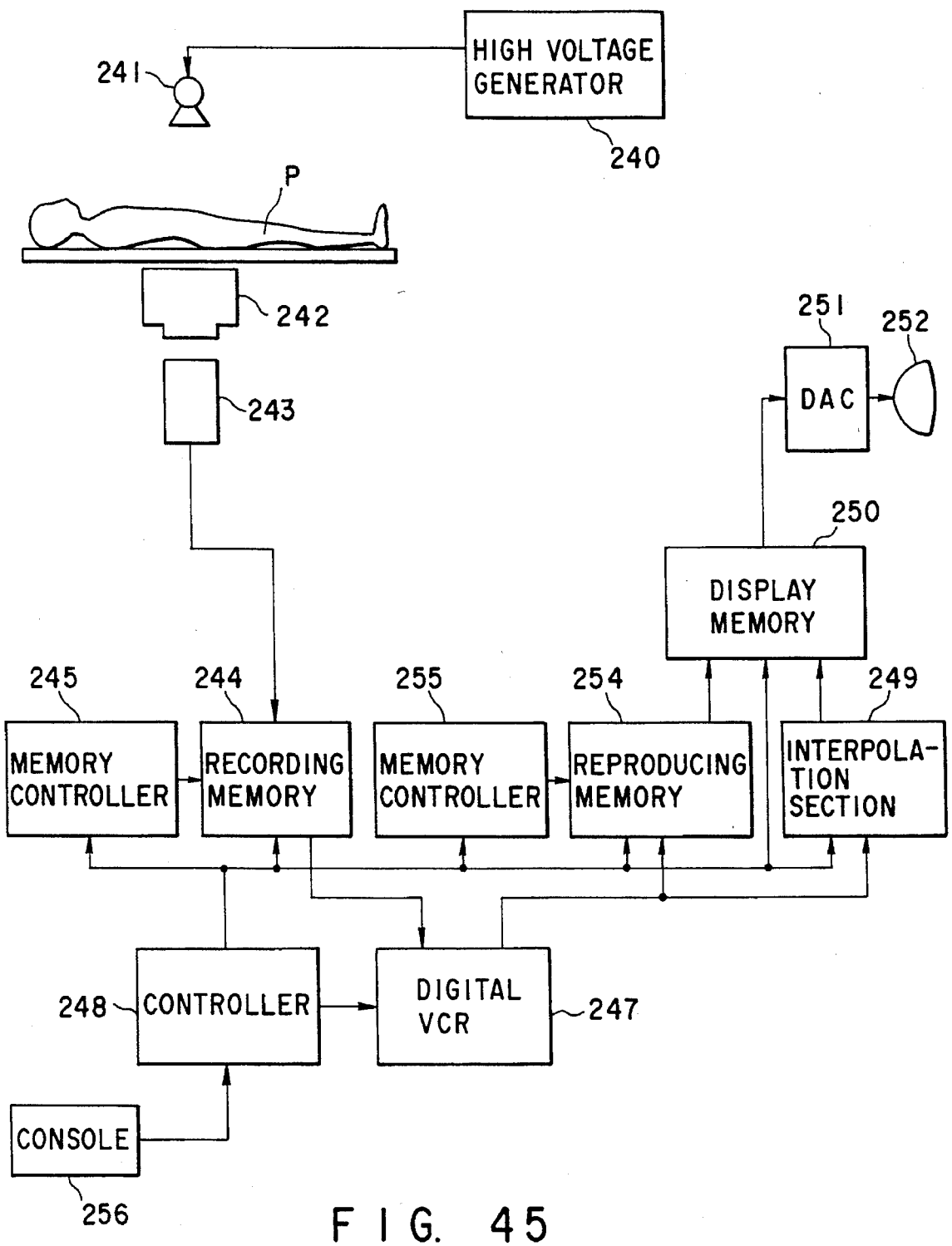
F I G. 45

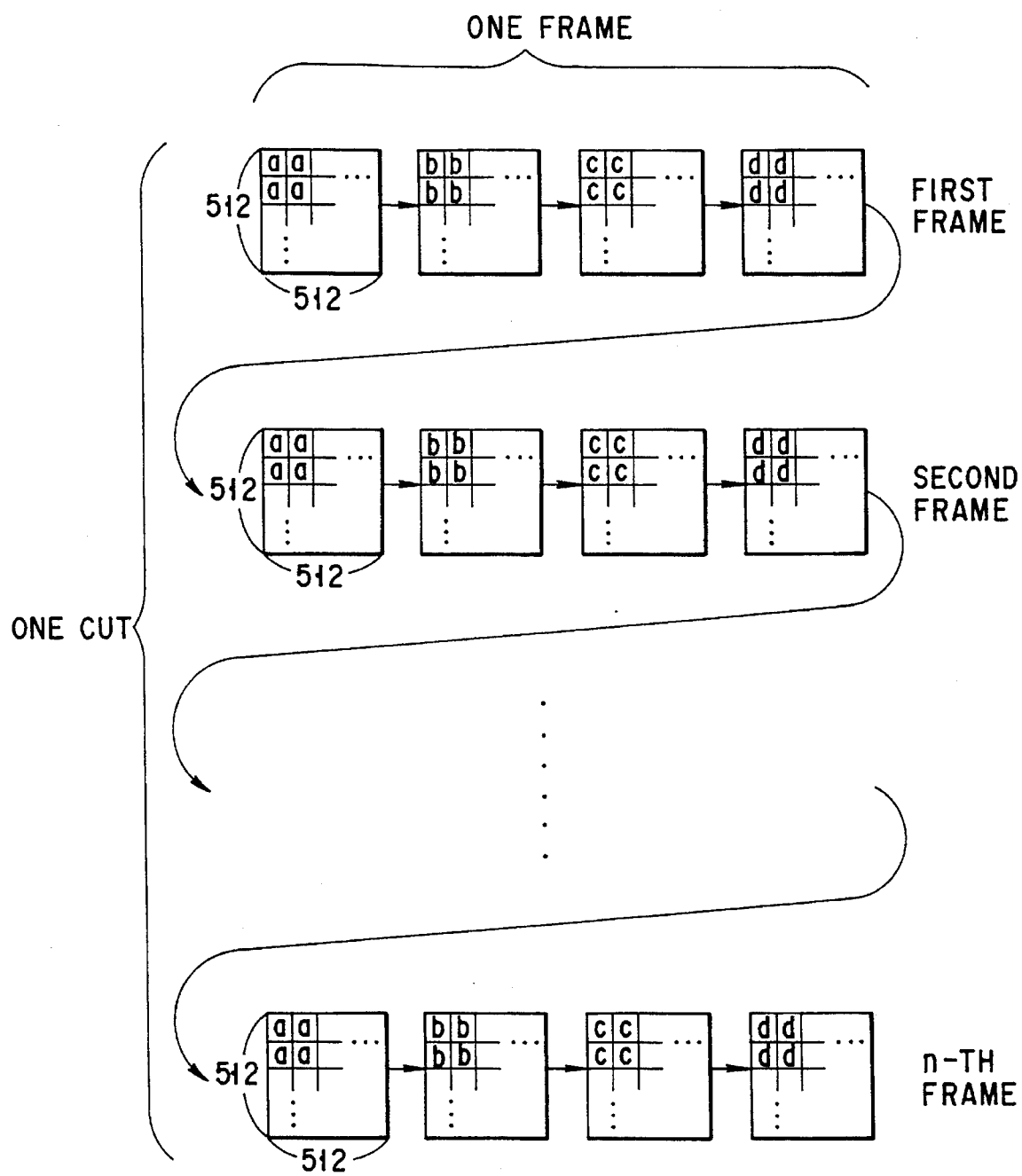
F I G. 50

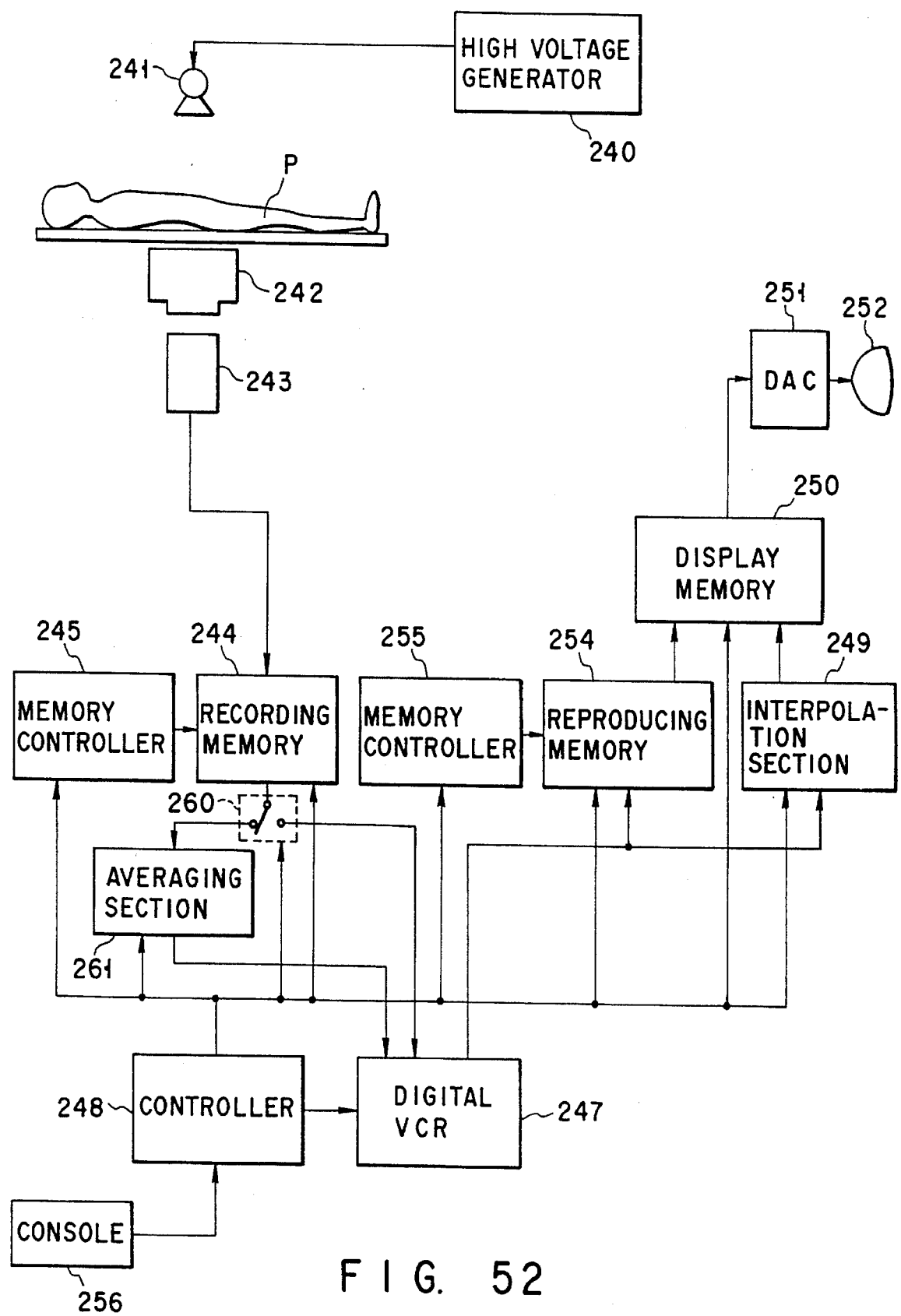
F I G. 52

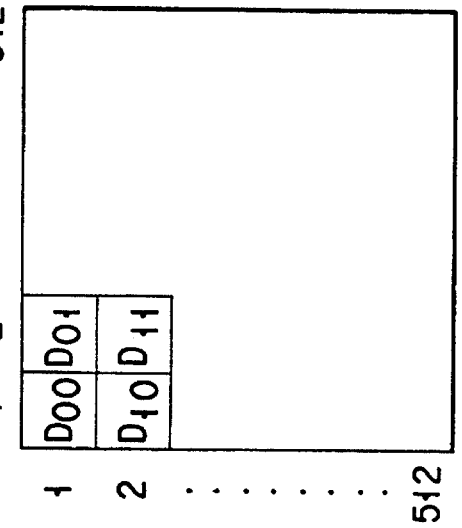
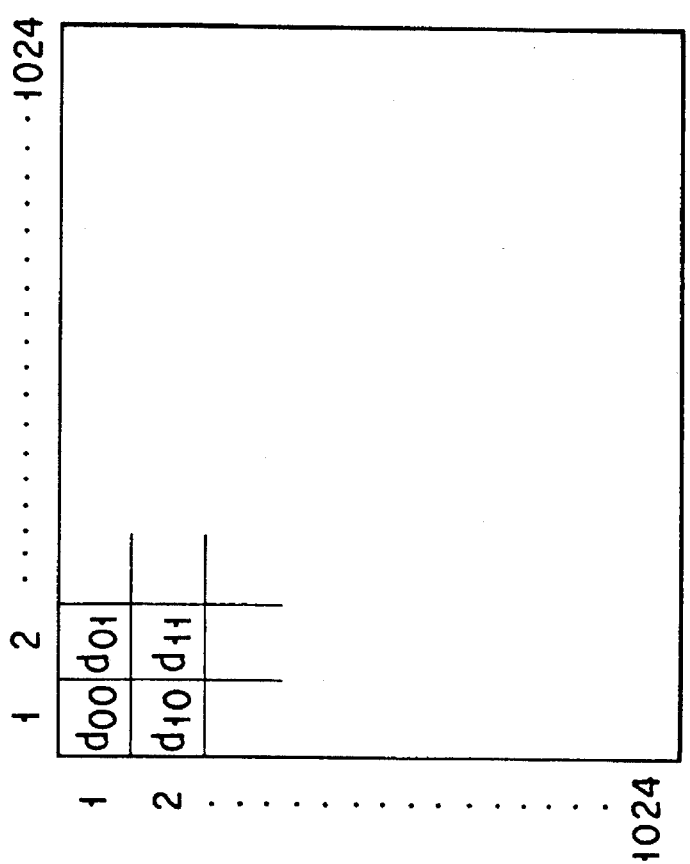
$$D_{ij} = \frac{d_{2i,2j} + d_{2i+1,2j} + d_{2i,2j+1} + d_{2i+1,2j+1}}{4}$$
FIG. 53

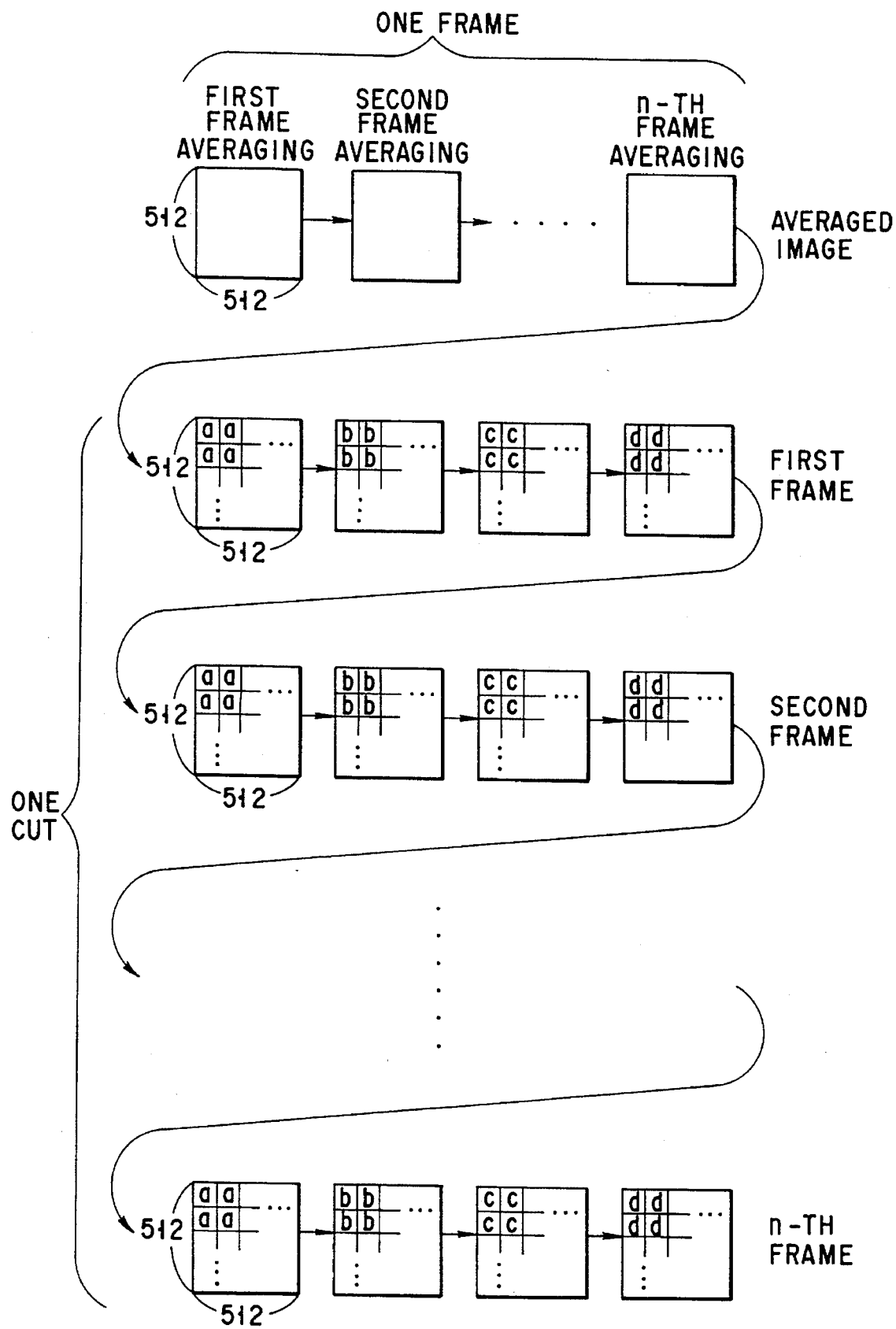
F I G. 55

IMAGE STORAGE APPARATUS

BACKGROUND OF THE INVENTION

1. Field of the Invention

The present invention relates to an image storage apparatus for storing and reproducing digital images.

2. Description of the Related Art

A digital fluorograph device (hereinafter called "DF device") is an X ray diagnosis apparatus to which the digital technology of converting analog video signals from a TV camera into digital signals is applied. There is a digital image storage apparatus which stores and reproduces digital images generated by such a DF device.

FIG. 1 shows the structure of a conventional image storage apparatus which uses a digital video tape as a recording medium. It is assumed in this case that a plurality of DF system 1 and 2 and a plurality of work stations 3, 4 and 5 are located in a hospital. To allow those DF systems 1 and 2 and work stations 3, 4 and 5 to share fewer digital VCRs to shorten the long wait time or similar shortcomings, the DF systems 1 and 2 and the work stations 3–5 share only a cassette library unit 11 and individually have digital VCRs (VTRs) 6 to 10 one each. Cassette exchange by a video cassette changer in the cassette library unit 11 is responsive to the DF systems 1 and 2 and the work stations 3 to 5 under the control of a control unit 12.

This conventional image storage apparatus has the following problems.

First, the conventional apparatus requires digital VCRs equal in number to the total number of work stations and DF systems.

Secondly, two types of images recorded on the same cassette tape cannot be monitored by separate work stations.

Thirdly, since image reproduction is executed using a digital VCR, magnetic heads wear out heavily.

Fourthly, images generated by a DF systems cannot be recorded and reproduced at the same time.

Fifthly, a data error caused by a defect on a video tape, tracking error, crosstalk, etc. cannot be corrected.

The following is the sixth shortcoming. While a 512×512 matrix of data can be written on a single track of a video tape by the NTSC system, images for medical purposes are generally formed in a high definition of a 1024×1024 matrix so that images of a 1024×1024 matrix are divided into four fields to be respectively written on consecutive four tracks. At the time of reproduction, as the tape runs, field data should sequentially be rearranged into one frame to construct one image. This results in various restrictions: the frame rate becomes lower, fast forward playback is not possible and reverse playback is not possible.

SUMMARY OF THE INVENTION

Accordingly, it is a primary object of the present invention to reduce the number of VCRs, it is a secondary object to allow two types of images recorded on the same cassette tape to be monitored by separate work stations, it is a third object to suppress the wearing of magnetic heads of a VCR, it is a fourth object to permit images, generated by a DF device, to be recorded and reproduced simultaneously, it is a fifth object to permit a data error to be corrected, and it is a sixth object to overcome the aforementioned conventional restrictions of the low frame rate and the fast forward playback and the reverse playback being disabled.

To achieve the above objects, according to one aspect of this invention, there is provided an image storage apparatus comprising:

a plurality of dynamic image generating means for generating dynamic image data;

a plurality of work stations for displaying dynamic image data as dynamic images;

a plurality of temporary storage means for temporarily storing dynamic image data;

a plurality of video tape recorders each for recording dynamic image data on a video tape and reproducing dynamic image data therefrom;

a matrix switcher, intervening among the plurality of dynamic image generating means, the work stations, the plurality of temporary storage means and the video tape recorders, for switching connections thereamong; and control means for controlling the matrix switcher in such a manner that one of the plurality of temporary storage means and one of the video tape recorders are assigned to any dynamic image generating means which has generated the dynamic image data and the assigned video tape recorder is connected via the assigned temporary storage means to the dynamic image generating means which has generated dynamic image data, and one of the plurality of temporary storage means and one of the video tape recorders are assigned to any work station which has made a playback request, the assigned video tape recorder is connected via the assigned temporary storage means to the work station which has made the playback request.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 7 is an explanatory diagram of the operation under the first circumstance;

3

Figure 2:
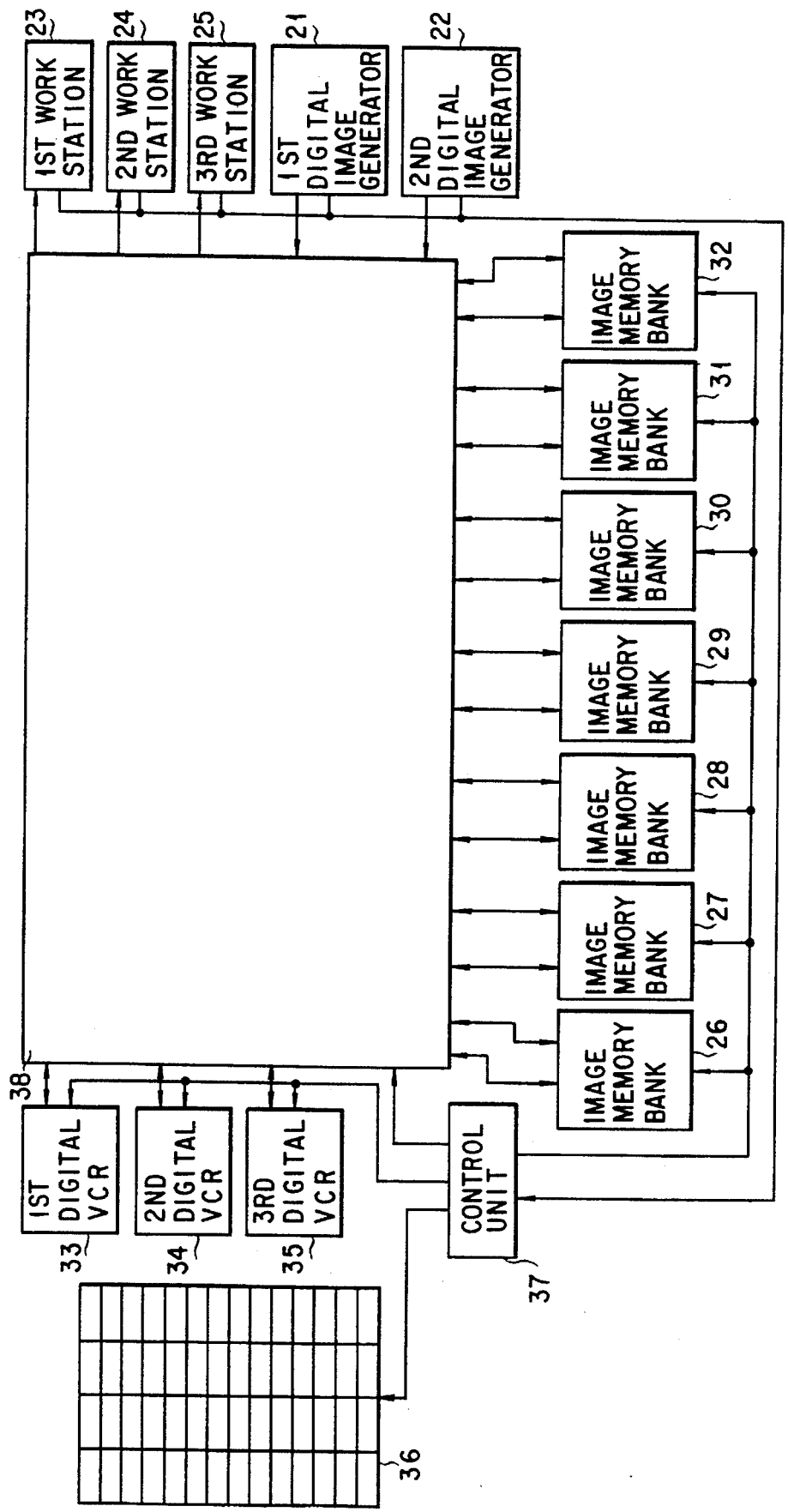
FIG. 2 is a structural diagram of an image storage apparatus according to a first embodiment of the present invention.
Figure 11:
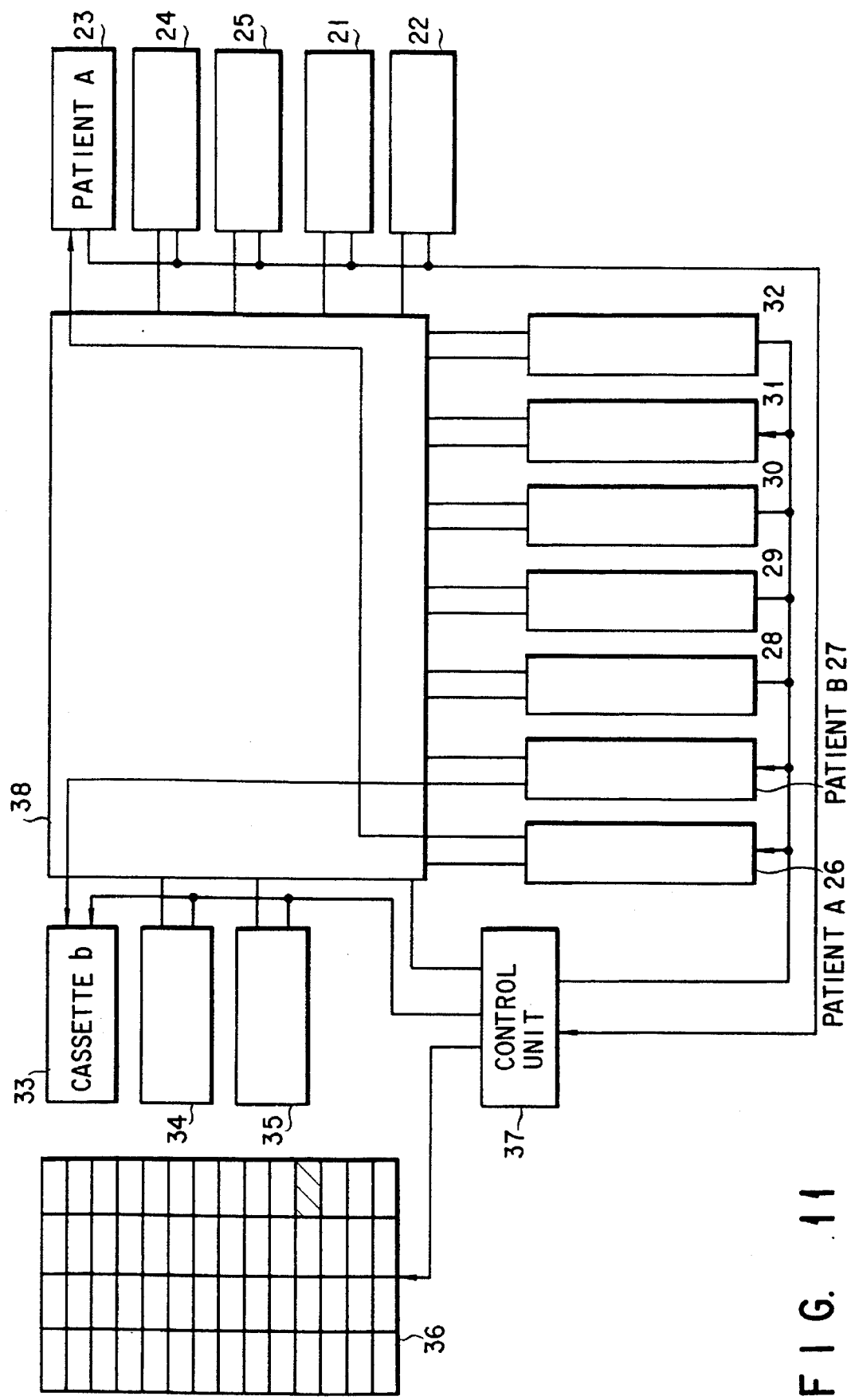
Figure 12:
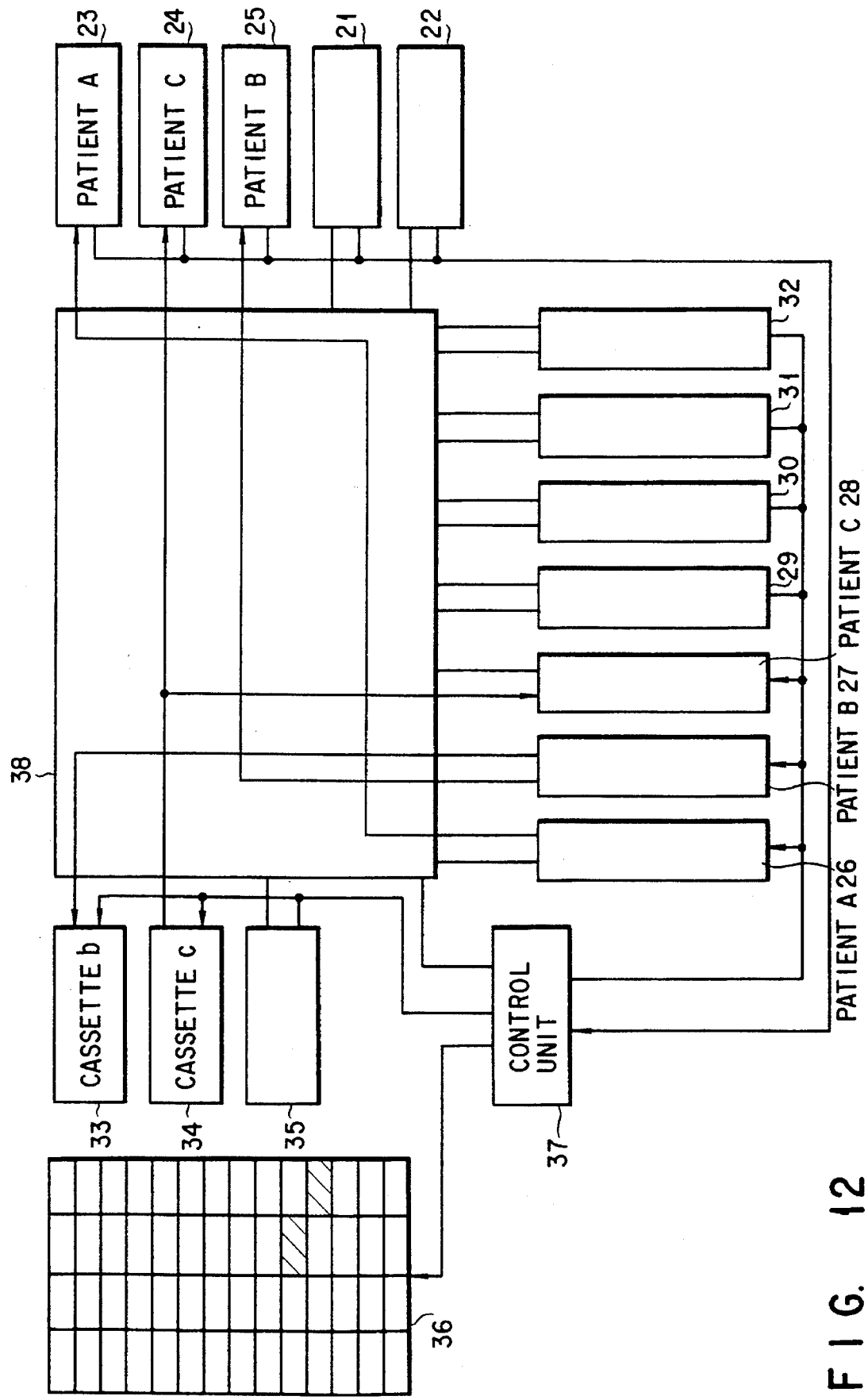
Figure 13:
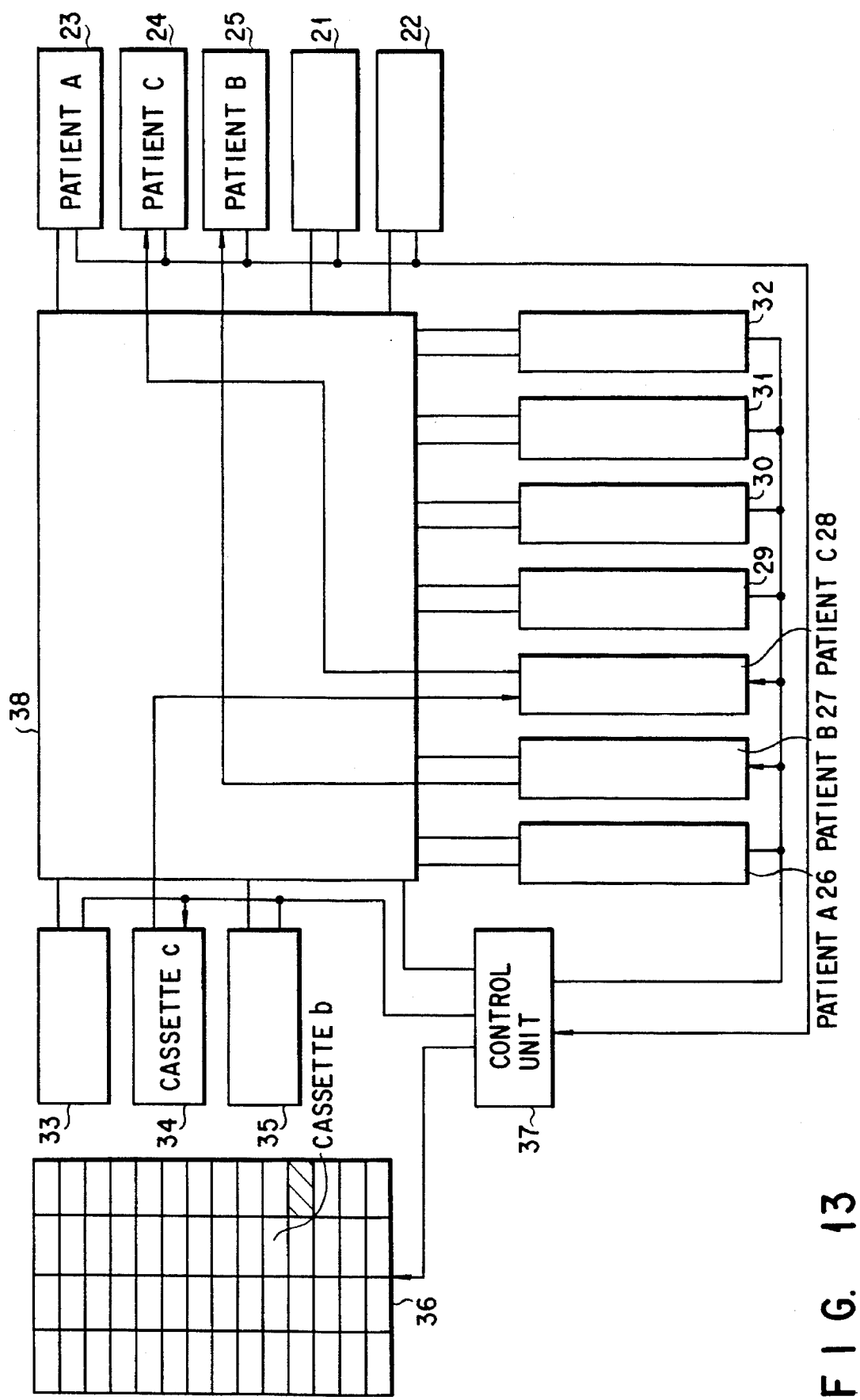
Figure 18:
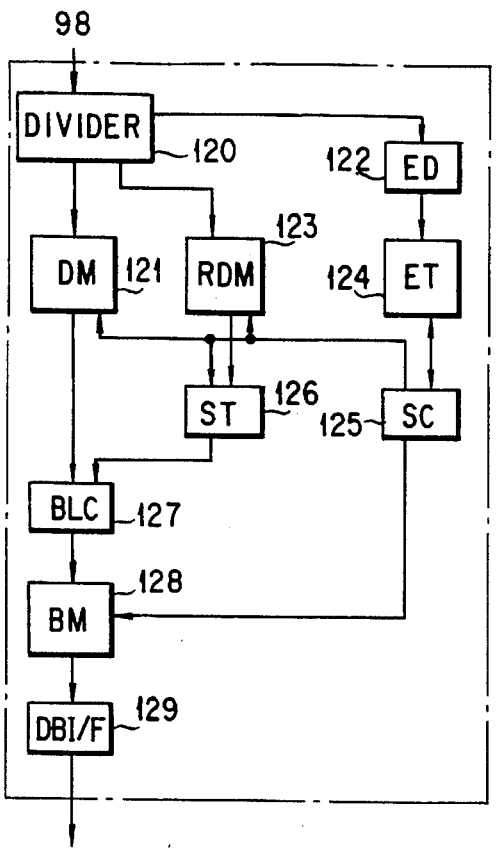
Figure 19:
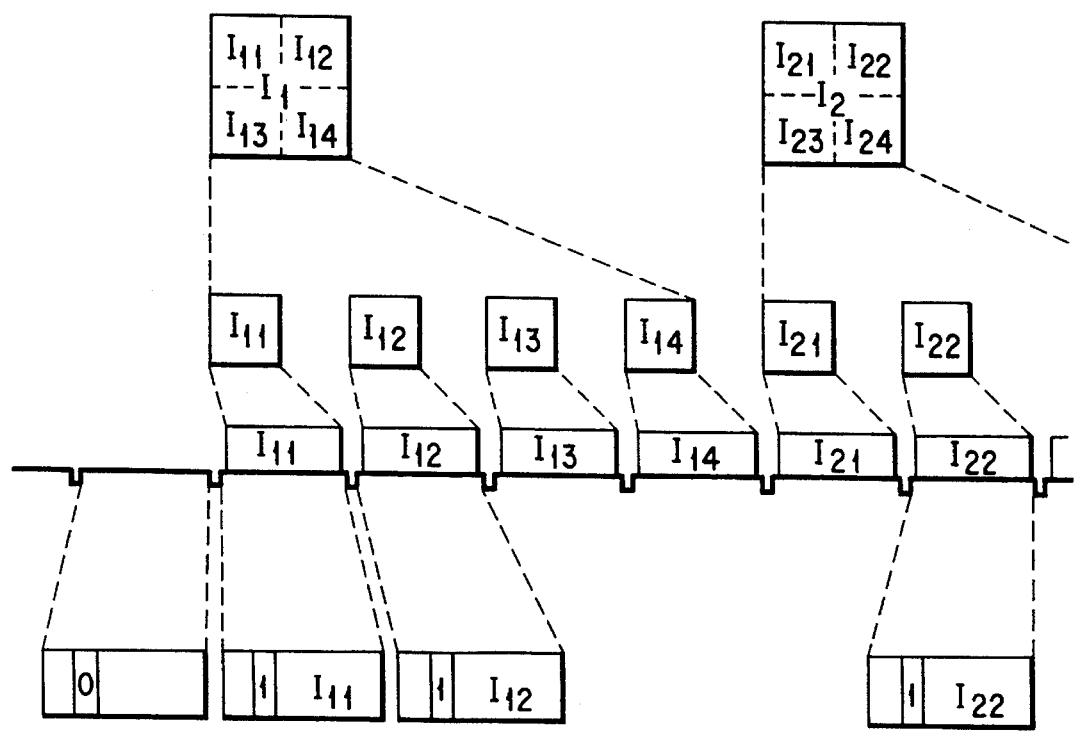
Figure 20:
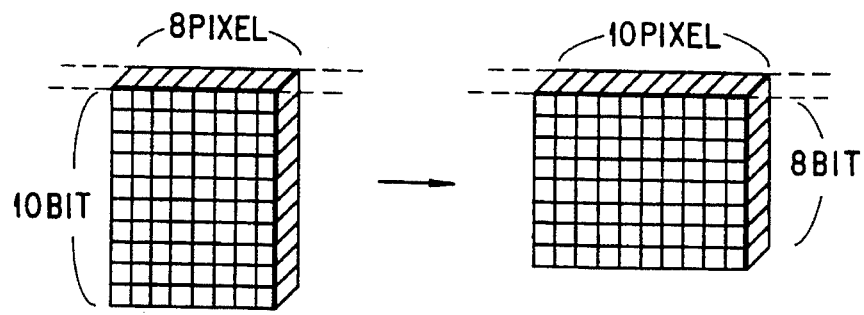
Figure 25:
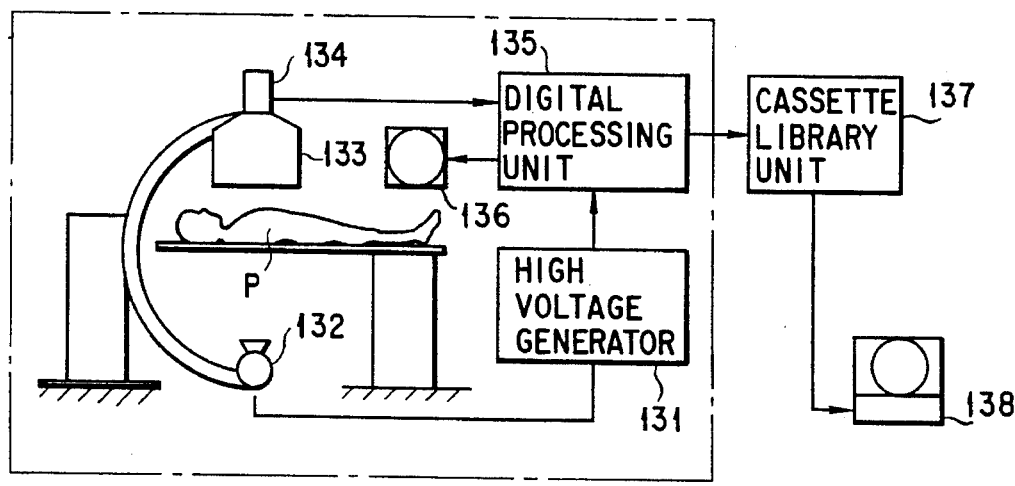
Figure 26:
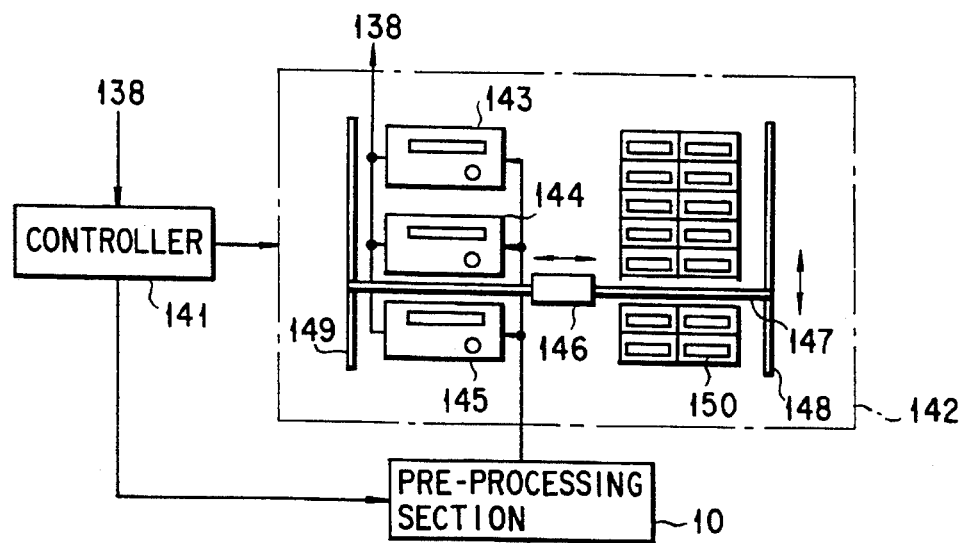
Figure 21A:
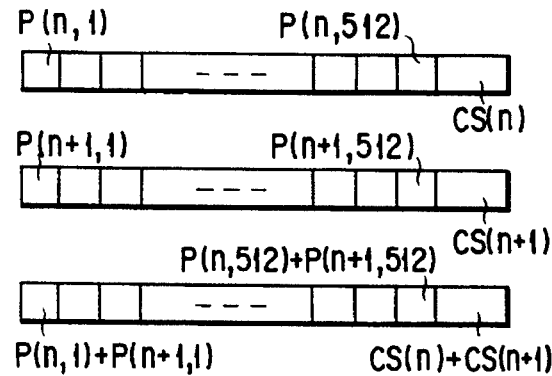
Figure 21B:
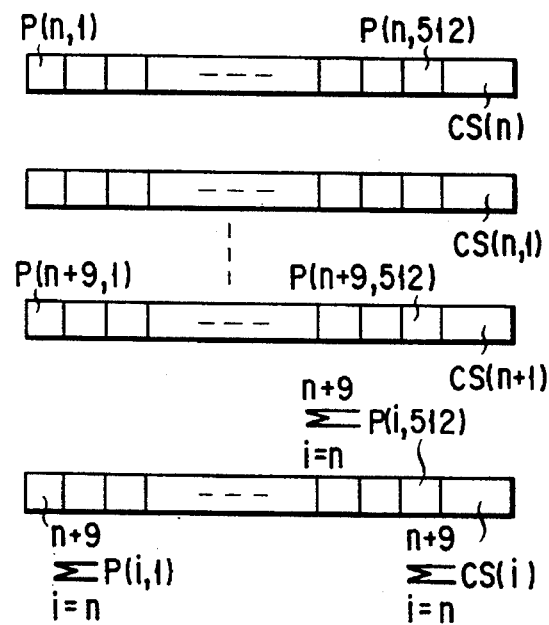
Figure 21C:
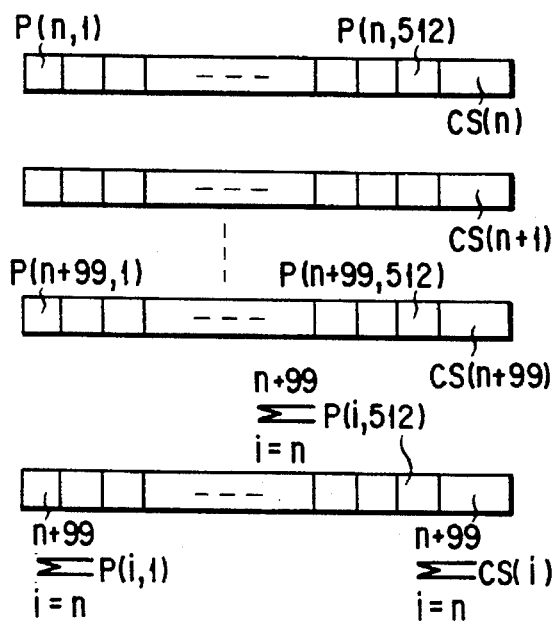
Figure 23:
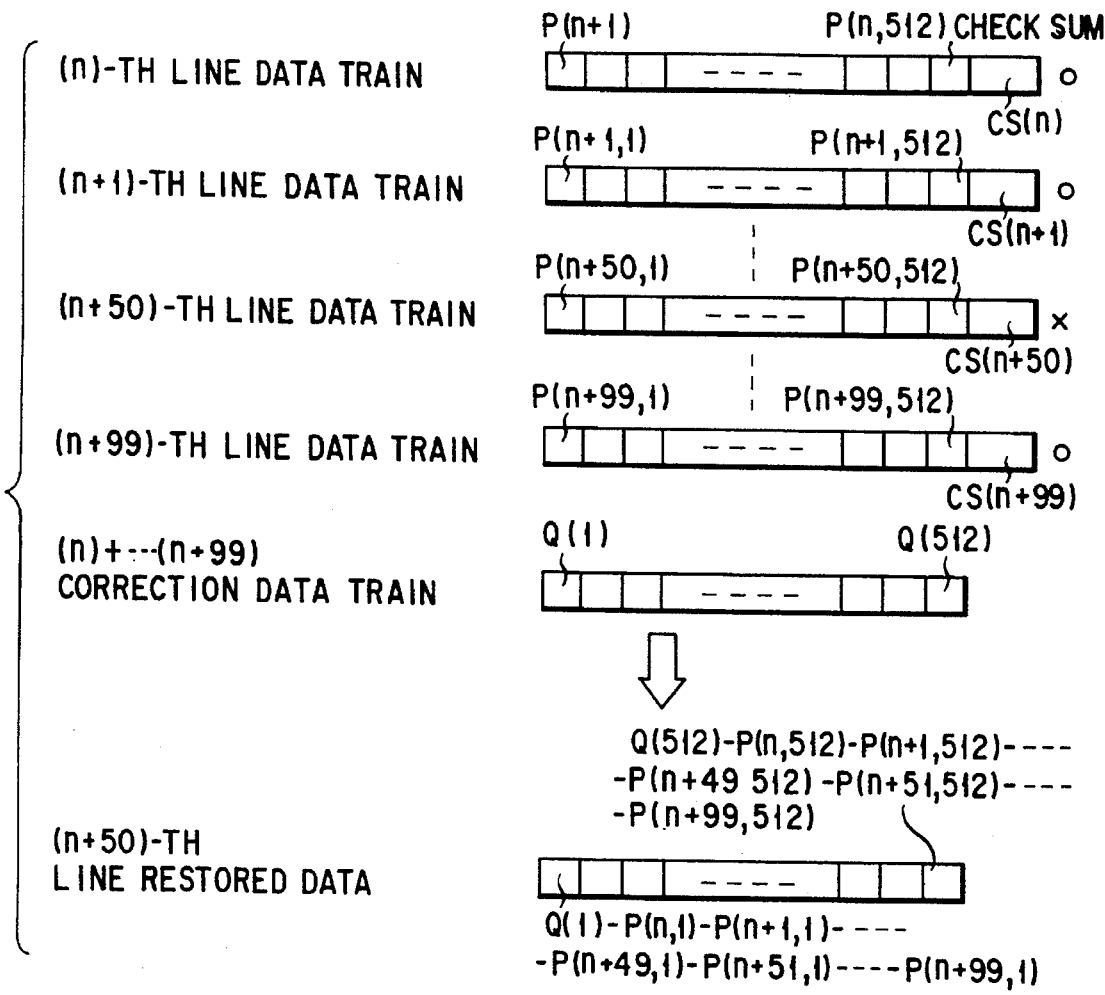
Figure 24:
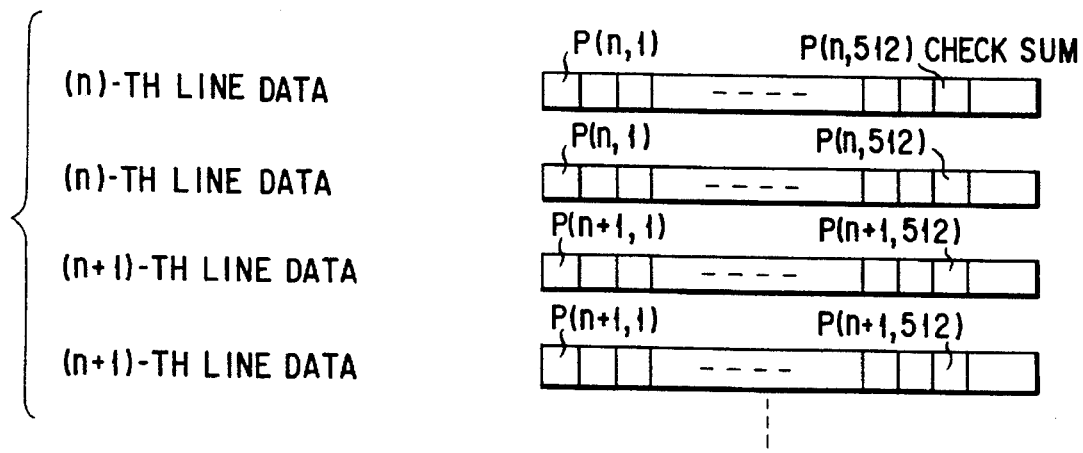
Figure 31:
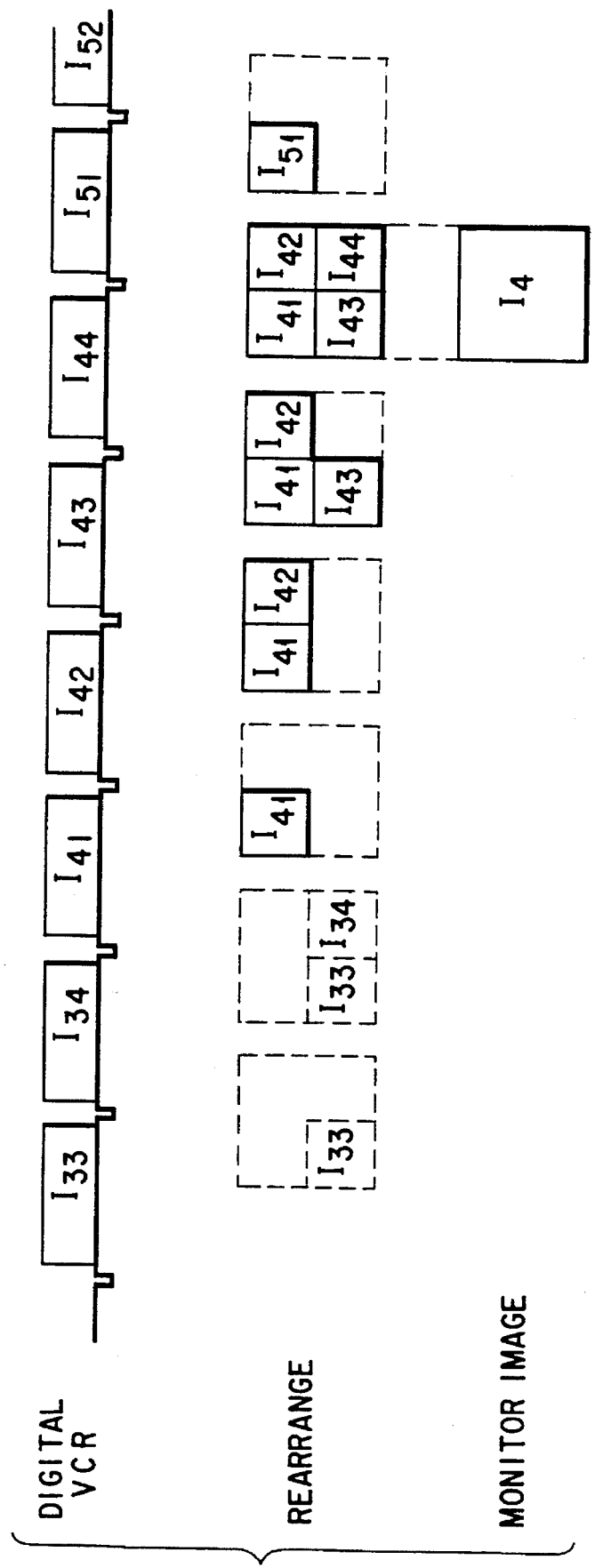
Figure 32:
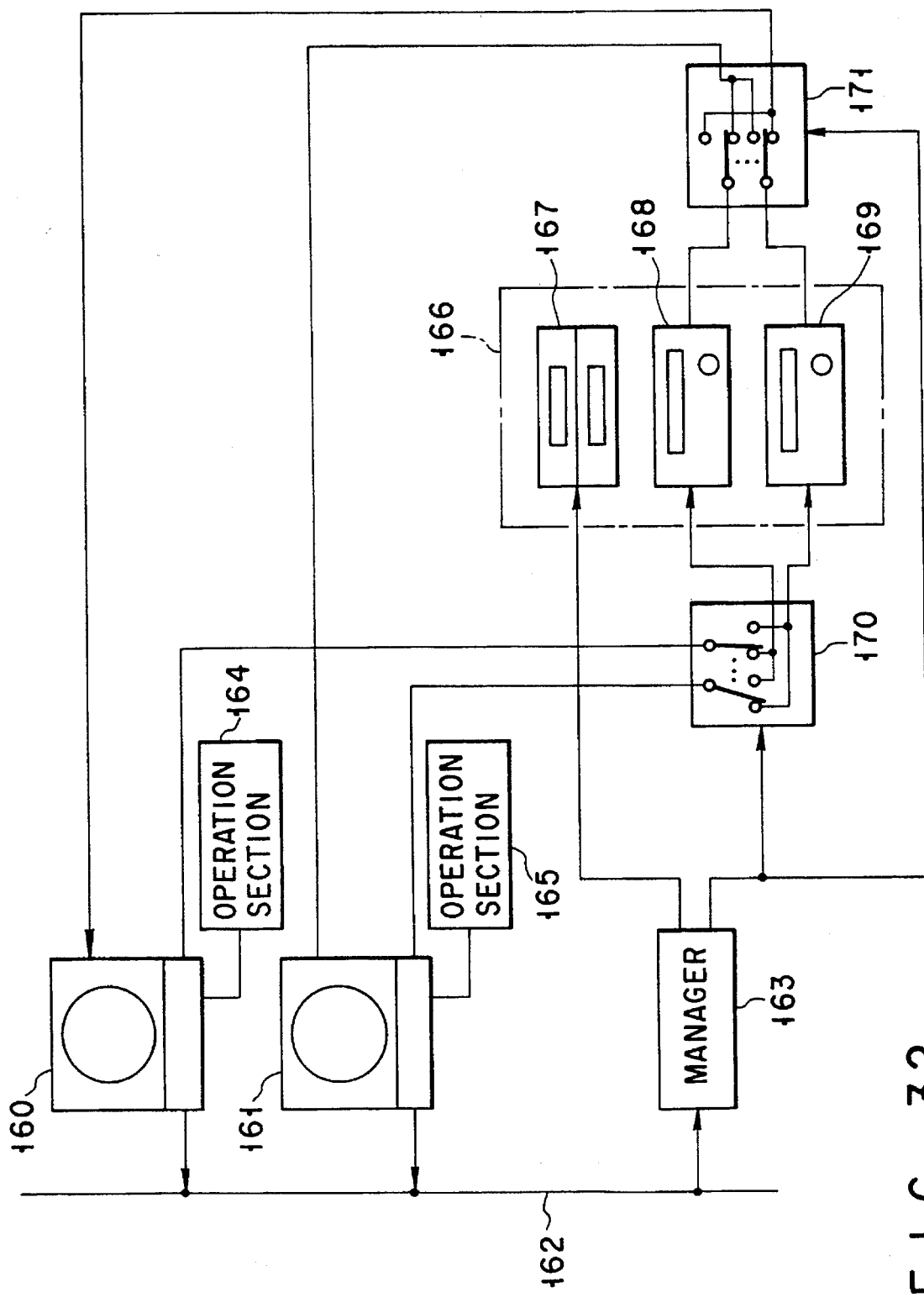
Figure 33:
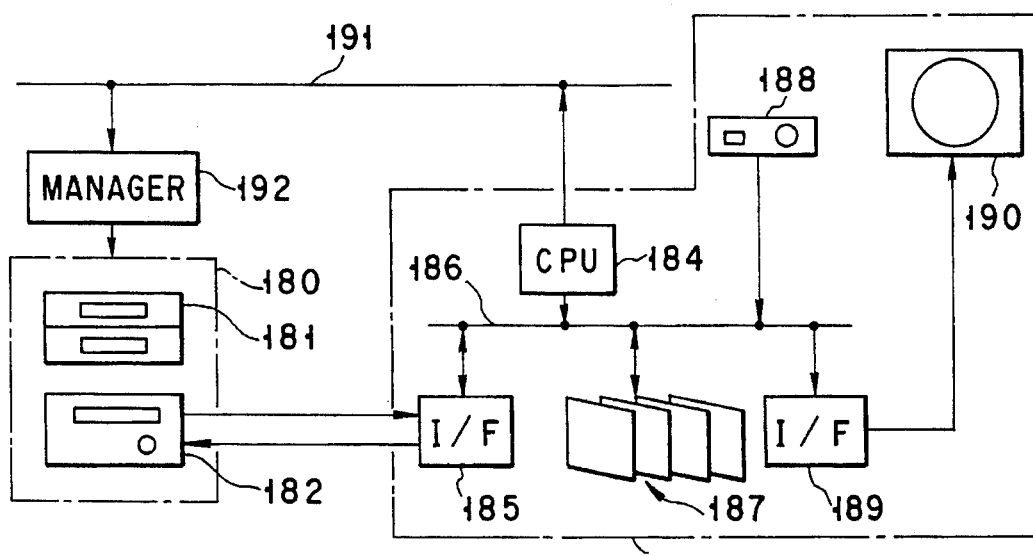
Figure 34:
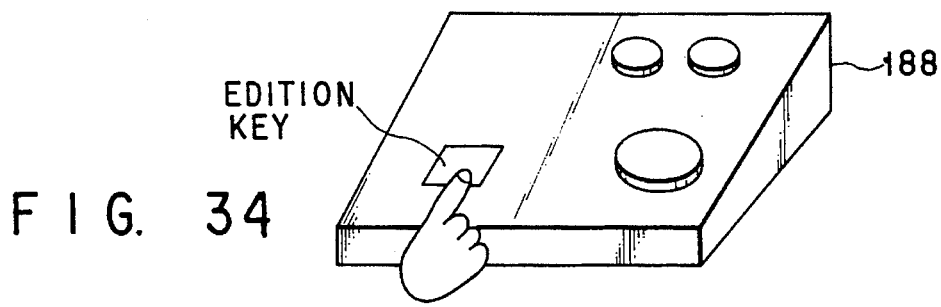
Figure 35:
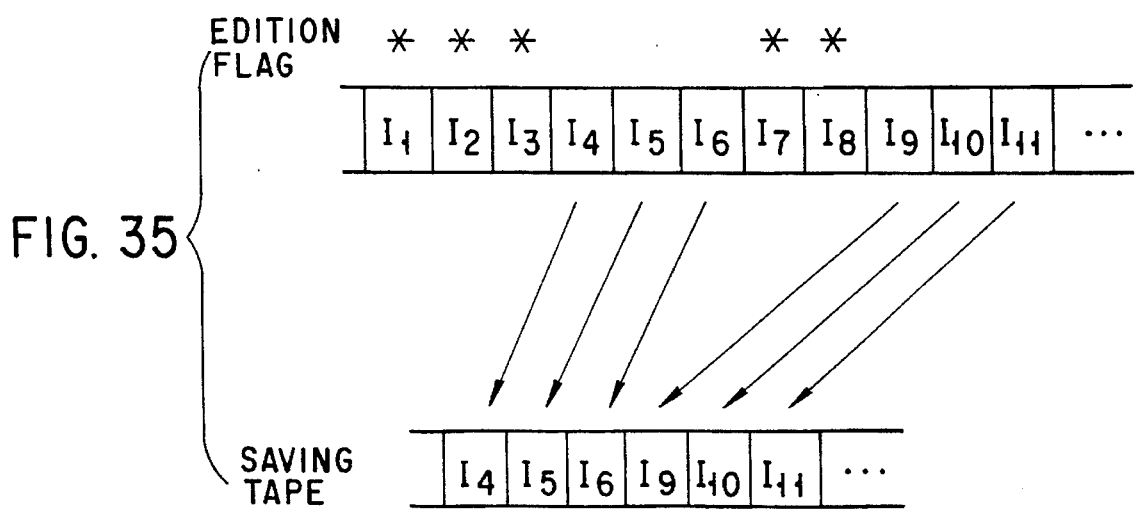
Figure 38:
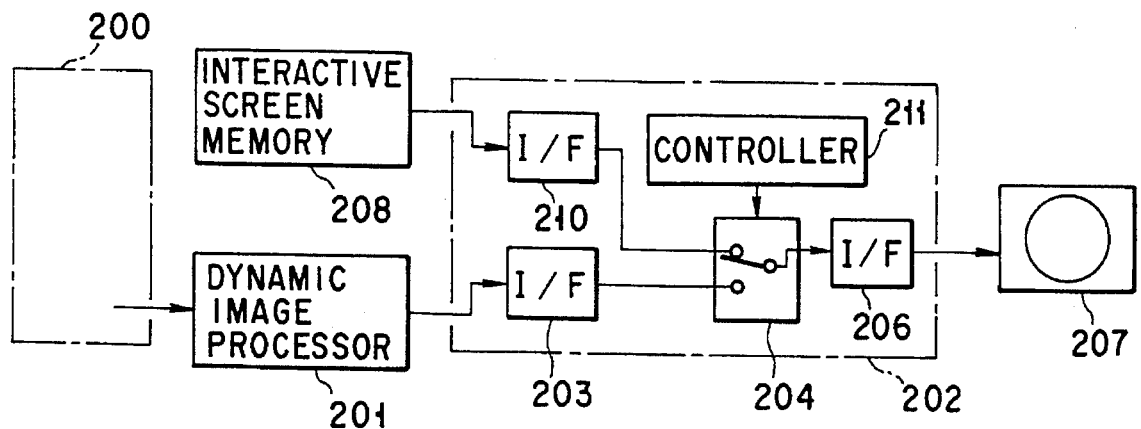
Figure 39:
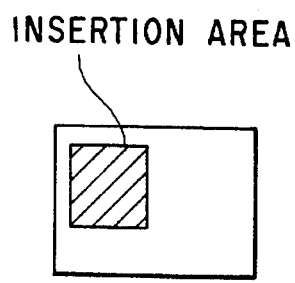
Figure 40:
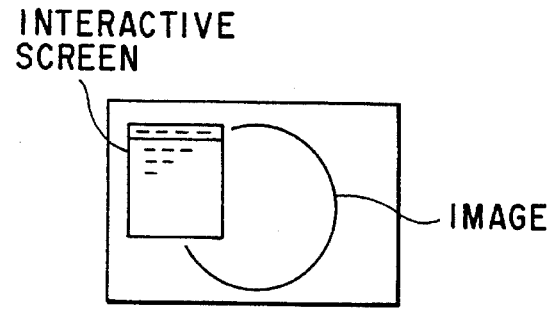
Figure 41:
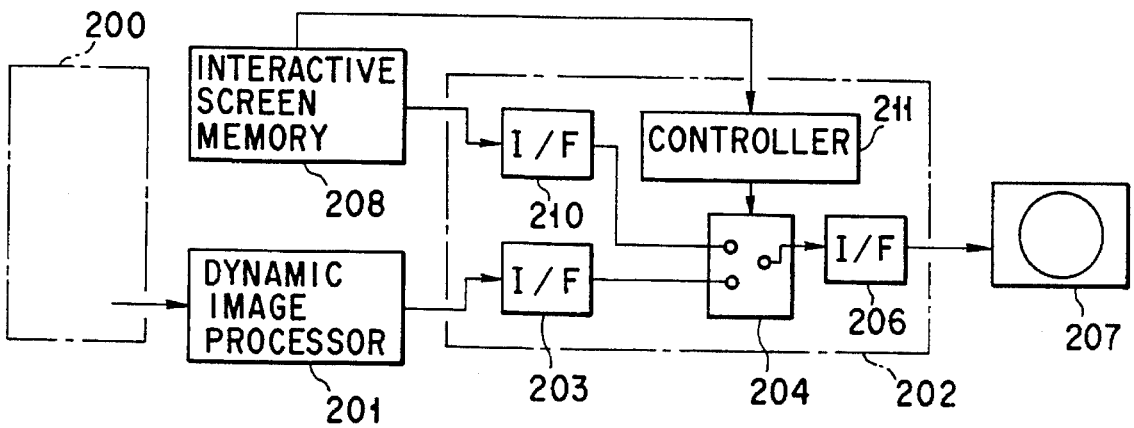

FIG. 11 is an explanatory diagram of the operation under the fifth circumstance;

FIG. 12 is an explanatory diagram of the operation under the sixth circumstance;

FIG. 13 is an explanatory diagram of the operation under the seventh circumstance;

FIG. 14 is a time chart for explaining another operation of the image storage apparatus in FIG. 2;

FIG. 15 is a structural diagram of an image storage apparatus according to a second embodiment;

FIG. 16 is a block diagram of a digital processing unit in FIG. 15;

FIG. 17 is a block diagram of a recording section in a VCR interface in FIG. 16;

FIG. 18 is a block diagram of a reproducing section in the VCR interface in FIG. 16;

FIG. 19 is an explanatory diagram of an operation of writing data on a VCR;

FIG. 20 is an explanatory diagram of a bit length conversion;

FIGS. 21A to 21C are diagrams showing trains of data according to the second embodiment;

FIGS. 22A and 22B are diagrams for explaining how to correct a data error according to the second embodiment;

FIG. 23 is a diagram for explaining another way of correcting a data error;

FIG. 24 is a diagram showing different trains of data according to the second embodiment;

FIG. 25 is a structural diagram of an image storage apparatus according to a third embodiment;

FIG. 26 is a structural diagram of a cassette library unit in FIG. 25;

FIG. 27 is a block diagram of a work station unit in FIG. 25;

FIG. 28 is an explanatory diagram of a recording process by a pre-processing section in FIG. 26;

FIG. 29 is a diagram for explaining an image reconstruction by the work station in FIG. 25 at the time of playback;

FIG. 30 is a diagram for explaining an image reconstruction by the work station in FIG. 25 at the time of reverse playback;

FIG. 31 is a diagram for explaining another image reconstruction by the work station in FIG. 25 at the time of playback;

FIG. 32 is a structural diagram of an image storage apparatus according to a fourth embodiment;

FIG. 33 is a structural diagram of an image storage apparatus according to a fifth embodiment;

FIG. 34 is a perspective view of a console in FIG. 33;

FIG. 35 is a diagram showing the relation between generated images and recorded images;

FIG. 36 is a structural diagram showing a first modification of the image storage apparatus in FIG. 33;

FIG. 37 is a structural diagram showing a second modification of the image storage apparatus in FIG. 33;

FIG. 38 is a structural diagram of an image storage apparatus according to a sixth embodiment;

FIG. 39 is a diagram showing an insertion area in one frame;

FIG. 40 is a diagram exemplifying the display screen of a monitor in FIG. 38;

FIG. 41 is a structural diagram showing a first modification of the image storage apparatus in FIG. 38;

4

Figure 42:
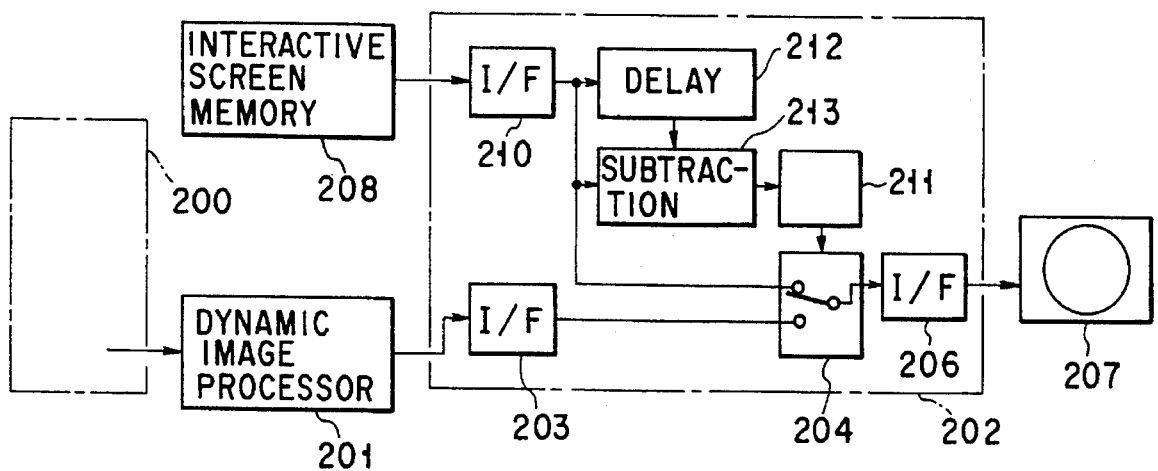
Figure 43:
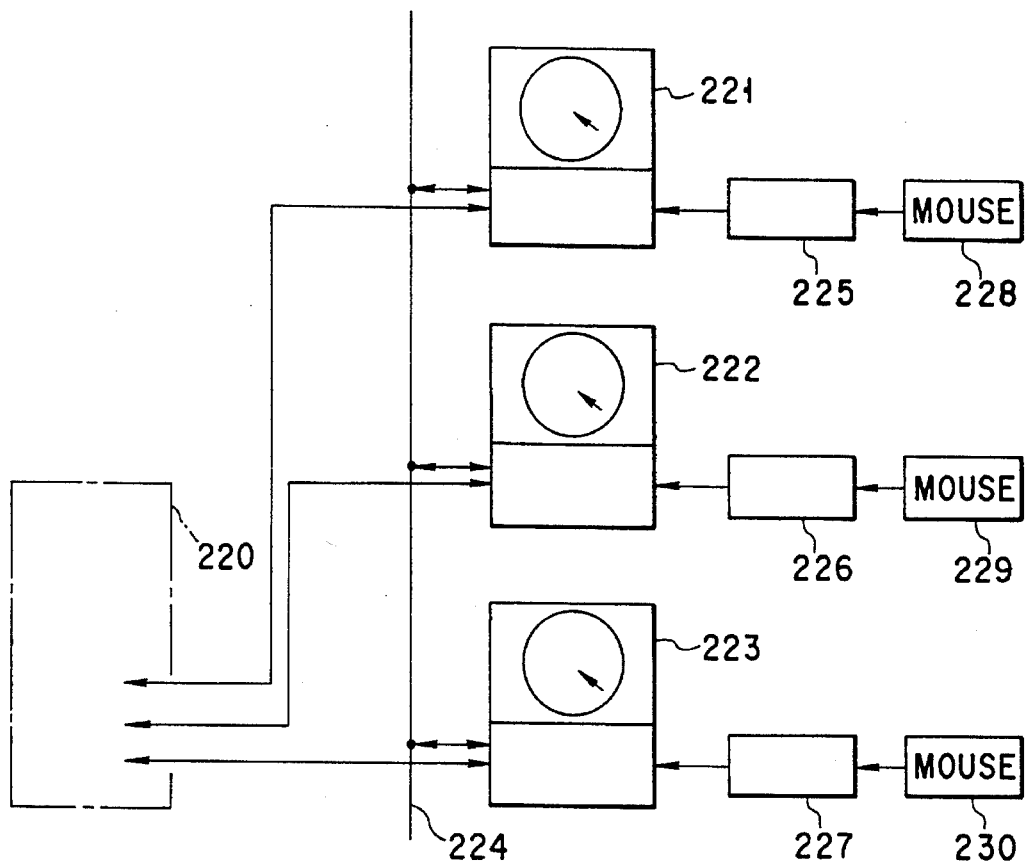
Figure 44A:
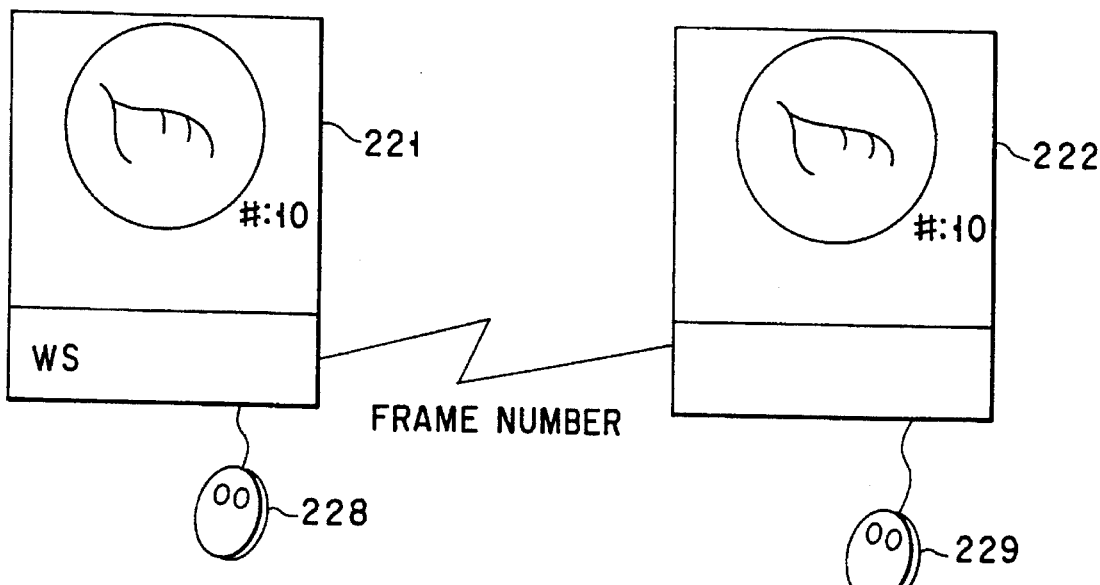
Figure 44B:
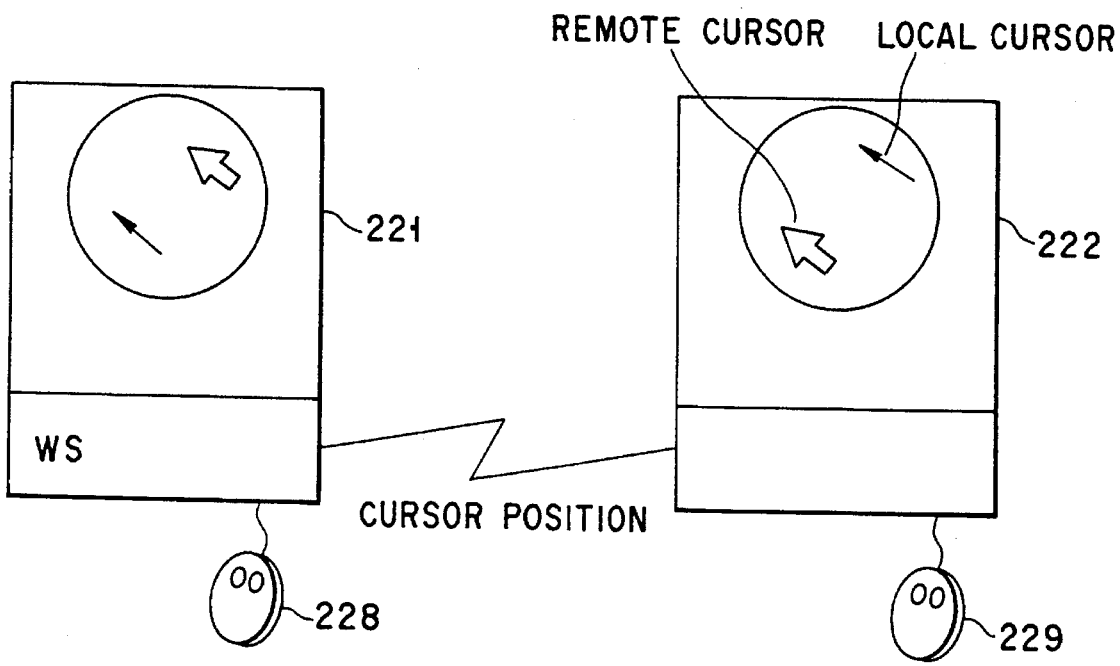
Figure 46:
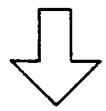
Figure 47:
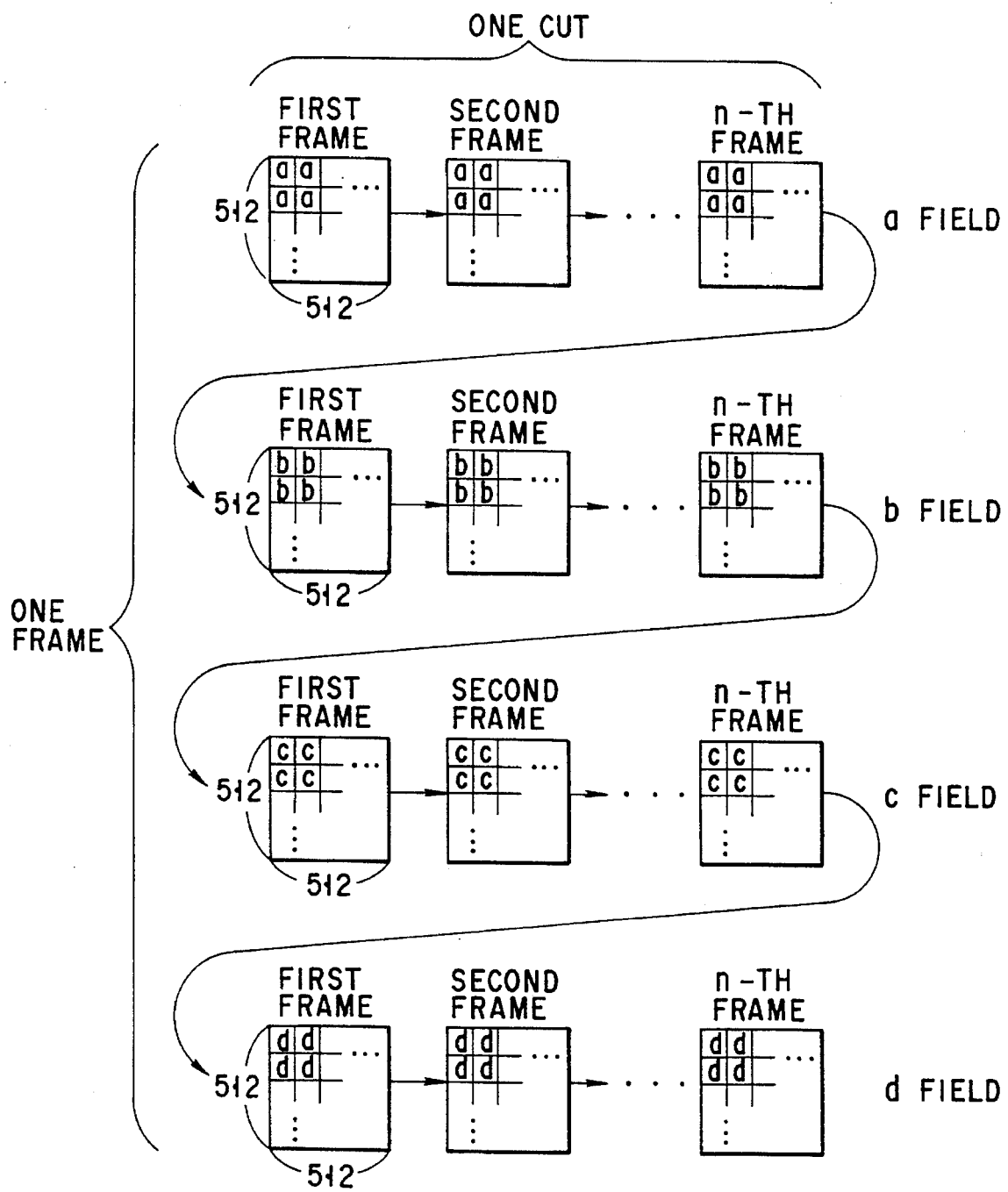
Figure 48:
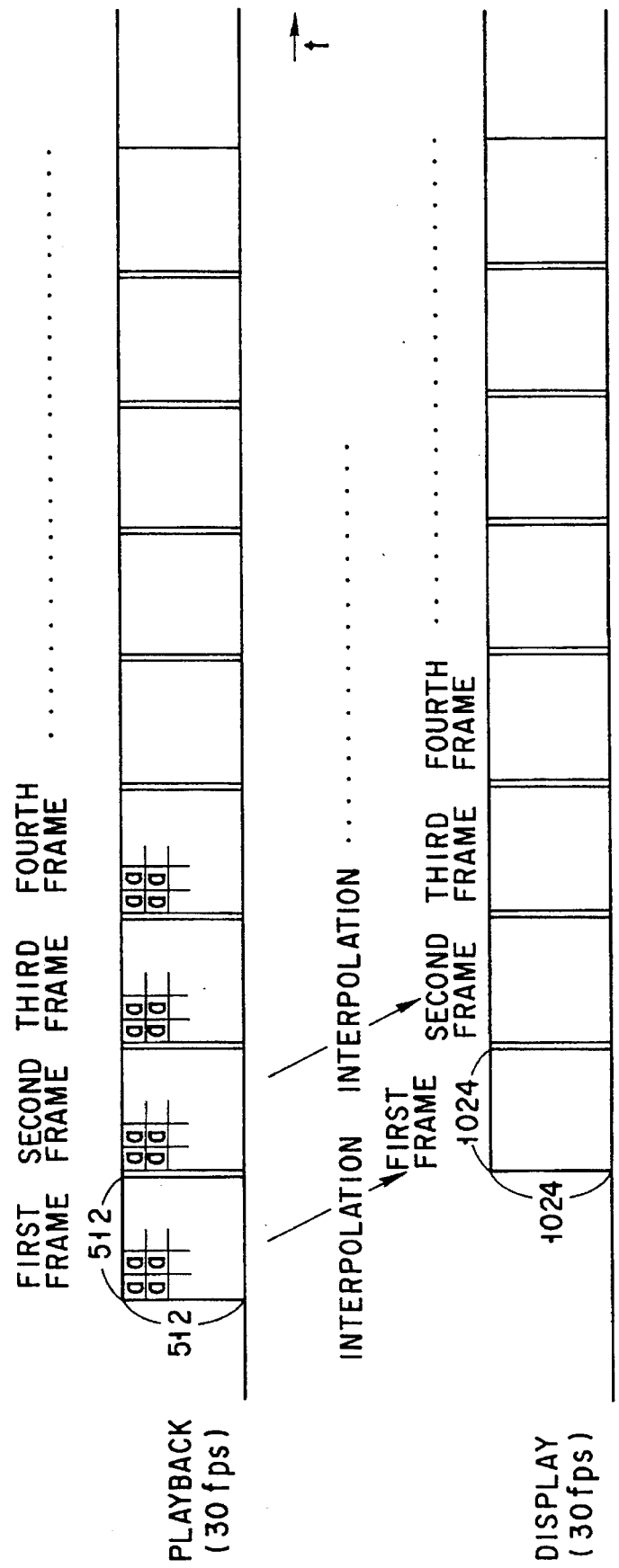
Figure 49:
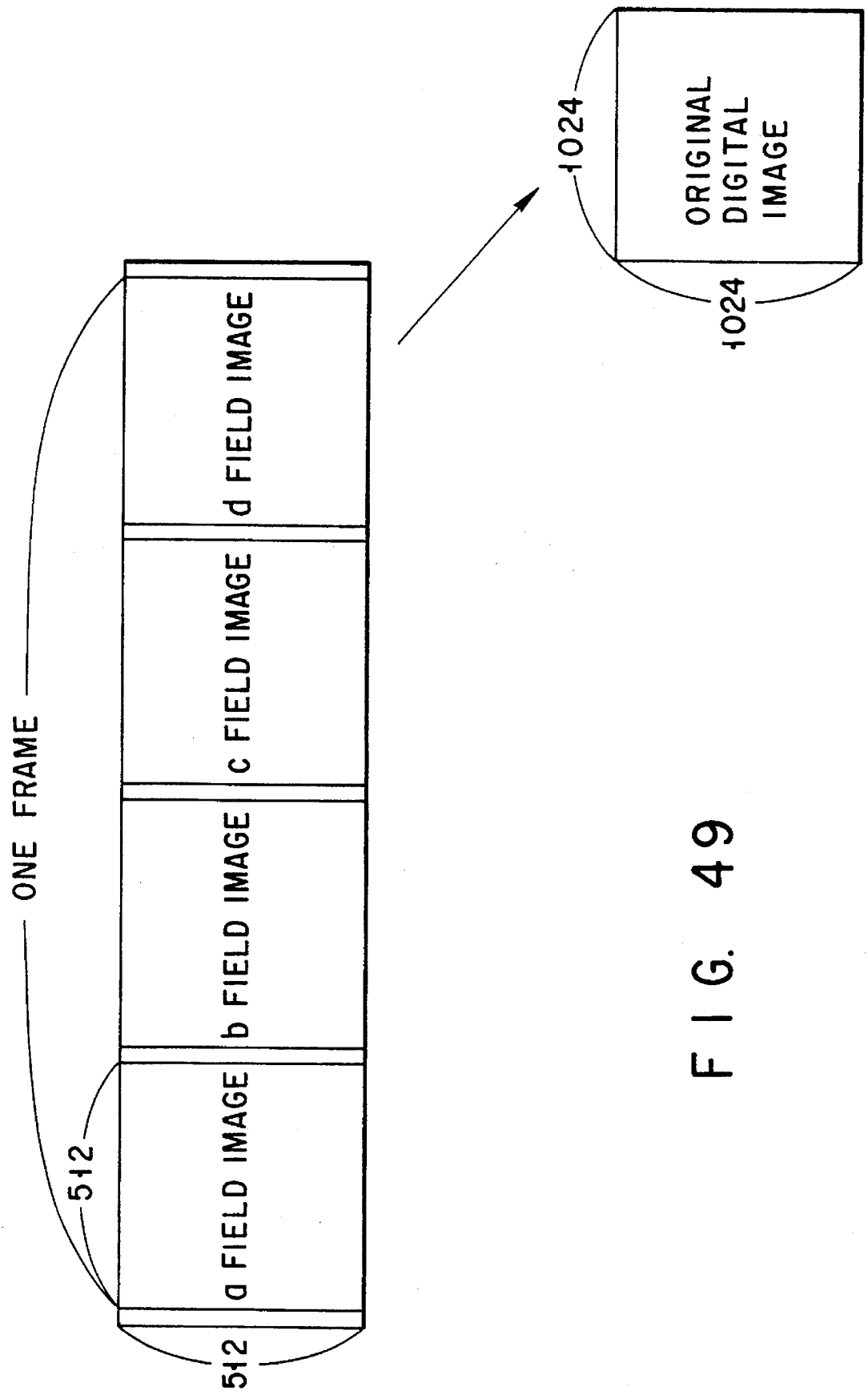
Figure 51:
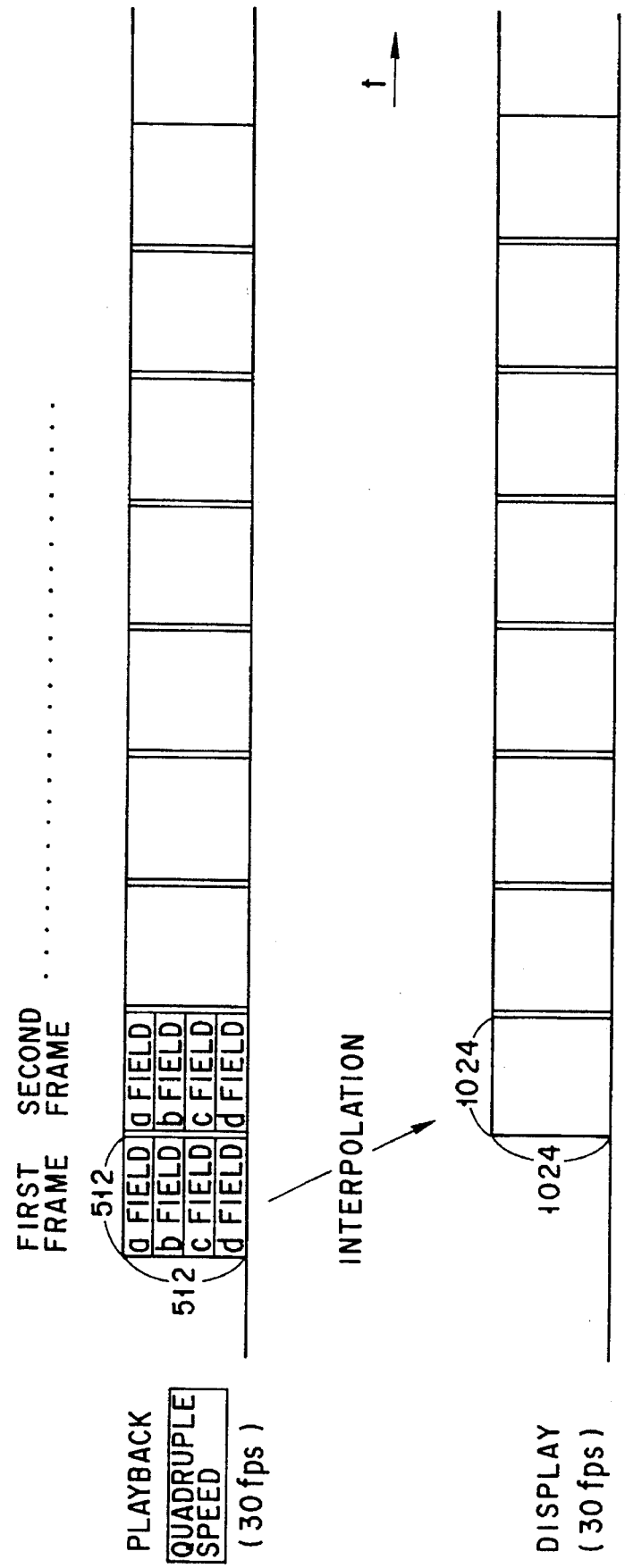
Figure 54:
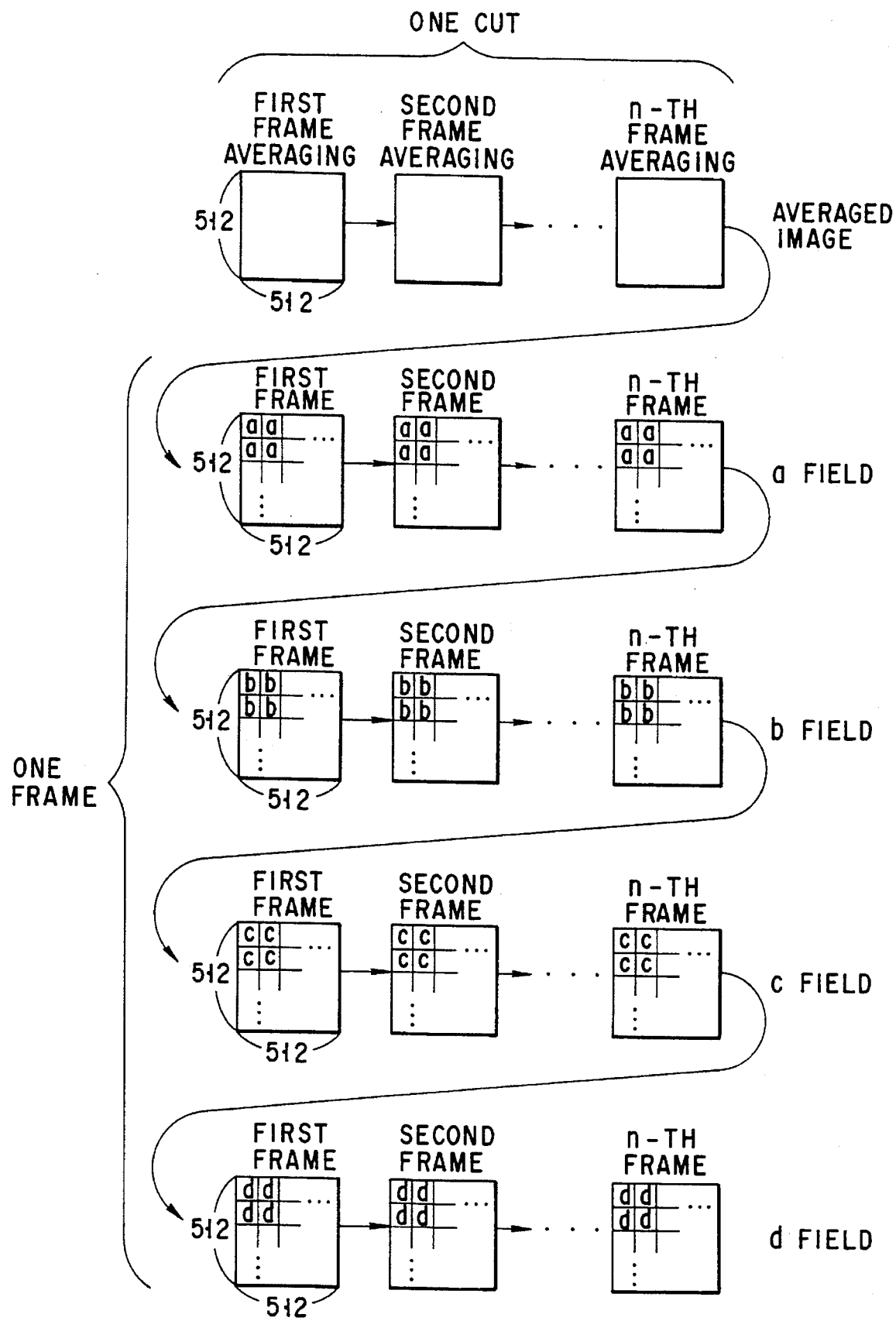
Figure 56:
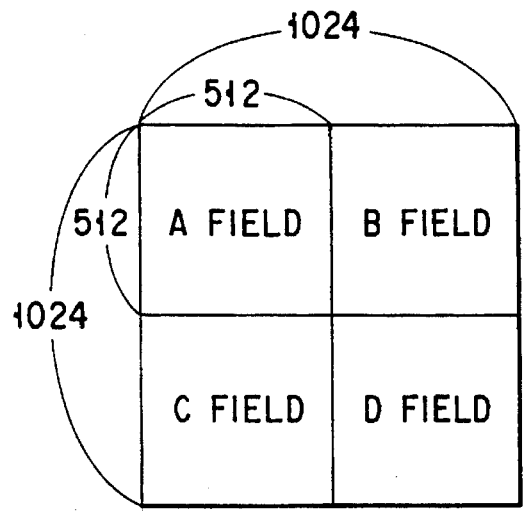

FIG. 42 is a structural diagram showing a second modification of the image storage apparatus in FIG. 38;

FIG. 43 is a structural diagram of an image storage apparatus according to a seventh embodiment;

FIGS. 44A and 44B are explanatory diagrams of the operation of the sixth embodiment;

FIG. 45 is a structural diagram of an image storage apparatus according to an eighth embodiment;

FIG. 46 is an explanatory diagram of a field segmentation process;

FIG. 47 is a diagram for explaining a first method of writing data on a video tape;

FIG. 48 is an explanatory diagram of a first playback mode according to the method in FIG. 47;

FIG. 49 is an explanatory diagram of a second playback mode according to the method in FIG. 47;

FIG. 50 is a diagram for explaining a second method of writing data on a cassette tape;

FIG. 51 is an explanatory diagram of a playback mode according to the method in FIG. 50;

FIG. 52 is a structural diagram of an image storage apparatus according to a ninth embodiment;

FIG. 53 is an explanatory diagram of an averaging process;

FIG. 54 is an explanatory diagram of a first method of writing data on a video tape;

FIG. 55 is an explanatory diagram of a second method of writing data on a video tape;

FIG. 56 is an explanatory diagram of a field segmentation process; and

Figure 57:
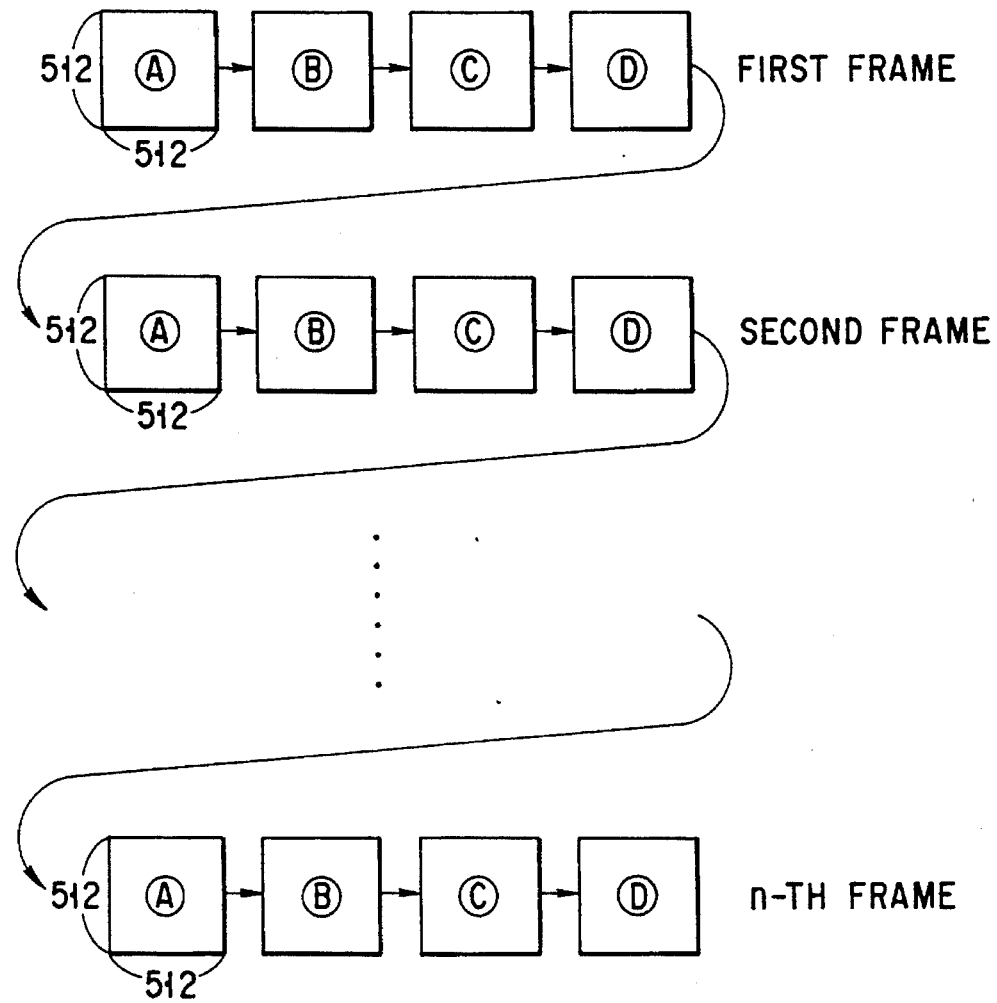

FIG. 57 is an explanatory diagram of a method of writing data on a cassette tape according to the field segmentation shown in FIG. 56.

DETAILED DESCRIPTION OF THE PREFERRED EMBODIMENTS

Preferred embodiments of the present invention will now be described referring to the accompanying drawings.

First Embodiment

FIG. 2 presents a structural diagram of an image storage apparatus according to a first embodiment of the present invention. The image storage apparatus comprises a plurality of dynamic image generators 21 and 22, a plurality of work stations 23 to 25, image memory banks 26 to 32, a plurality of digital video cassette tape recorders (VCRs) 33 to 35, a video cassette library unit 36, a matrix switcher 38 and a control unit 37.

The dynamic image generators 21 and 22 may be fluorography apparatuses each of which is an X ray TV set employing a digital image processing technique, and generate digital image data (digital video signals) having a high resolution of, for example, 1024×1024 pixels.

The work stations 23 to 25 are medical image monitor devices which have the ordinary computing function and retrieving function and are equipped with high-definition monitors of, for example, 1024×1024 pixels to present the display performance that can handle the display of medical images.

Each of the image memory banks 26 to 32 is a temporary memory device, which has independent two (first and second) input/output (I/O) terminals so that while data is written in the memory device through one terminal, currently written data or already written different data can be read out simultaneously. This simultaneous write and read function is accomplished easily by permitting each of the image memory banks 26–32 to have two magnetic disk apparatuses. The same function can also be accomplished by a semiconductor memory having a plurality of I/O ports for a semiconductor memory device array. This semiconductor memory is not limited to a RAM but may be another type, such as EEPROM (Electrically Erasable and Programmable ROM), as long as the memory is rewritable.

The VCRs 33–35, which are smaller in number than the total number of the dynamic image generators 21 and 22 and the work stations 23–25, record digital dynamic image data (digital video signals) on a video tape in a video cassette, or reproduce digital dynamic image data from the video tape.

The matrix switcher 38 intervenes among the four kinds of units, namely the dynamic image generators 21 and 22, the work stations 23–25, the VCRs 33–35 and the image memory banks 26–32, and switches the connections among those four kinds of units.

The video cassette library unit 36 has a rack for a plurality of cassette tapes and a cassette changer for changing a cassette tape to be set in each of the VCRs 33–35.

The control unit 37 determines which VCR and image memory bank among the VCRs 33–35 and image memory banks 26–32 should be assigned to each of the dynamic image generators 21 and 22 and work stations 23–25, and controls the switching operation of the matrix switcher 35. The control unit 37 also controls the cassette changing operation of the video cassette library unit 36 in such a way that a specific cassette tape is set in the assigned one of the VCRs 33–35. The assignment is accomplished by giving the priorities to the VCRs 33–35 in advance and selecting any one of the VCRs 33–35 which is not currently activated, in accordance with the priority order. With regard to the image memory banks 26–32, of those image memory banks which are not currently activated, the one which has been activated earliest is selected.

Figure 3:
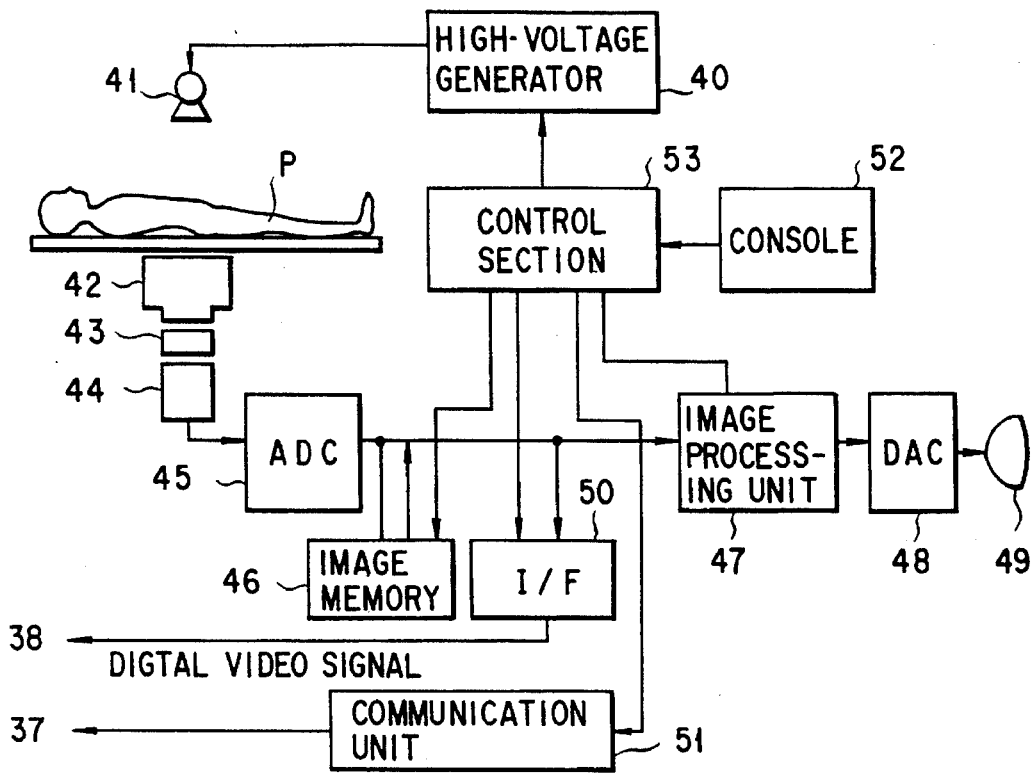
FIG. 3 is a structural diagram of a DF device in FIG. 2.

FIG. 3 shows the structure of the fluorography apparatus. When a high voltage generated by a high voltage generator 40 is applied to an X ray tube 41, X rays are irradiated on a subject P. The X rays passing the subject P are picked up by a TV camera 44 via an image intensifier 42 and an optical system 43 and are converted into an electric signal (analog signal). The analog video signal from the TV camera 44 is converted to digital video data in an analog-to-digital converter (ADC) 45. Digital video data is temporarily stored in an image memory 46. Digital video data read from the image memory 46 is restored to an analog signal by a digital-to-analog converter (DAC) 48 via an image processing unit 47, and is then displayed on a monitor 49. This digital video data is also supplied via an interface (I/F) 50 to the input terminal of the matrix switcher 38. A control section 53 performs sequence control of the individual sections at the time of imaging/fluoroscopy. The control section 53 also supplies a recording request, input via a console 52, together with attribute data, such as a patient ID and cut numbers, to the control unit 37 through a communication unit 51.

Figure 4:
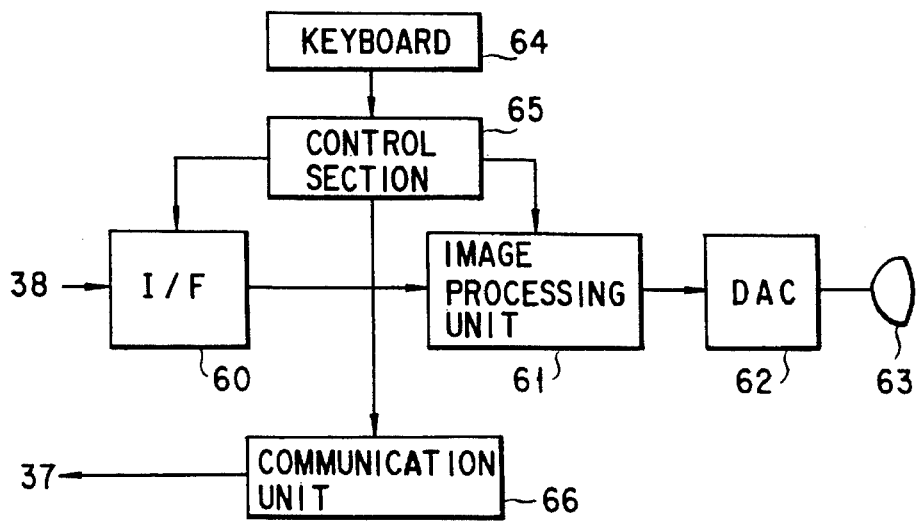
FIG. 4 is a block diagram of a work station in FIG. 2.

FIG. 4 shows the structure of the work stations 23–25. A playback request is input together with retrieval data to a keyboard 64 serving as an input unit, and is transferred via a communication unit 66 to the control unit 37 by a control section 65. Specific digital video data according to the retrieval data is reproduced by the VCR 33, 34 or 35, is loaded into an unillustrated memory via an interface 60 and is also displayed on a high-definition monitor 63 for a diagnostic purpose via an image processing unit 61 and a DAC 62.

Figure 5:
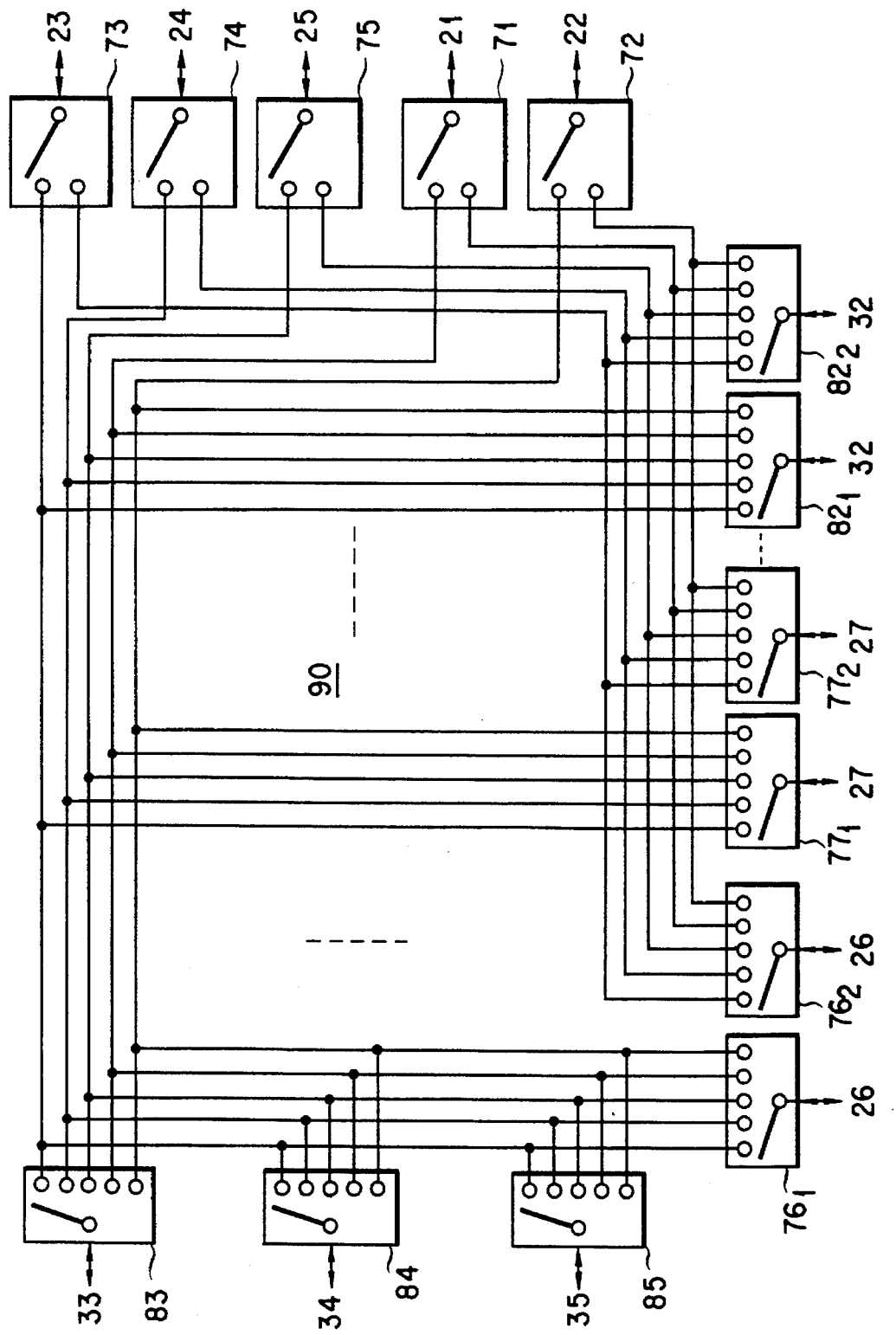
FIG. 5 is a structural diagram of a matrix switcher in FIG. 2.

FIG. 5 shows the structure of the matrix switcher 38. The matrix switcher 38 has a plurality of selectors 71–75, $76_1$–$82_1$, $76_2$–$82_2$ and 83–85, and lines 90 arranged in a matrix form. By controlling the switching of each of the selectors 71, 72, $76_1$–$82_1$ and $76_2$–$82_2$, each of the dynamic image generators 21 and 22 can be connected to the first or second I/O terminal of an arbitrary one of the image memory banks 26–32. By controlling the switching of each of the selectors $76_1$–$82_1$ and 83–85, each of the VCRs 33–35 can be connected to the first I/O terminal of an arbitrary one of the image memory banks 26–32. By controlling the switching of each of the selectors 71–75 and 83–85, the dynamic image generators 21 and 22 and work stations 23–25 can each be connected to an arbitrary one of the VCRs 33–35.

The operation of this embodiment will now be described. With regard to a dynamic image, successive images obtained since the beginning of the fluoroscopy until the end of the fluoroscopy are called one cut, which is treated as one unit.

Figure 1:
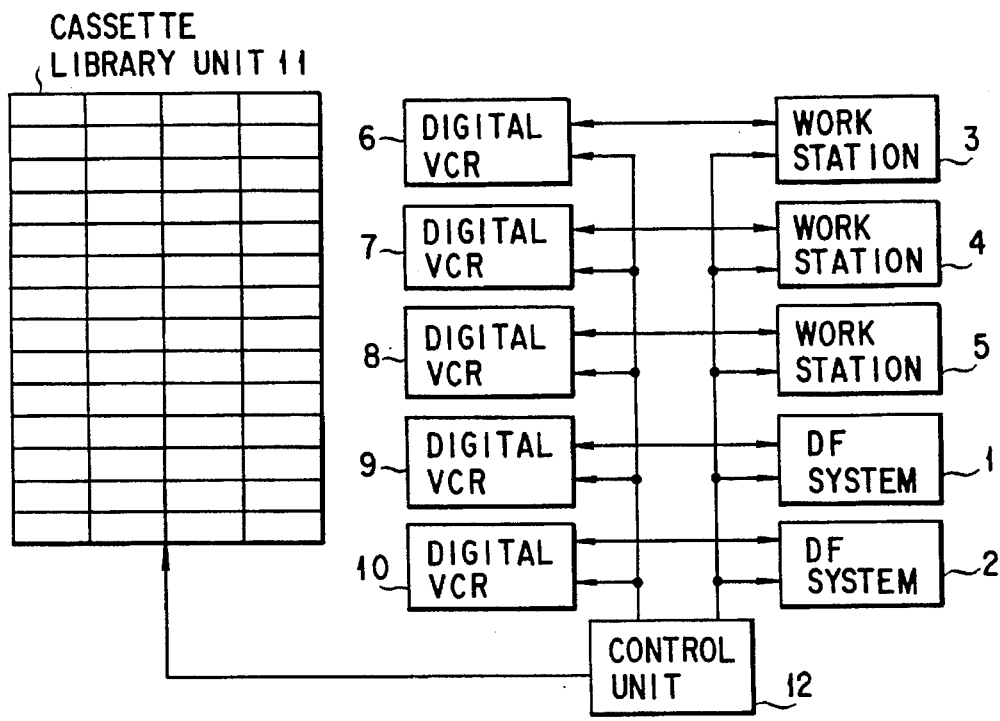
FIG. 1 is a structural diagram of a conventional image storage apparatus.
Figure 6:
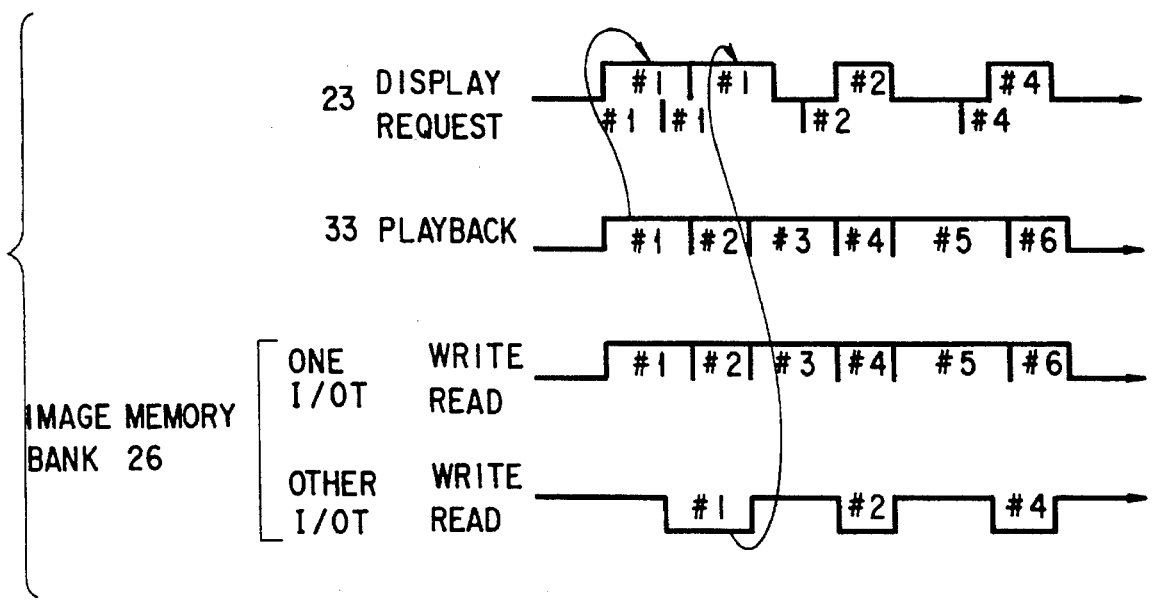
FIG. 6 is a time chart for explaining the operation of the image storage apparatus in FIG. 2.

FIG. 6 is a time chart for explaining the playback operation. First, a playback request on a curt #1 of a patient A is input from the work station 23. In response to this playback request, the control unit 37 assigns the VCR 33 and image memory bank 26 and controls the matrix switcher 38 to establish the connection as shown in FIG. 7. In this diagram, "I/OT" indicates the I/O terminal of the image memory bank 26. The control unit 37 controls the cassette changer of the video cassette library unit 36 to set a cassette tape a where the cut #1 is recorded, into the VCR 33.

After the above preparation is completed, the VCR 33 starts reproducing the cut #1. Digital video data of the reproduced cut #1 is sent to the work station 23 and the image memory bank 26, so that this digital video data is displayed on the work station 23 and written the image memory bank 26 via the first I/O terminal simultaneously. The control unit 37 controls the VCR 33 such a way that even when the playback of the cut #1 is completed, cut #2 to cut #6 on the patient A are consecutively reproduced and written in the image memory bank 26, to thereby prepare for a probable playback request for the cut #2 to cut #6.

Figure 8:
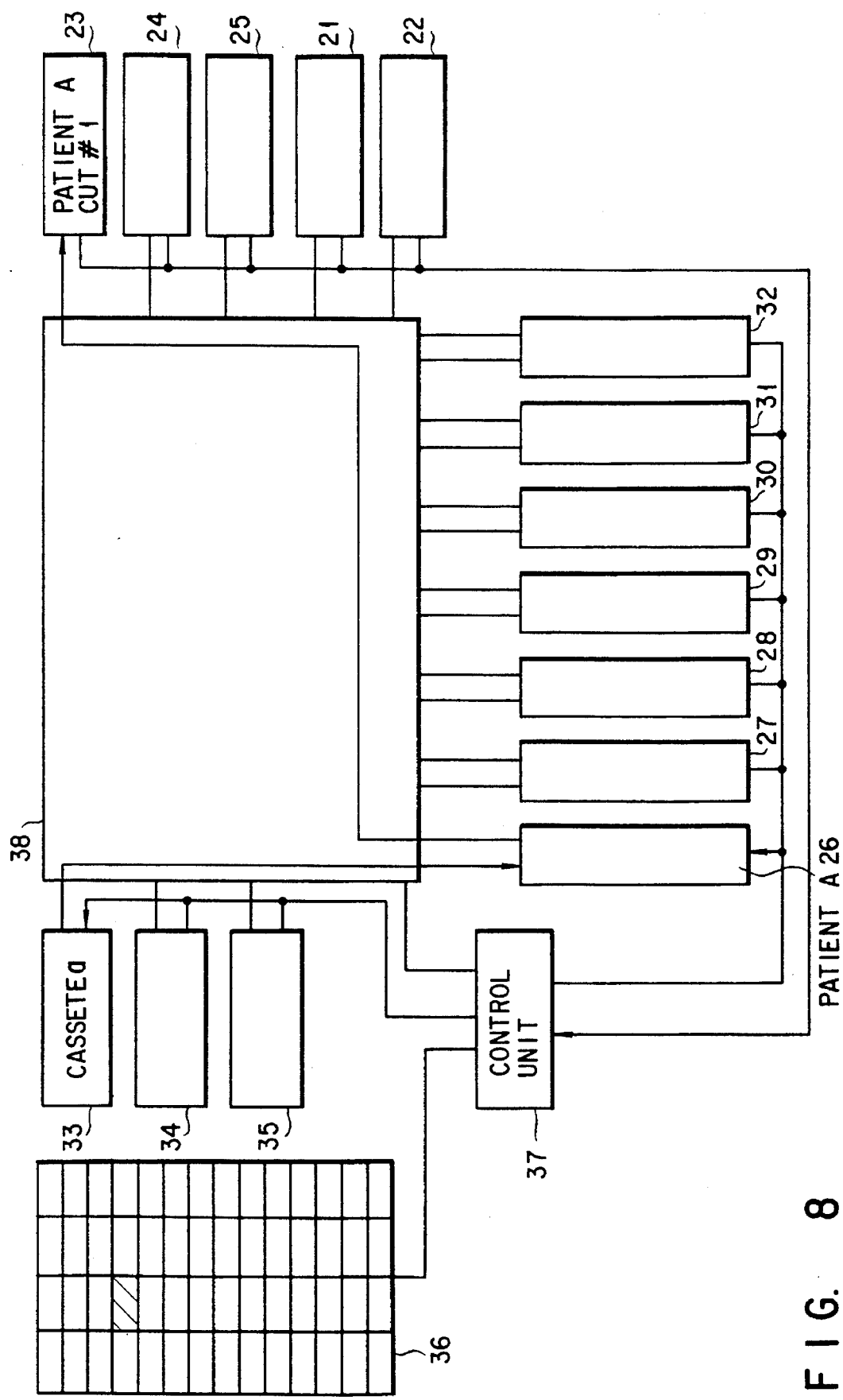
FIG. 8 is an explanatory diagram of the operation under the second circumstance.

Returning to the description of the cut #1, suppose that during reproduction/display of the cut #1, a playback request for the cut #1 is made again. In this case, as shown in FIG. 8, the control unit 37 waits for the completion of the playback of the cut #1 and controls the matrix switcher 38 to connect the work station 23 to the second I/O terminal of the image memory bank 26 this time to supply the digital video data of the cut #1 to the work station 23 from the image memory bank 26 while keeping the connection of the VCR 33 to the first I/O terminal of the image memory bank 26 and keeping reproducing the cut #2 to the cut #6 and writing those cuts in the image memory bank 26. If the cut whose reproduction is requested has been written in the image memory bank, the supply of this cut to the work station from the image memory bank has a higher priority than the supply of the cut to the work station from the VCR. This design can suppress the wearing of the magnetic heads of the VCR and the video tape and reduce the time lag from the reception of the playback request to the beginning of cut display, which is needed for rewinding of the cassette tape or the like.

When the reproduction of all the cuts #1 to #6 on the patient A is completed and the digital video data of all the cuts #1–#6 are written in the image memory bank 26, the control unit 37 controls the matrix switcher 38 to disconnect the VCR 33 from the first I/O terminal of the image memory bank 26 while keeping the connection of the work station 23 to the second I/O terminal of the image memory bank 26, and controls the cassette changer of the video cassette library unit 36 to return the cassette tape a to a predetermined position on the rack. If a playback request of any of the cuts #1–#6 is made once the digital video data of all the cuts #1–#6 have been written in the image memory bank 26, the control unit 37 copes with this playback request by supplying the digital video data of the requested cut to the work station 23 from the image memory bank 26.

If the cut whose reproduction is requested has been written in the image memory bank, the supply of this cut to the work station from the image memory bank has a higher priority than the supply of the cut to the work station from the VCR, thereby suppressing the wearing of the magnetic heads of the VCR and the video tape and reducing the time lag from the reception of the playback request to the beginning of cut display, which is needed for setting the cassette tape, positioning the cassette tape or the like. After all the cuts on the patient are written in the image memory bank, the video tape is returned so that the VCR becomes ready for the next operation.

Figure 9:
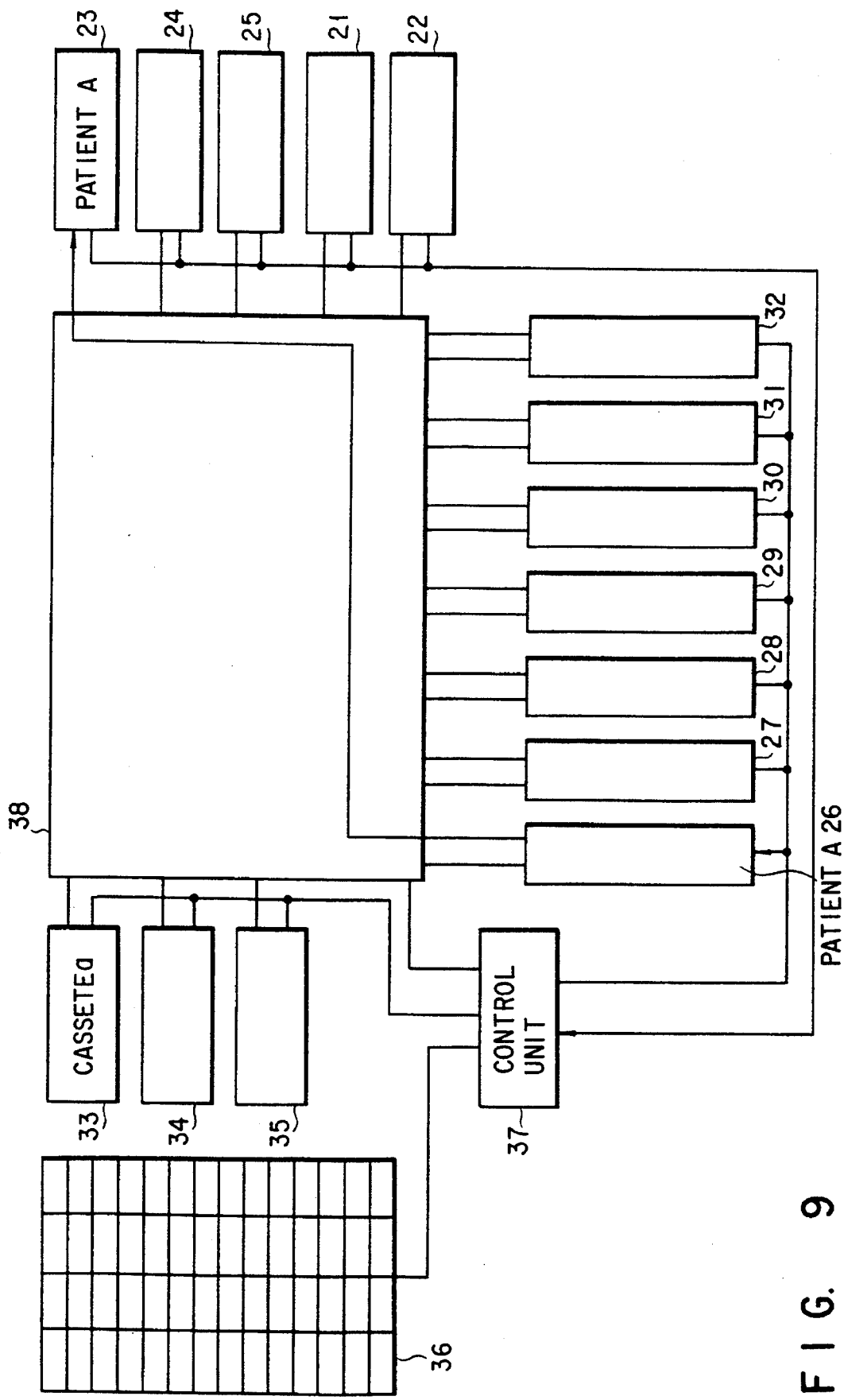
FIG. 9 is an explanatory diagram of the operation under the third circumstance.
Figure 10:
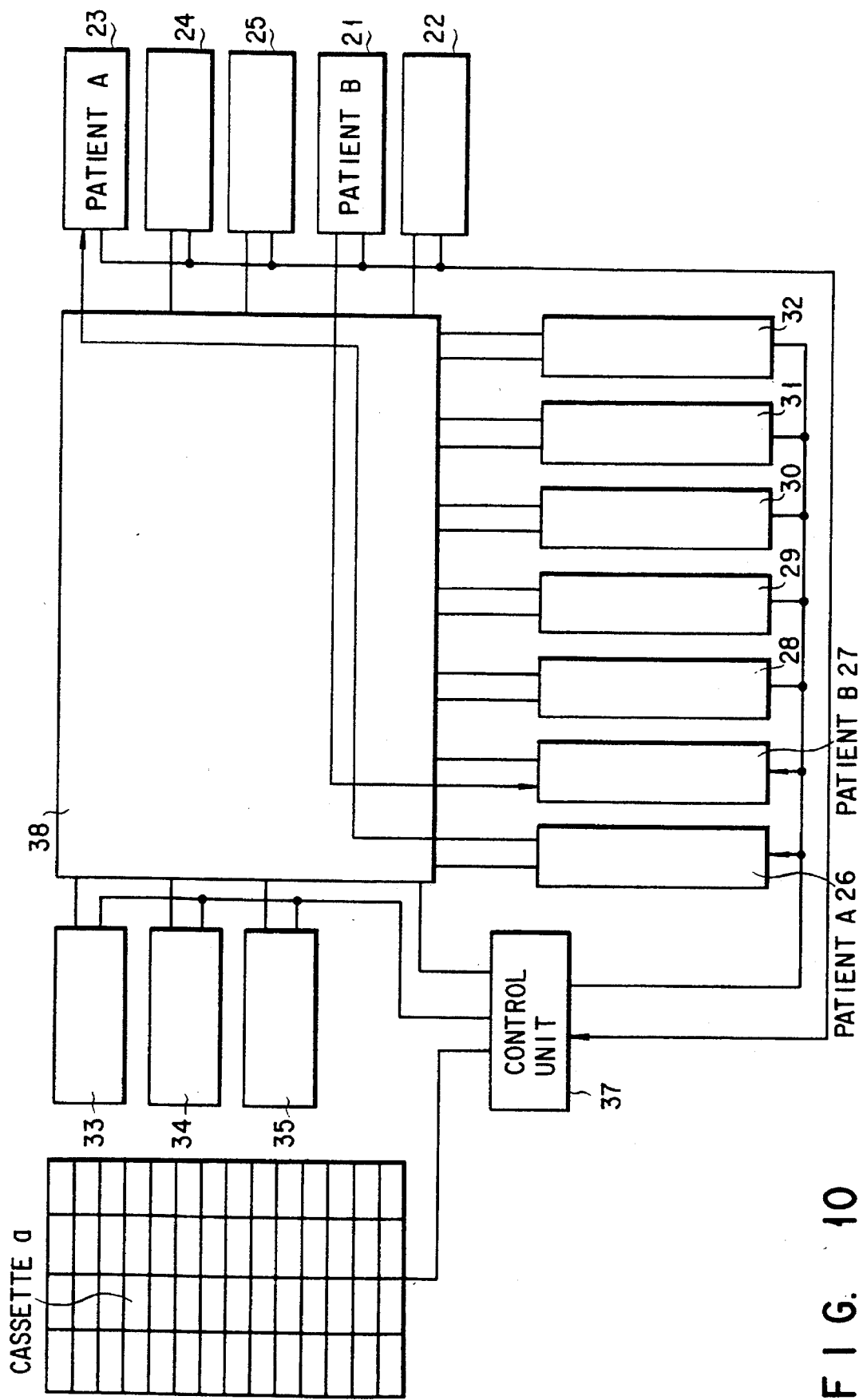
FIG. 10 is an explanatory diagram of the operation under the fourth circumstance.

When a recording request is issued from the digital image generator 21 in the situation as illustrated in FIG. 9, the control unit 37 assigns the image memory bank 27 and controls the matrix switcher 38 to establish the connection as shown in FIG. 10 in response to this request. Digital video data on a patient B generated by the digital image generator 21 is temporarily written in the image memory bank 27 via the first I/O terminal. When a given amount of data is written in the image memory bank 27, the control unit 37 assigns the VCR 33 and controls the matrix switcher 38 to establish the connection as shown in FIG. 11 and controls the cassette changer in the video cassette library unit 36 to set a cassette tape b where the data is to be recorded, into the VCR 33. After this preparation is completed, the control unit 37 starts transferring the data to the VCR 33 from the image memory bank 27 to start recording the data on the cassette tape b. As a given amount of data, after written in the image memory bank, is collectively transferred to the assigned VCR to be recorded, it is possible to prevent a specific digital image generator from monopolizing a specific VCR while this digital image generator intermittently repeats fluoroscopy.

When a playback request for a cut on the patient B is issued from the work station 25 and a playback request for a cut on a patient C is further issued from the work station 24 in the situation as illustrated in FIG. 11, the control unit 37 assigns the VCR 34 and the image memory bank 28 to the work station 24 and controls the matrix switcher 38 to establish the connection as shown in FIG. 12. The control unit 37 also controls the cassette changer in the video cassette library unit 36 to set a cassette tape c where the cut on the patient C is recorded, into the VCR 34. The playback request for the cut on the patient B is coped with by switching the connection as has been described earlier with reference to FIGS. 8 and 9, while the playback request for the cut on the patient C is coped with by switching the connection as shown in FIG. 13 in the same manner as has been described earlier with reference to FIGS. 7 and 8.

According to this embodiment, as reproduction and recording are executed via an assigned image memory bank, it is possible to shorten the wait time to quickly deal with a playback request or a recording request which is generated at random.

If each image memory bank is constituted of two magnetic disks, the operation illustrated in FIG. 6 is altered as shown in FIG. 14. That is, while a sequence of data is written on two magnetic disks alternately, data is read spontaneously from the magnetic disk which is not writing, thus accomplishing simultaneous data writing and reading.

Second Embodiment

FIG. 15 illustrates an image storage apparatus according to a second embodiment. When a high voltage generated by a high voltage generator 91 is applied to an X ray tube 92, X rays are irradiated on a subject P. The X rays passing the subject P are picked up by a TV camera 95 via an image intensifier 94 and converted there into an electric signal (analog signal). The analog video signal from the TV camera 95 is sent to a display unit 97 to be displayed as a dynamic image thereon. The analog signal is also sent to a digital VCR 98 via a digital processing unit 96 and recorded as digital data on a video tape.

FIG. 16 shows the structure of the digital processing unit 96 in FIG. 15. The analog signal from the TV camera 95 is converted into a digital signal by an ADC 101, and is sequentially stored in a frame memory unit 102 piece by piece via a data/control bus 100 according to the write address supplied from a CPU 104. The frame memory unit 102 has a plurality of frame memories (FM) at least for one cut. An image processing unit (ITU) 103 performs image processing, such as gray scaling, frequency processing and image difference calculation (subtraction), on the images in the frame memory unit 102. The images in the frame memory unit 102 are sequentially read according to the write address given from the CPU 104, are processed by the image processing unit 103 as needed, and are sent via a monitor interface (MI/F) 106 to the display unit 107 or sent via a VCR interface (VCRI/F) 105 to the digital VCR to be recorded as digital data on the video tape. Data reproduced by the digital VCR 98 is loaded via the VCR interface 105 into the frame memory unit 102 and is sent via the monitor interface 106 to the display unit 107 to be displayed thereon. The VCR interface 105 comprises a recording section and a reproducing section.

FIG. 17 is a block diagram of the recording section of the VCR interface 105. A sequence controller 112 controls the operations of the individual components of the recording section. A buffer memory (BM) 111 having a capacity to temporarily store at least one frame of digital data is connected via an interface (DBI/F) 110 to the data/control bus 100. One frame of data from the buffer memory 111, which is rearranged in one-dimensional form through horizontal scanning, is supplied via a bit length converter (BLC) 113 to a data organizing circuit (DCC) 117, a check sum calculator (CSC) 116 and a correction data calculator (AC) 114. The bit length converter 113 performs a known process of changing the bit length in accordance with the recording specifications of the digital VCR 98 and video tape. For example, in the case where pixel data is expressed with a gray scale of 10 bits and pixel data is expressible with a gray scale of 8 bits according to the recording specifications as shown in FIG. 20, every data of 8 pixels×10 bits is converted to data of 10 pixels×8 bits. The check sum data calculator 116 computes check sum data for checking if reproduced data contains an error for each horizontal scanning line, and supplies that data to the data organizing circuit 117. The check sum data is computed by adding pixels data on the same horizontal scanning line. The correction data calculator 114 computes correction data for restoring error data to correct data for every m horizontal scanning lines (m: an integer equal to or greater than 2), and supplies the data to the data organizing circuit 117. The correction data is computed by adding pixels data on the same vertical scanning line within the m horizontal scanning lines. The data organizing circuit 117 organizes one-dimensional frame data, check sum data and correction data in a predetermined order and outputs those data to the digital VCR 98.

FIG. 18 is a block diagram showing the reproducing section in the VCR interface 105. A sequence controller 125 controls the operations of the individual components of the reproducing sections. Of the data reproduced by the digital VCR 98, the frame data is sent to a line memory unit (DM) 121 having m line memories, the correction data is sent to a correction-data line memory unit (RDM) 123 having a plurality of line memories, and the frame data and check sum data are sent to an error detector 122, all through via a divider 120. The error detector 122 adds frame data for each horizontal scanning line and compares the result of the addition with the check sum data for that horizontal scanning line to determine if a data error has occurred for each horizontal scanning line. The number of the horizontal scanning line which has been determined to contain an error is registered in an error table (ET) 124. A data restoring circuit (ST) 126 reads data of m−1 horizontal scanning lines, excluding the one that has been determined to contain an error, from the correction-data line memory unit 123 and subtracts all the data on the same vertical scanning line for those m−1 horizontal scanning lines from the correction data for this vertical scanning line to thereby restore data of the horizontal scanning line that has been determined to contain an error. The sequence controller 125 controls the reading timings of the line memory unit 121 and the data restoring circuit 126 in a time-divisional manner so that data is read from the line memory unit 121 for an errorless horizontal scanning line and restored data is used for an error-containing horizontal scanning line. The selected data is then sent via a bit length converter (BLC) 127, a buffer memory 128 and a bus interface (DBI/F) 129 onto the data/control bus 100 from which the data is sequentially loaded into the frame memory 102. The bit length converter 127 sets the bit length back to the original length through the opposite process to the one involved at the recording time.

The operation of this embodiment will now be described. The X rays passing the subject P are picked up by the TV camera 95 via the image intensifier 94 and converted there into an electric signal (analog signal). The analog video signal from the TV camera 95 is sent to the display unit 97 to be displayed as a dynamic image. The analog video signal from the TV camera 95 is also sent via the digital processing unit 96 to the digital VCR 98 and recorded as digital data on a video tape.

At this time, the digital processing unit 96 executes the following process. The analog video signal from the TV camera 95 is converted into a digital signal by the ADC 101 and is then sequentially stored in the frame memory unit 102 via the data/control bus 100 according to the write address given from the CPU 104. Frame data, read frame by frame from the frame memory unit 102 and subjected to image processing in the image processing unit 103, is sent via the monitor interface 106 to the display unit 107 to be displayed thereon.

This frame data is also sent to the recording section of the VCR interface 105, and is temporarily stored in the buffer memory 111 via the interface 110. Frame data from the buffer memory 111, which is rearranged in one-dimensional form through horizontal scanning, is supplied via the bit length converter 113 to the data organizing circuit 117, the check sum calculator 116 and the correction data calculator 114.

FIG. 21A shows check sum data and correction data when m=2, FIG. 21B shows check sum data and correction data when m=10, and FIG. 21C shows check sum data and correction data when m=100. In those diagrams, frame data has a matrix of 512×512. Each pixel data in the diagrams is discriminated by P (horizontal scanning line number and vertical scanning line number).

Since the frequency of occurrence of errors generally varies in accordance with the types of images, it is preferable that m be changed manually by an operator or automatically according to the image type. When the frequency of occurrence of errors is high, m is set small to improve the data restoring performance, and with a low frequency of occurrence of errors, m is set large to suppress an increase in the amount of data.

The check sum calculator 116 adds frame data for each horizontal scanning line to compute check sum data, which is in turn sent to the data organizing circuit 117. This calculation of the check sum data is the same regardless of m. For instance, check sum data CSn for the n-th horizontal scanning line is obtained by adding all the pixel data P(n, 1), P(n, 2), ..., P(n, 512) on the n-th horizontal scanning line.

The correction data calculator 114 computes correction data for every m horizontal scanning lines, and sends the correction data to the data organizing circuit 117. In the situation of FIG. 21A, for adjoining two horizontal scanning lines, P(n, 1) and P(n+1, 1), P(n, 2) and P(n+1, 2), ..., P(n, 512) and P(n+1, 512) on the same vertical scanning line are respectively added together to prepare correction data for each vertical scanning line. In the situation of FIG. 21B, for adjoining ten horizontal scanning lines, P(n, 1) to P(n+10, 1), P(n, 2) to P(n+10, 2), ..., P(n, 512) to P(n+10, 512) on the same vertical scanning line are respectively added together to prepare correction data for each vertical scanning line. In the situation of FIG. 21C, for adjoining hundred horizontal scanning lines, P(n, 1) to P(n+100, 1), P(n, 2) to P(n+100, 2), P(n, 512) to P(n+100, 512) on the same vertical scanning line are respectively added together to prepare correction data for each vertical scanning line.

Those frame data, check sum data and correction data acquired in the above manner are organized in a predetermined order by the data organizing circuit 117, and are output to the digital VCR 98 to be recorded on a recording medium, such as a video tape.

At the time of reproduction, of the data reproduced from the digital VCR 98, the frame data is sent to the line memory unit 121, the correction data is sent to the correction-data line memory unit 123 and the frame data and check sum data are sent to the error detector 122, all through the divider 120.

FIG. 22A is a diagram for explaining a method of checking an error and restoring data when m=2, FIG. 22B is a diagram for explaining a method of checking an error and restoring data when m=10, and FIG. 23 is a diagram for explaining a method of checking an error and restoring data when m=100. The error detector 122 adds frame data for each horizontal scanning line and compares the result of the addition with the check sum data for each horizontal scanning line. The error detector 122 determines that there is no error when the frame data matches with the check sum data and determines that there is an error when both data do not match with each other. Let us consider the cases that it is determined that at least one error is present on the (n+1)-th horizontal scanning line for the situation of FIG. 22A, that at least one error is present on the (n+1)-th horizontal scanning line for the situation of FIG. 22A, and that at least one error is present on the (n+50)-th horizontal scanning line for the situation of FIG. 23. The numbers of those horizontal scanning lines which have been determined to contain an error are registered in the error table 124.

The individual pixel data on each horizontal scanning line which has been determined to contain an error are restored by the data restoring circuit 126. More specifically, the N-th pixel data ($1 \leq N \leq 512$) on the horizontal scanning line which has been determined to contain an error is computed by subtracting the pixel data on the same N-th position on the n−1 horizontal scanning lines which have been determined to contain no errors from the N-th correction data.

As the sequence controller 125 controls reading timings of the line memory unit 121 and the data restoring circuit 126 in a time-divisional manner, line data from the line memory unit 121 is used for the errorless horizontal scanning lines and restored data is used for the error-containing horizontal scanning line. The line data or restored data, whichever selected, is then sent via the bit length converter 127, the buffer memory 128 and the bus interface 129 onto the data/control bus 100 from which the data is sequentially loaded into the frame memory 102. Frame data is sequentially read from the frame memory 102 and is displayed as a dynamic image on the display unit 107 via the display interface 106.

Medical images have a higher resolution than ordinary images so that one frame of data on medical images does not fit in a single track of a video tape. This can however be coped with by the segmentation as illustrated in FIG. 19 in which one frame is divided into a plurality of segments, four segments in this example, and each segment is treated as one frame. This segmentation can be accomplished by reading data from the buffer memory 111 segment by segment at the time of recording, and expanding frame memories on the input side of the divider 120 and reconstructing every four segments of data reproduced from the digital VCR 98 into one frame with the help of those expanded memories at the time of reproduction.

AS apparent from the foregoing description, this embodiment can check an error and can restore error data to correct data.

Although check sum data is computed for each horizontal scanning line and correction data is computed for each vertical scanning line in the foregoing description, check sum data may be computed for each vertical scanning line and correction data may be computed for each horizontal scanning line. Alternatively, one frame may be divided into a plurality of two-dimensional minute segments, check sum data may be computed by adding pixel data within each segment and correction data may be computed position by position in the segments. Although correction data is prepared for each vertical scanning line in the foregoing description, line data on the same horizontal scanning line may be written twice as shown in FIG. 24 so that if an error is present in either line data, the other line data is used. This method has an advantage that the speed of restoring error data is improved, though the amount of data becomes doubled.

Third Embodiment

A third embodiment will now be described with reference to the accompanying drawings.

FIG. 25 shows the structure of an image storage apparatus according to the third embodiment. When a high voltage generated by a high voltage generator 131 is applied to an X ray tube 132, X rays are irradiated on a subject P. The X rays passing the subject P are picked up by a TV camera 134 via an image intensifier 133 and converted there into an electric signal (analog signal). The analog video signal from the TV camera 134 is converted to digital data and undergoes proper digital processing, such as subtraction, in a digital processing unit 135. The resultant data is then sent to a cassette library unit 137 to be recorded on a video tape. A work station 138, connected to the cassette library unit 137, has functions, such as retrieval of images to be used for medical diagnosis and displaying of the images.

FIG. 26 shows the structure of the cassette library unit 137. A mechanism section 142 comprises a rack 150 for holding a plurality of cassette tapes, a plurality of digital VCRs 143 to 145 and a cassette changer for setting a cassette tape to the digital VCRs 143–145. The cassette changer comprises a handling mechanism 146, which removes a cassette tape from the rack 150 and loads it in any of the digital VCRs 143–145 or performs the reverse operation, and moving mechanisms 147 to 149 for moving the handling mechanism 146 up and down and rightward and leftward. The movement of the cassette changer and the actions of the digital VCRs 143–145 are controlled via a controller 141 by the work station 138. The digital data from the digital processing unit 135 is sent via a pre-processing section 140 to any of the digital VCRs 143–145 to be recorded onto a video tape.

While one frame of medical images generally consists of 1024×1024 pixels, one track of a video tape is specified to store 512×512 pixels. Normally, therefore, each frame of a medical image is divided into a plurality of fields, four fields in this example, which are to be recorded on a video tape. The preprocessing section 140 divides one frame into four fields and performs the following processing specific to this embodiment. The pre-processing section 140 attributes a field number as well as a frame number to the digital data of each segmented image. The field number is a number for discriminating each field so that data can be rearranged into one frame from the individual field numbers; numbers "1" to "4" are associated with the respective fields. Data within one field is called field data.

FIG. 27 is a block diagram of the work station 138. A CPU 153 controls the operation of the components inside the work station 138. A sequence of field data consecutively reproduced by any of the digital VCRs 143–145 is input to the work station 138 via an interface 151, and is sent to a rearranging section 158 via a data/control bus 152. The rearranging section 158 reads a frame number and field number attributed to field data, rearranges four field data with the same frame number into one frame according to the respective field numbers, and reconstructs (restores) one frame data that constitutes a single image. The frame data reconstructed by the rearranging section 158 is stored in order into different frame memories of a frame memory unit 155 which has a plurality of frame memories. The reconstruction of one frame data does not therefore depend on the reproducing order of the field data, so that one frame data can be reconstructed even when a video tape is played back in the forward direction as well as in the reverse direction.

The reconstructed frame data is sequentially read from the frame memory unit 155 in the reproducing order, and is displayed as a dynamic image on a high-definition monitor 157 via an interface 156. An input device 154, such as a keyboard, is connected to the data/control bus 152. Commands, such as playback, fast playback, reverse playback, fast reverse playback, fast forward and rewinding, are input through this input device 154. Those commands are properly processed through the bus 152, the interface 151 and the controller 141 of the cassette library unit 137 and are then sent to the digital VCRs 143–145 under the control of the CPU 154. Accordingly, the digital VCRs 143–145 can be controlled by the work station 138. For instance, at the time of reproduction, the wait time for the reproduction of four field data is needed for any of the digital VCRs 143–145 to feed the tape at the normal speed to reconstruct one frame. As a result, the image data is displayed at ¼ times the frame rate required for image pickup. In fast playback mode, any of the digital VCRs 143–145 feeds the tape at quadruple the speed of the normal reproduction, so that the image data is displayed at the same frame rate as needed for image pickup.

The operation of this embodiment will be described below. FIG. 28 is a diagram for explaining the processing of the pre-processing section 140. In the diagram, "I1," "I2," . . . represent a sequence of frame data obtained in order by the image pickup, and those frame data are given frame numbers 1, 2, . . . , respectively. Further, "I11," "I12," "I13" and "I14" represent field data that constitutes the same frame, and those field data are given field numbers 1, 2, 3 and 4, respectively. Frame data picked up by the TV camera 134 and digitized by the digital processing unit 135 are sent to the pre-processing section 140 of the cassette library unit 137. The frame data I1 is segmented to field data I11, I12, I13 and I14 by the pre-processing section 140. The pre-processing section 140 attributes the common frame number 1 and the specific field numbers to the individual field data I11, I12, I13 and I14, affixes the start code to the head of each field data, rearranges the data to one-dimensional data for each field, and sends the resultant data to any of the digital VCRs 143–145 to be recorded in successive four frame areas on the video tape in order.

In playback mode, field data is reconstructed into frame data in the following manner. FIG. 29 is a diagram for explaining the procedures of reconstructing frame data at the time of reproduction. Any of the digital VCRs 143–145 feeds the video tape in the forward direction at the normal speed to sequentially read field data I11, I12, I13, I14, . . . , and sends the read field data to the rearranging section 158 of the work station 138. The rearranging section 158 reads the frame number and field number, which are attributed to each field data, and rearranges the four field data with the same frame number into one frame according to the field numbers, thereby reconstructing (restoring) one frame data I1, I2, and so forth. The frame data reconstructed by the rearranging section 158 is sequentially stored in different frame memories of the frame memory unit 155, is read out in accordance with the reproducing order, and is displayed as a dynamic image on the monitor 157 via the interface 156.

In reverse playback mode, any of the digital VCRs 143–145 feeds the video tape in the reverse direction at the normal speed to sequentially read field data I94, I93, I92, I91, . . . in the reverse direction to the direction of the reproduction and is supplied to the rearranging section 158 of the work station 138, as shown in FIG. 30. The rearranging section 158 reads the frame number and field number, which are attributed to each field data, and rearranges the four field data with the same frame number into one frame according to the field numbers, thereby reconstructing (restoring) one frame data I9, I8, and so forth. The frame data reconstructed by the rearranging section 158 is sequentially stored in different frame memories of the frame memory unit 155, and is then played back reversely as a dynamic image on the monitor 157 via the interface 156.

Since the reconstruction of one frame data does not depend on the reproducing order of the field data, one frame data can be reconstructed even when the video tape is played back in the forward direction as well as in the reverse direction.

Depending on the timing of stopping the fast forward or rewinding, reproduction may start with field data I33 at some point in the frame having the field number 2 or 3, as shown in FIG. 31. In this case, conventionally, one frame is specifically reconstructed from four field data I33, I34, I41 and I42 immediately after the beginning of the reproduction, so that the frame data cannot be acquired. According to this embodiment, however, four field data with the same frame number are rearranged into one frame according to their field numbers to reconstruct one frame data, so that the conventional problem does not arise.

Fourth Embodiment

FIG. 32 shows the structure of a fourth embodiment. A plurality of work stations (two work stations in this example) 160 and 161 are coupled directly to a plurality of digital VCRs (two digital VCRs in this example) 168 and 169 via selectors 170 and 171. Accordingly, commands, such as playback, fast playback, reverse playback, fast reverse playback, fast forward and rewinding, input through operation sections 164 and 165 of the work stations 160 and 161, are supplied directly to the respective digital VCRs 168 and 169, or data reproduced by the digital VCRs 168 and 169 are directly loaded into the respective work stations 160 and 161.

The selector 170 connects the command output terminal of the work station 160 to the command input terminal of one of the digital VCRs 168 and 169, or connects the command output terminal of the work station 161 to the command input terminal of the other one of the digital VCRs 168 and 169, or is capable of reversing such connection. Likewise, the selector 171 connects the data output terminal of the work station 160 to the data input terminal of one of the digital VCRs 168 and 169, or connects the data output terminal of the work station 161 to the data input terminal of the other one of the digital VCRs 168 and 169, or can reverse such connection.

The switching actions of the selectors 170 and 171 are controlled by a manager 163. The manager 163 controls the selectors 170 and 171 in responsive to each other in such a way that the digital VCRs 168 and 169 are assigned to the work stations 160 and 161 without overlapping.

Reference numeral "166" denotes the mechanism section of a cassette library unit, which has the same structure as the mechanism section shown in FIG. 26 and comprises a rack 167, digital VCRs 168 and 169 and a cassette changer (not shown). The movement of the cassette changer is controller by the manager 163.

The operation of this embodiment will now be explained. An operation start request is input through the operation section 164 of the work station 160. The request is input to the manager 163 via the line 162. The manager 163 assigns one of the digital VCRs 168 and 169 (168 in FIG. 32) to this work station 160, and controls the selectors 170 and 171 to directly connect the command input terminal of the digital VCR 168 to the command output terminal of the work station 160, and to directly connect the data output terminal of the digital VCR 168 to the data input terminal of the work station 160. At this time, the command output terminal of the work station 161 is directly connected to the command input terminal of the digital VCR 169, while the data output terminal of the digital VCR 169 is directly connected to the data input terminal of the work station 161.

After establishing such connections, the manager 163 controls only the changing of a cassette tape via the cassette changer. A command, such as playback, stop, fast forward and rewinding, input through the operation section 164 of the work station 160 by an operator, is directly sent to the assigned digital VCR 168 and reproduced data is directly sent to the work station 160 from the digital VCR 168.

Therefore, the response speed to the input command is improved and the load of the manager can be reduced, as compared with the conventional case where commands and reproduced data are exchanged between the work station and digital VCR through the manager. Particularly, when a jog shuttle whose frequency of operation is high is used as the operation section, the response speed is further improved prominently.

Fifth Embodiment

FIG. 34 shows the structure of this embodiment. Reference numeral "180" denotes the mechanism section of a cassette library unit, which has the same structure as the mechanism section shown in FIG. 26 and comprises a digital VCR 182 and an unillustrated cassette changer. The movement of the cassette changer is controller by a manager 192.

A work station 183 is connected via an interface 185 to the data input/output terminal of the digital VCR 182. Data reproduced by the digital VCR 182 is stored in order into the frame memories of a frame memory unit 187, frame by frame, via the interface 185 and a data/control bus 186. Data read from the frame memory unit 187 is sent via the data/control bus 186 and an interface 189 to a monitor unit 190, and is converted to an analog signal which is in turn displayed as a dynamic image on a high-definition monitor. Connected via the data/control bus 186 to a CPU 184 is an operation section 188 through which an operator inputs various commands, such as playback, stop, fast forward, rewinding, frame feeding and long storage. The various commands are sent via a control bus 191 to the manager 192. The manager 192 controls the movement of the cassette changer and controls the operation of the digital VCR 182 in accordance with the various commands.

FIG. 34 shows the appearance of the operation section 188, which is equipped with an edition key for allowing the operator to specify a frame that need not be preserved long time as well as switches corresponding to playback, stop, fast forward, rewinding and frame feeding.

The operation of this embodiment will now be discussed. Data reproduced by the digital VCR 182 is stored frame by frame in several frame memories of the frame memory unit 187 of the work station 182 via the interface 185. When a proper switch on the operation section 188 is operated, frame data is read from the frame memory unit 187 and is displayed frame by frame as a dynamic image on the monitor unit 190.

When the monitor unit 190 shows a frame which need not be preserved long time, such as a frame before a contrast medium is input or a frame with the contrast medium completely gone, the operator should depress the edition key on the operation section 188. In FIG. 35, * indicates the frame for which the edition key has been depressed.

The CPU 184 sequentially accumulates the frame number for which the edition key has been depressed, in the internal memory. After the display of one cut of dynamic images is completed, the CPU 184 sends a long storage command to the manager 192 at the proper timing. Upon reception of this command, the manager 192 controls the cassette changer to replace the cassette tape set in the digital VCR 182 at the time of reproduction to a cassette tape for the long-storage purpose, and causes the digital VCR 182 to stand by in record mode.

Then, the CPU 184 sequentially reads the frame numbers that need not be preserved long time from the internal memory, sets the digital VCR 182 in a recordable state via the manager 192, and sequentially loads the frame data that need not be preserved long time to the digital VCR 182 from the frame memory unit 187 via the interface 185 to be recorded on the cassette tape.

As images that should be preserved long time are recorded on a long-storage cassette tape according to this embodiment, other cassette tapes can be used in circulation, thus ensuring efficient image recording.

The fifth embodiment may be modified in the following manner. FIG. 36 shows the structure of a first modification. In FIG. 36, the same reference numerals are given to the same blocks as those of FIG. 34 to avoid repeating their descriptions. While the operator determines if frames should be preserved long time in the foregoing description of the fifth embodiment, the first modification automates this decision. For this purpose, a subtraction section (CU) 195 for performing subtraction between frames and a statistic processing section (SU) 196, which prepares a distribution (histogram) representing a change in the number of pixels of the subtraction image according to a stepwise change in the values of the pixels and statistically determines whether or not an image contains a contrast medium using this histogram, are added to the structure shown in FIG. 34.

A mask image imaged before injecting a contrast medium into a subject is held in advance in the subtraction section 195. Images are sequentially supplied to the subtraction section 195 from the frame memory unit 187. The subtraction section 195 subtracts the mask image from each image to provide subtraction images of the individual images. The statistic processing section 196 first prepares a histogram for each subtraction image computed by the subtraction section 195. The statistic processing section 196 statistically determines for the individual images whether or not there remains the contrast medium using those histograms. There are various ways to make the decision. The first method prepares a mask histogram on a subtraction image that depends only on the respiration or the heart beat which is obtained by subtracting two images, imaged at different times with no contrast medium injected, one from the other, subtracts the mask histogram from the associated histogram, compares the sum of the remaining frequencies with a threshold value, and determines that the contrast medium is present in the image in question when the sum is greater than the threshold value. The second method compares the frequency of a specific pixel with a threshold value utilizing the fact that the values of the pixels of a subtraction image of the portion containing a contrast medium show high contrast, and determines that the contrast medium is present in the image in question when the frequency is greater than the threshold value. The third method is the combination of the first and second methods and determines that the contrast medium is present in the image in question when the presence of the contrast medium in the image is determined by both methods. The determination methods are not limited to those three methods, but different methods may be employed as well. The processing flow up to the long storage of only specific images after the decision made by the statistic processing section 196 is the same as has been described in the foregoing description of the fifth embodiment.

FIG. 37 shows the structure of a second modification. In FIG. 37, the same reference numerals are given to the same blocks as those of FIG. 34 to avoid repeating their descriptions. In the above description, there is no way to distinguish images that should be preserved long time from operator-specified images that need not be preserved long time. The second modification provides a way to make that discrimination. An image whose long storage has been specified as unnecessary is displayed shaded, for example. A shaded image prepared by a graphics preparing section 197 is sent to a synthesizing section 199 via a graphic memory 198 in synchronism with an image that need not be preserved long time. The synthesizing section 199 combines the image that need not be preserved long time and the shaded image into one frame and sends the synthesized image via the interface 189 to the high-definition monitor 190 to be displayed there. An image that should be preserved long time passes through the synthesizing section 199 or combined with a zero image and is sent via the interface 189 to the high-definition monitor 190 to be displayed there. The processing flow up to the long storage of only specific images after the decision made by the statistic processing section 196 is the same as has been described in the foregoing description of the fifth embodiment.

Sixth Embodiment

FIG. 38 shows the structure of a sixth embodiment. Reference numeral "200" is a cassette library unit having the same structure as the one described earlier, and reference numeral "202" is a work station. The data output terminal of the cassette library unit 200 is connected to one input terminal of a signal selector 204 via a dynamic image processor 201 and an interface 203. An interactive screen memory 208 stores an interactive screen and combines this interactive screen with a cursor that moves in responsive to the movement of operating means, such as a mouse. The output terminal of the interactive screen memory 208 is connected to the other input terminal of the signal selector 204 via the interface 210. The signal selector 204 has only one output terminal which is connected via an interface 206 to a high-definition monitor 207. Through the switching action of the signal selector 204, the image signal of the interactive screen from the interactive screen memory 208 and the image from the dynamic image processor 201 are supplied in a time-divisional manner to the high-definition monitor 207. By controlling the timing of switching the signal selector 204 by a controller 211 according to a predetermined insertion area shown in FIG. 39, the interactive screen can be fitted in and displayed in a part of the image as shown in FIG. 40.

As a command can be input using a high-definition monitor which stores a dynamic image, it is unnecessary to separately provide an exclusive high-definition monitor for command input, which is economically advantageous and can reduce troublesome frequent shifting of the line of sight.

The sixth embodiment may be modified as follows. FIG. 41 shows the structure of a first modification. In FIG. 41, the same reference numerals are given to the same blocks as those of FIG. 38 to avoid repeating their descriptions. In the first modification, the position of the insertion area may be designed to the controller 211 via the interactive screen memory using the unillustrated mouse, as shown in FIG. 41. FIG. 42 shows the structure of a second modification. In FIG. 42, the same reference numerals are given to the same blocks as those of FIG. 38 to avoid repeating their descriptions. Interactive screens each containing a cursor are successively output from the interactive screen memory 208 at the frame rate of 30 frames per second. When the mouse is moved, the cursor on the interactive screen is updated according to the moving vector of the mouse. The interactive screen from the interactive screen memory 208 is distributed to two systems, one supplied directly to a subtraction section 213 and the other supplied to the subtraction section 213 with a delay of one frame given by a delay section 212. Therefore, the current interactive screen and the interactive screen older by one frame are simultaneously supplied to the subtraction section 213. The subtraction section 213 subtracts the one-frame older interactive screen from the current interactive screen and sends the resultant subtraction image to the controller 211. The controller 211 determines that the mouse has not been manipulated when all the pixels of the subtraction image indicate 0. This is because when the cursor moves according to the manipulation of the mouse, the pixels of a part of the subtraction image do not indicate 0. No manipulation of the mouse is equivalent to the necessity of no interactive screen. Until the pixels of a part of the subtraction image do not indicate 0 or the interactive screen becomes unnecessary, the controller 211 fixes the connection of the signal selector 204 to the dynamic image processor (201) side and displays the image fully without displaying an interactive screen.

Seventh Embodiment

A seventh embodiment will be described below.

FIG. 43 shows the structure of the seventh embodiment. Reference numeral "220" denotes the same cassette library unit as shown in FIG. 26. A plurality of work stations (three in this example) 221 to 223 are mutually connected via a data/control bus 224. The cassette library unit 220 is connected to the work stations 221–223, so that the work stations output an image playback request together with retrieval data to the cassette library unit 220, and receive and display video signals reproduced by the cassette library unit 220 as an image. The work stations 221–223 are respectively connected to mice 228 to 230 via respective mouse controllers 225 to 227. In accordance with the movements of the mice 228–230, the cursors on the display screens of the work stations 221–223 move.

With the above structure, let us consider the case where at least two of the work stations 221–223 are used to co-diagnose the same image at remote places. Suppose the co-diagnosis is carried out between the work stations 221 and 222. A playback request is sent together with retrieval data for the same frame number #10 to the cassette library unit 220 from one of the work stations, 221. The image data with the frame number #10, reproduced by the cassette library unit 220, is returned to the work station 221 that has issued the playback request and is displayed as an image. As shown in FIG. 44A, the data with the frame number #10 input from the work station 221 is sent to the other work station 222. A playback request is sent together with retrieval data for the same frame number #10 to the cassette library unit 220 from the other the work stations 222. The image data with the frame number #10, reproduced by the cassette library unit 220, is returned to the work station 222 that has issued the playback request and is displayed as an image. Accordingly, the same image is displayed on the work stations 221 and 222, thus completing the preparation for co-diagnosis.

When the diagnosis actually starts, two types of cursors are displayed together with the same image on the display screen of each of the work stations 221 and 222 as shown in FIG. 44B. One cursor displayed on the work station 221 is a local cursor that moves in accordance with the movement of a local mouse 228, and the other cursor is a remote cursor that moves in accordance with the movement of a mouse 229 of the remote work station 222. Likewise, one cursor displayed on the work station 222 is a local cursor that moves in accordance with the movement of the local mouse 229, and the other cursor is a remote cursor that moves in accordance with the movement of the mouse 228 of the remote work station 221. Therefore, data about the positions of the cursors is transmitted between the work stations 221 and 222 in bidirectional form via the bus 224.

For example, the display modes are made different from each other by properly changing the local cursor is the size, color and shape of the cursor or combining them.

As the local cursor and the remote cursor are both displayed on the monitor of each of the two work stations, doctors at two remote places can proceed with the diagnosis while indicating a region of interest at the remote places, with a telephone conference as needed. This design can improve the diagnosing efficiency as compared with the co-diagnosis that involves only telephone conference.

Eighth Embodiment

FIG. 45 shows the structure of an eighth embodiment. When a high voltage is applied to an X ray tube 241 from a high voltage generator 240, X rays are continuously or intermittently generated from the X ray tube 241. The X rays passing a subject P are picked up by a TV camera 243 via an image intensifier 242. Repeating the imaging operation, the TV camera 243 acquires a dynamic image. Successive images obtained over the period from the beginning to the end of the imaging operation are called one cut. The analog signal from the TV camera 243 is converted to digital data in an unillustrated analog-to-digital converter. This digital data is temporarily recorded in a recording memory 244 according to the write address given from a memory controller 245. At lest one cut of data is recorded in the recording memory 244. The digital data in the recording memory 244 is read according to the read address given from the memory controller 245. The data read from the recording memory 244 is recorded on a video tape in a digital VCR 247.

In playback mode, one cut of digital data reproduced by the digital VCR 247 is temporarily recorded on a reproducing memory 254 according to the write address given from the memory controller 255. This digital data is also sent to an interpolation unit 249. The interpolation unit 249 interpolates pixels of specific data in the digital data to enlarge the matrix size.

The digital data in the reproducing memory 254 is read according to the read address from a memory controller 255, and is displayed via display memory 250 and a digital-to-analog converter (DAC) 251 on a monitor 252 having high definition of 1024×1024 pixels.

A console 256 is connected to a controller 248 which controls the sequence of the entire system. One of a high-definition mode and a real-time mode is selectively input as a playback mode from the console 256. When the high-definition mode is selected, the controller 248 reproduces a high-definition dynamic image at the ¼ of the normal speed via the reproducing memory 254. When the real-time mode is selected, the controller 248 reproduces a low-definition dynamic image in real time via the interpolation unit 249.

The operation of the eighth embodiment will be described below. Suppose that the TV camera 243 picks up an image with 1024×1024 pixels, and 512×512 pixels of data can be recorded on one track on a video tape. Also suppose that one cut consists of successive n frames and the digital VCR 247 reproduces an image at the frame rate of 30 frames per second (fps).

The recording operation will be discussed. The analog signal from the TV camera 243 is converted to digital data via the unillustrated analog-to-digital converter. One cut of digital data is temporarily recorded in the recording memory 244 according to the write address given from the memory controller 245. The digital data in the recording memory 244 is read in the following manner according to the read address given from the memory controller 245 and is recorded on the video tape by the digital VCR 247.

The data in the recording memory 244 is read, with one frame divided into a plurality of fields (four fields in this example) as shown in FIG. 46 and in the order as shown in FIG. 47. In this example, one frame consists of 1024×1024 pixels, and one field consists of 512×512 pixels. One field consists of a plurality of discrete pixels with every other pixel skipped in the X and Y directions, and each field image completes a single image though having a small matrix size or low spatial resolution. Assuming that one frame is divided into segments each consisting of 2×2 pixels, then upper left pixels of the individual segments are collected to form an a field image, upper right pixels of the individual segments are collected to form a b field image, lower left pixels of the individual segments are collected to form a c field image, and lower right pixels of the individual segments are collected to form a d field image. In other words, the field image consists of pixels in a field of odd-numbered rows×odd-numbered columns, the b field image consists of pixels in a field of odd-numbered rows×even-numbered columns, the c field image consists of pixels in a field of even-numbered rows×odd-numbered columns, and the d field image consists of pixels in a field of even-numbered rows×even-numbered columns. Each of the whole frames constituting one cut is separated into four fields as mentioned above.

The one cut of field data is read from the recording memory 244 in the order shown in FIG. 47 and is recorded on the video tape by the digital VCR 247. The data of the a field images of all the frames constituting one cut are sequentially read in the imaging order, then the data of the b field images of all the frames constituting one cut are sequentially read in the imaging order, then the data of the c field images of all the frames constituting one cut are sequentially read in the imaging order, and finally the data of the d field images of all the frames constituting one cut are sequentially read in the imaging order. The field image is recorded in this order by the digital VCR 247.

The playback operation will now be discussed. To begin with, the real-time mode will be discussed. FIG. 48 is a diagram for explaining the operation in real-time mode. The real-time mode is selected through the console 256. The controller 248 controls the digital VCR 247 to execute the playback operation at the normal speed. The a field images are sequentially reproduced according to the recording order shown in FIG. 47. The a field image is interpolated by the interpolation section 259 to be converted into an image of 1024×1024 pixels, which is then displayed on the high-definition monitor 252 via the display memory 250 and the DAC 251. This operation is repeated as the reproduction proceeds, and a dynamic image is displayed in real time. When the reproduction of all the a field images for one cut is completed, the same operation is performed for the b field images, c field images and d field images according to the recording order. Since the field image, though having low spatial resolution, completes a single image as mentioned above, displaying only the field images does not raise any problem other than the low spatial resolution.

A description will now be given of the high-definition mode. FIG. 49 is an exemplary diagram showing a process of reconstructing a single high-definition image from four field images a, b, c and d. All the field images for one cut reproduced by the digital VCR 247 are temporarily recorded in the reproducing memory 254. As shown in FIG. 49, the memory controller 255 supplies the read address to the reproducing memory 254 so that one frame consisting of 1024×1024 pixels is restored from the four field images a, b, c and d separated from one frame. Of course, the memory controller 255 can read the field images according to the imaging order while sequentially restoring frames from those images. The data read from the reproducing memory 254 in this order is displayed as a high-definition dynamic image on the high-definition monitor 252 via the display memory 250 and DAC 251. This high-definition dynamic image can be displayed in real time by quickening the speed of reading data from the reproducing memory 254.

The eighth embodiment may be modified in the following manner. In the first modification, field images are recorded on the video tape in the order shown in FIG. 50. More specifically, the a, b, c and d field images separated from the first frame are successively read from the recording memory 244 first, the a, b, c and d field images separated from the second frame are then successively read from the recording memory 244, the a, b, c and d field images separated from the third frame are then successively read from the recording memory 244, and so forth until this reading operation is repeated until the last n-th frame of one cut. The field images are recorded in this order on the video tape by the digital VCR 247. As recording is carried out in such an order, the digital VCR 247 can execute reproduction at the quadruple speed. In this quadruple-speed reproduction, the video heads obliquely scan consecutive four tracks. As each of the a, b, c and d field images completes a single image as mentioned earlier, even four tracks are obliquely scanned in the quadruple-speed reproduction, the a, b, c and d field images are partially collected to complete a single image of 512×512 pixels.

The eighth embodiment may also be modified as follows. One frame may be divided simply into two fields in each of the X and Y directions as shown in FIG. 56, and those field images may be recorded on the video tape in the order as shown in FIG. 57. In this case, however, the quadruple-speed reproduction cannot be used.

Ninth Embodiment

FIG. 52 shows the structure of a ninth embodiment. When a high voltage is applied to an X ray tube 241 from a high voltage generator 240, X rays are continuously or intermittently generated from the X ray tube 241. The X rays passing a subject P are picked up by a TV camera 243 via an image intensifier 242. Repeating the imaging operation, the TV camera 243 acquires a dynamic image. The analog signal from the TV camera 243 is converted to digital data in an unillustrated analog-to-digital converter. This digital data is temporarily recorded in a recording memory 244 according to the write address given from a memory controller 245. At lest one cut of data is recorded in the recording memory 244. The digital data in the recording memory 244 is read according to the read address given from the memory controller 245. The data read from the recording memory 244 is selected by a selector 260 and is sent directly or via an averaging section 261 to a digital VCR 247.

The averaging section 261 averages the pixels in a segment in one frame to provide an averaged image.

The operation of the ninth embodiment will be described below.

The recording operation will be discussed first. One cut of digital data is temporarily stored in the recording memory 244 as per the eighth embodiment. Immediately after reading starts, the frame data is sequentially read from the recording memory 244 in the imaging order under the control of the memory controller 245. At this time, the selector 260 is connected to the averaging section 261. Therefore, the frame data is supplied to the averaging section 261. As shown in FIG. 53, each frame data is averaged for each segment of 2×2 pixels and is compressed to frame data of 512×512 pixels (averaged image) with the matrix size reduced by a half in each of the X and Y directions. The matrix size of the averaged image is the maximum size writable on a single track on the video tape. All the frames in one cut are reduced through the averaging section 261, and are recorded on successive n tracks on the video tape in the imaging order as shown in the upper part of FIG. 54 or FIG. 55.

After all the frames in one cut are read out, are reduced through the averaging section 261 and are sequentially recorded on the video tape, the selector 260 is switched to the digital VCR 247 under the control of the controller 248, so that the recording memory 244 is connected directly to the digital VCR 247. Under this situation, this structure becomes equivalent to the structure shown in FIG. 45. The frame images are read from the recording memory 244 in the order shown in FIG. 54 or FIG. 55 and are recorded on the video tape by the digital VCR 247.

The reproducing operation will now be discussed. At the time of reproduction, first, one cut of averaged image data is reproduced in the imaging order by the digital VCR 247. This data is interpolated frame by frame by the interpolation section 249, and is displayed in real time as a dynamic image on the high-definition monitor 252 via the display memory 250 and DAC 251. Since each averaged image completes one frame, displaying only the averaged images does not raise any problem other than the low spatial resolution.

After the reproduction and display of one cut of averaged image data are completed, the field images are reproduced. As this reproduction is the same as done in the eighth embodiment, its description will not be repeated.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An image storage apparatus comprising:

a plurality of dynamic image generating means for generating dynamic image data;

a plurality of work stations for displaying dynamic image data as dynamic images;

a plurality of temporary storage means for temporarily storing dynamic image data;

a plurality of video tape recorders each for recording dynamic image data on a video tape and reproducing dynamic image data therefrom;

a matrix switcher, intervening among said plurality of dynamic image generating means, said work stations, said plurality of temporary storage means and said video tape recorders, for switching connections thereamong; and control means for controlling said matrix switcher in such a manner that one of said plurality of temporary storage means and one of said video tape recorders are assigned to any dynamic image generating means which has generated said dynamic image data and said assigned video tape recorder is connected via said assigned temporary storage means to said dynamic image generating means which has generated dynamic image data, and one of said plurality of temporary storage means and one of said video tape recorders are assigned to any work station which has made a playback request, said assigned video tape recorder is connected via said assigned temporary storage means to said work station which has made said playback request.

2. The image storage apparatus according to claim 1, wherein each of said plurality of temporary storage means has first and second input/output terminals and has a function of reading dynamic image data from one of said input/output terminals while writing dynamic image data from the other input/output terminal.

3. The image storage apparatus according to claim 2, wherein each of said plurality of temporary storage means has first and second magnetic disk units.

4. The image storage apparatus according to claim 2, wherein each of said plurality of temporary storage means is a semiconductor memory provided with first and second input/output ports.

5. The image storage apparatus according to claim 1, wherein said plurality of video tape recorders are small in quantity than a total number of said plurality of dynamic image generating means and said work stations.

6. The image storage apparatus according to claim 1, further comprising a video cassette library unit including a rack for holding a plurality of cassette tapes and means for removing a specific cassette tape from said rack and setting said specific cassette tape to a specific video tape recorder.

7. The image storage apparatus according to claim 1, wherein said control means gives priorities to said plurality of video tape recorders in advance, assigns one of those currently inactive video tape recorders which has a highest priority, gives priorities to said plurality of temporary storage means in advance, and assigns one of those currently inactive temporary storage means which has a highest priority.

8. The image storage apparatus according to claim 1, wherein in response to a playback request on same dynamic image data as already stored in one of said temporary storage means, said dynamic image data is supplied to one of said work stations that has issued said playback request from said temporary storage means.

9. The image storage apparatus according to claim 1, wherein after a certain amount of dynamic image data is stored in one of said temporary storage means, said dynamic image data is collectively transferred to one of said video tape recorders to be recorded.

10. An image storage apparatus comprising:

image generating means for generating image data;

data preparing means for dividing said image data into a plurality of segments, adding pixels for each segment to prepare check sum data, and adding pixels at a same position extracted from said plurality of segments to prepare correction data;

storage means for storing said image data, said check sum data and said correction data;

data restoring means for receiving said image data, said check sum data and said correction data from said storage means, checking if there is an error for each segment using said check sum data and restoring data of any segment which contains an error based on said correction data; and image display means for displaying restored image data as an image.

11. The image storage apparatus according to claim 10, wherein said data preparing means adds pixels for a same horizontal scanning line of said image data to prepare said check sum data and adds pixels on a same vertical scanning line to prepare said correction data.

12. The image storage apparatus according to claim 11, wherein said data restoring means checks an error for each horizontal scanning line using said check sum data and subtracts data on a same vertical scanning line but on other horizontal scanning lines than one containing an error, from an added value of said correction data, thereby restoring data on said horizontal scanning line containing said error.

13. The image storage apparatus according to claim 10, wherein said data restoring means restores data on a segment containing an error by subtracting data on other segments than said segment containing an error, from said correction data.

14. The image storage apparatus according to claim 10, wherein said data preparing means has means for changing a matrix size of said segments.

15. An image storage apparatus comprising:

dynamic image generating means for repeatedly generating frame data as dynamic image data;

pre-processing means for dividing one frame into a plurality of fields and outputting each of said frame data, field by field, with a frame number and a field number specific to each field attributed to said each frame data;

a video tape recorder for recording field data, output from said pre-processing means, together with said frame number and said field numbers on tracks of a video tape and reproducing said field data together with said frame number and field numbers from said video tape;

restoring means for rearranging said field data, reproduced by said video tape recorder, into one frame according to said frame number and said field numbers to thereby restore frame data; and display means for displaying said frame data, restored by said restoring means, as a dynamic image.

16. The image storage apparatus according to claim 15, wherein said video tape recorder reproduces data while feeding said video tape in a forward direction or a reverse direction.

17. The image storage apparatus according to claim 15, wherein said pre-processing means divides one frame into four fields and attributes four different field numbers to field data according to said fields.

18. An image storage apparatus comprising:

a plurality of work stations;

a plurality of video tape recorders;

a first selector intervening a plurality of command output terminals of said work stations and a plurality of command input terminals of said video tape recorders;

a second selector intervening a plurality of video signal output terminals of said video tape recorders and a plurality of video signal input terminals of said work stations; and control means for controlling said first selector and said second selector in responsive to each other in such a manner that one command is directly supplied from one of said work stations to one of said video tape recorders and a video signal is directly supplied from one of said video tape recorders to one of said work stations.

19. The image storage apparatus according to claim 18, further comprising a video cassette library unit including a rack for holding a plurality of cassette tapes and means for removing a specific cassette tape from said rack and setting said specific cassette tape to a specific video tape recorder.

20. An image storage apparatus comprising:
holding means for holding a plurality of video cassette tapes;
a video tape recorder for recording dynamic image data on a video cassette tape and reproducing dynamic image data from a video cassette tape;
a cassette changer, intervening between said holding means and said video tape recorder, for changing a video cassette tape in said video tape recorder; storage means for temporarily storing dynamic image data reproduced by said video tape recorder;
display means for displaying data read from said storage means as a dynamic image;
specifying means for specifying a frame in said dynamic image that need not be preserved long time; and
control means for controlling said video tape recorder, said cassette changer and said storage means in such a way that a specific cassette tape is set in said video tape recorder and data of all frames other than said frame specified by said specifying means is read from said storage means and recorded on said specific cassette tape.

21. The image storage apparatus according to claim 20, wherein said specifying means is input means which is operated by an operator when an image of a frame that need not be preserved long time is displayed on said display means.

22. The image storage apparatus according to claim 20, wherein said specifying means comprises subtraction means for subtracting a mask image from an image of each frame, and determining means for preparing a frequency distribution of pixels according to a change in pixel values for each subtraction image provided by said subtraction means and determining a frame that need not be preserved long time based on a shape of said frequency distribution.

23. The image storage apparatus according to claim 22, wherein said dynamic image data is a picked-up image of a subject with a contrast medium injected in said subject, and said mask image is an image of said subject before said contrast image is injected in said subject.

24. The image storage apparatus according to claim 23, wherein said determining means compares a frequency of a specific pixel value in said frequency distribution with a predetermined threshold value, and determines that a frame has been imaged with said contrast medium present in said subject and should be preserved long time when said frequency is greater than said threshold value.

25. The image storage apparatus according to claim 20, wherein a frame that should be preserved long time is displayed distinguishable in a display mode from a frame that need not be preserved long time.

26. An image storage apparatus comprising:
a first work station for displaying an image together with first and second cursors, said first work station having first input means for moving said first cursor on a screen;
a second work station, located remote from said first work station, for displaying a same image as said first work station together with third and fourth cursors, said second work station having second input means for moving said third cursor on a screen; and
means for transmitting cursor position data between said first work station and said second work station in such a way that said fourth cursor moves on said screen of said second work station in responsive to said first cursor, and said second cursor moves on said screen of said first work station in responsive to said third cursor.

27. An image storage apparatus comprising:
dynamic image generating means for generating a plurality of frames in a sequence as a dynamic image by repeating imaging;
first temporary storage means for temporarily storing data of said plurality of frames;
control means for controlling reading of said temporary storage means in such a manner that each of said frames is divided into an a field image consisting of pixels in a field of odd-numbered rows×odd-numbered columns, a b field image consisting of pixels in a field of odd-numbered rows×even-numbered columns, a c field image consisting of pixels in a field of even-numbered rows×odd-numbered columns, and a d field image consisting of pixels in a field of even-numbered rows× even-numbered columns, data of said a field images of all frames are sequentially read in an imaging order, data of said b field images of all frames are then sequentially read in an imaging order, data of said c field images of all frames are then sequentially read in an imaging order, and data of said d field images of all frames are finally sequentially read in an imaging order;
a video tape recorder for sequentially recording data, read from said first temporary storage means, field by field, on successive tracks on a video tape and reproducing data from said video tape; and
display means for displaying field images sequentially reproduced by said video tape recorder, in a reproducing order.

28. The image storage apparatus according to claim 27, further comprising second temporary storage means for storing data of all field images reproduced by said video tape recorder; and control means for controlling reading of said second temporary storage means in such a way that all frames are restored from four field images a, b, c and d about each of said frames and are supplied to said display means.

29. The image storage apparatus according to claim 27, further comprising interpolation means, intervening between said video tape recorder and said display means, for enlarging a matrix size of a field image reproduced by said video tape recorder through interpolation.

30. The image storage apparatus according to claim 27, wherein said control means controls said first temporary storage means before reading data of a field image in such a way that data of said plurality of frames are sequentially read in said imaging order, and further comprising averaging means for reducing a matrix size of each of said frames read from said first temporary storage means by averaging adjoining pixels, and supplying said reduced frames to said video tape recorder.

* * * * *